(12) United States Patent
Jin et al.

(10) Patent No.: US 11,553,404 B2
(45) Date of Patent: Jan. 10, 2023

(54) METHOD AND APPARATUS FOR REPORTING UE CAPABILITY OF TERMINAL IN NEXT-GENERATION MOBILE COMMUNICATION SYSTEM

(71) Applicant: Samsung Electronics Co., Ltd., Suwon-si (KR)

(72) Inventors: Seungri Jin, Suwon-si (KR); Kicheol Nam, Suwon-si (KR); Sangbum Kim, Suwon-si (KR); Kisung Park, Suwon-si (KR); Jangbok Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 101 days.

(21) Appl. No.: 16/743,632

(22) Filed: Jan. 15, 2020

(65) Prior Publication Data

US 2020/0229076 A1 Jul. 16, 2020

(30) Foreign Application Priority Data

Jan. 15, 2019 (KR) .......................... 10-2019-0005250

(51) Int. Cl.
*H04W 48/14* (2009.01)
*H04B 7/0413* (2017.01)
*H04W 72/04* (2009.01)

(52) U.S. Cl.
CPC .......... *H04W 48/14* (2013.01); *H04B 7/0413* (2013.01); *H04W 72/04* (2013.01)

(58) Field of Classification Search
CPC ..... H04W 48/14; H04W 72/04; H04B 7/0413
USPC ........................................................ 370/329
See application file for complete search history.

(56) References Cited

U.S. PATENT DOCUMENTS

| | | | |
|---|---|---|---|
| 9,258,769 B2 | 2/2016 | Ore et al. | |
| 10,154,455 B1 | 12/2018 | Govindassamy | |
| 2012/0064909 A1 | 3/2012 | Lindoff et al. | |
| 2015/0373729 A1* | 12/2015 | Lee | H04W 72/0453 370/329 |
| 2018/0206113 A1 | 7/2018 | He et al. | |
| 2019/0215729 A1* | 7/2019 | Oyman | H04L 65/1016 |
| 2019/0394668 A1* | 12/2019 | Shaheen | H04M 1/72463 |
| 2020/0351638 A1* | 11/2020 | Kim | H04W 8/24 |

(Continued)

FOREIGN PATENT DOCUMENTS

NO 2019/206238 A1 10/2019

OTHER PUBLICATIONS

3GPP TSG-RAN WG2 Meeting #98 R2-1706075 Hangzhou, China, May 15-19, 2017.*

(Continued)

*Primary Examiner* — Faisal Choudhury
(74) *Attorney, Agent, or Firm* — Jefferson IP Law, LLP

(57) ABSTRACT

A communication technique for merging, with internet of things (IoT) technology, a fifth generation (5G) communication system for supporting a higher data rate, subsequent to a fourth generation (4G) system, and a system thereof are provided. The disclosure can be applied to an intelligent service (for example, smart home, smart building, smart city, smart car or connected car, healthcare, digital education, retail, security and safety-related services, and the like), based on a 5G communication technology and an IoT-related technology. A method for reporting user equipment (UE) capability of a terminal and a device thereof are provided.

16 Claims, 20 Drawing Sheets

(56) References Cited

U.S. PATENT DOCUMENTS

2021/0045005 A1* 2/2021 Wang ............... H04W 28/0289
2021/0185614 A1* 6/2021 Zhou ..................... H04L 5/0051

OTHER PUBLICATIONS

Temporary Capability Restriction for standalone NR; Qualcomm Incorporated; 3GPP TSG-RAN WG2 #102 R2-1807534; Busan, South Korea, May 21-25, 2018.*
U.S. Appl. No. 62/643,541, filed Mar. 15, 2018.*
International Search Report dated Apr. 22, 2020, issued in an International Application No. PCT/KR2020/000735.
Huawei et al., 'UE overheating support in NR SA scenario', R2-1815142, 3GPP TSG-RAN WG2 #103bis, Sep. 28, 2018. Section 2; and figure 1.
Huawei et al., 'CR on signalling introduction of UE overheating support in NR SA scenario', R2-1819179, 3GPP TSG-RAN2 Meeting#104, Dec. 4, 2018. Section 5.7.4.2.
Ericsson, 'Extension of overheating indication parameters', R2-1818531, 3GPP TSG-RAN WG2 #104, Nov. 5, 2018. Section 1.
Huawei et al., 'UE overheating support for late drop', R2-1818035, 3GPP TSG-RAN2 Meeting#104, Nov. 2, 2018. Section 1.
U.S. Office Action dated Dec. 31, 2020, issued by the U.S. Patent and Trademark Office in U.S. Appl. No. 16/787,804.
U.S. Office Action dated Aug. 31, 2020, issued by the U.S. Patent and Trademark Office in U.S. Appl. No. 16/787,804.
Huawei, "Report of email discussion [97bis#07] [LTE/TEI14] Ue overheating problem", 3GPP Draft, R2-1705512, 3RD Generation Partnership Project (3GPP), vol. Ran WG2, Hangzhou, China, 20170515-20170519, May 6, 2017, XP051264863.
Huawei, "Report of email discussion [98#43] [LTE/TEI14] Ue overheating problem", 3GPP Draft, R2-1708219, 3RD Generation Partnership Project (3GPP), vol. Ran WG2, Berlin, Germany, 20170821 - 20170825, Aug. 20, 2017, XP051318122.
Extended European Search Report dated Sep. 2, 2021, issued in European Patent Application No. 20741312.1.

* cited by examiner

METHOD AND APPARATUS FOR REPORTING UE CAPABILITY OF TERMINAL IN NEXT-GENERATION MOBILE COMMUNICATION SYSTEM

CROSS-REFERENCE TO RELATED APPLICATION(S)

This application is based on and claims priority under 35 U.S.C. § 119(a) of a Korean patent application number 10-2019-0005250, filed on Jan. 15, 2019, in the Korean Intellectual Property Office, the disclosure of which is incorporated by reference herein in its entirety.

BACKGROUND

1. Field

The disclosure relates to an operation of a terminal and a base station in a mobile communication system.

More particularly, the disclosure relates to a mobile communication system and, more particularly, to a method in which a terminal reports its own user equipment (UE) capability. Further, the disclosure proposes a generalized terminal reporting procedure in the case where a terminal receives or does not receive a request for reporting UE capability from a base station in multiple radio access technologies, and includes a procedure capable of reflecting a temporary change in the capability of the terminal.

2. Description of Related Art

In order to meet wireless data traffic demands that have increased after fourth generation (4G) communication system commercialization, efforts to develop an improved fifth generation (5G) communication system or a pre-5G communication system have been made. For this reason, the 5G communication system or the pre-5G communication system is called a beyond 4G network communication system or a post long term evolution (LTE) system.

In order to achieve a high data transmission rate, an implementation of the 5G communication system in a mmWave band (for example, 60 GHz band) is being considered. In the 5G communication system, technologies, such as beamforming, massive multiple input multiple output (MIMO), Full Dimensional MIMO (FD-MIMO), array antenna, analog beam-forming, and large scale antenna are being discussed as means to mitigate a propagation path loss in the mm Wave band and increase a propagation transmission distance.

Further, the 5G communication system has developed technologies, such as an evolved small cell, an advanced small cell, a cloud Radio Access Network (RAN), an ultradense network, Device to Device communication (D2D), a wireless backhaul, a moving network, cooperative communication, Coordinated Multi-Points (CoMP), and received interference cancellation to improve the system network. In addition, the 5G system has developed Advanced Coding Modulation (ACM) schemes, such as Hybrid Frequency-Shift Keying (FSK) and Quadrature Amplitude Modulation (QAM) (FQAM) and Sliding Window Superposition Coding (SWSC), and advanced access technologies, such as Filter Bank Multi Carrier (FBMC), Non Orthogonal Multiple Access (NOMA), and Sparse Code Multiple Access (SCMA).

Meanwhile, the Internet has been evolved to an Internet of Things (IoT) network in which distributed components, such as objects exchange and process information from a human-oriented connection network in which humans generate and consume information. An Internet of Everything (IoE) technology in which a big data processing technology through a connection with a cloud server or the like is combined with the IoT technology has emerged.

In order to implement IoT, technical factors, such as a detection technique, wired/wireless communication, network infrastructure, service-interface technology, and security technology are required, and research on technologies, such as a sensor network, Machine-to-Machine (M2M) communication, Machine-Type Communication (MTC), and the like for connection between objects has recently been conducted. In an IoT environment, through collection and analysis of data generated in connected objects, an intelligent Internet Technology (IT) service to create a new value for peoples' lives may be provided. The IoT may be applied to fields, such as those of a smart home, a smart building, a smart city, a smart car, a connected car, a smart grid, health care, a smart home appliance, or high-tech medical services through the convergence of the Information Technology (IT) of the related art and various industries.

Accordingly, various attempts to apply the 5G communication to the IoT network are made. For example, the 5G communication technology, such as a sensor network, machine-to-machine (M2M) communication, and machine-type communication (MTC), has been implemented by a technique, such as beamforming, MIMO, and array antennas. The application of a cloud RAN as the big data processing technology may be an example of convergence of the 5G technology and the IoT technology.

The disclosure considers a method in which a new radio (NR) terminal is able to make a request for base station management suitable for the current UE capability by reporting, to a base station, a temporary UE capability with respect to a temporary change in the UE capability of the terminal, in addition to a method of reporting its own UE capability upon a request from the base station. In the existing procedure, only when a terminal receives a request for a UE capability report through a radio resource control (RRC) message from a base station, the terminal produces a UE capability for an indicated radio access technology (RAT) type according to the request by the base station and transmits the UE capability to the base station using a message reporting the same. However, in the case where the UE capability is temporarily changed due to hardware and interference problems inside the terminal, there is no procedure to reflect the same. Therefore, a need exists for an operation of a terminal and a base station in a mobile communication system.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an operation of a terminal and a base station in a mobile communication system.

Additional aspects will be set forth in part in the description which follows and, in part, will be apparent from the description, or may be learned by practice of the presented embodiments.

In accordance with an aspect of the disclosure, a method by a terminal in a wireless communication system is provided. The method includes receiving, from a base station, a first message including configuration information associated with overheating, identifying whether internal overheating is detected, and reporting, to the base station, a second message including overheating assistance information based on the configuration information, in a case where the internal overheating is detected, wherein the overheating assistance information includes information on at least one of a number of component carriers, a bandwidth, or a number of multiple input multiple output (MIMO) layers.

In accordance with another aspect of the disclosure, a method by a base station in a wireless communication system is provided. The method includes transmitting, to a terminal, a first message including configuration information associated with overheating, and receiving, from the terminal, a second message including overheating assistance information based on the configuration information, wherein the overheating assistance information includes information on at least one of a number of component carriers, a bandwidth, or a number of MIMO layers.

In accordance with another aspect of the disclosure, a terminal in a wireless communication system is provided. The terminal includes a transceiver, and at least one processor configured to receive, from a base station via the transceiver, a first message including configuration information associated with overheating, identify whether internal overheating is detected, and report, to the base station via the transceiver, a second message including overheating assistance information based on the configuration information, in a case where the internal overheating is detected, wherein the overheating assistance information includes information on at least one of a number of component carriers, a bandwidth, or a number of MIMO layers.

In accordance with another aspect of the disclosure, a base station in a wireless communication system is provided. The base station includes a transceiver, and at least one processor configured to transmit, to a terminal via the transceiver, a first message including configuration information associated with overheating, and receiving, from the terminal via the transceiver, a second message including overheating assistance information based on the configuration information, wherein the overheating assistance information includes information on at least one of a number of component carriers, a bandwidth, or a number of MIMO layers.

According to an embodiment of the disclosure, it is possible to provide a method and an apparatus for reporting user equipment (UE) capability.

In addition, according to an embodiment of the disclosure, it is possible to provide a method in which a terminal is able to make a request to a base station for management suitable for the current UE capability by reporting, to the base station, a temporary UE capability according to a temporary change in the UE capability of the terminal, in addition to a method of reporting its own UE capability according to a request from the base station.

Further, according to an embodiment of the disclosure, a new radio (NR) terminal is able to voluntarily report, to a base station, the UE capability changed due to a temporary change in the UE capability or the like, in addition to the case where the terminal receives a request for a UE capability report from the base station through an RRC message, thereby transmitting a dynamic UE capability report to the base station. Accordingly, the base station can perform more appropriate resource allocation to the terminal and terminal management, and the terminal can also obtain the performance conforming to the actual UE capability.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
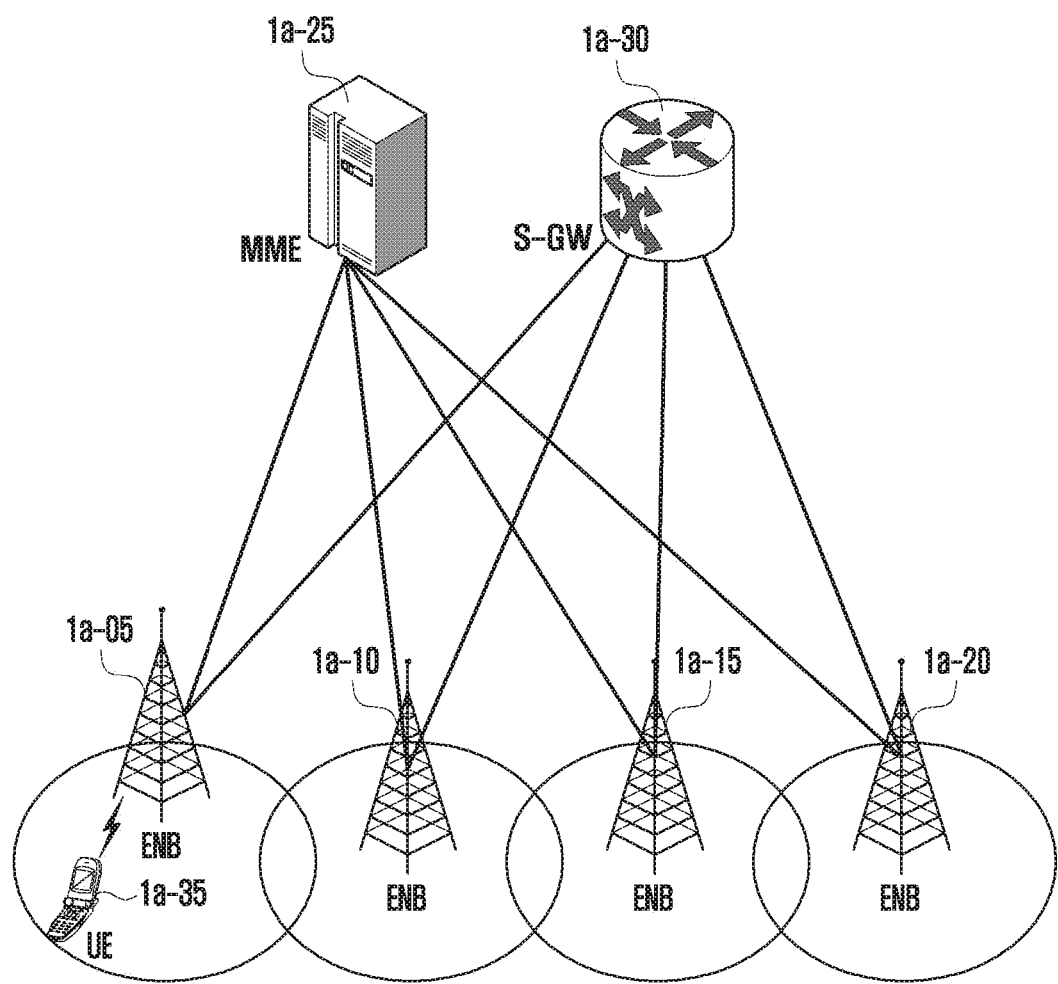
FIG. 1 is a diagram illustrating a structure of a long term evolution (LTE) system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, terms for identifying access nodes, terms referring to network entities, terms referring to messages, terms referring to interfaces between network entities, terms referring to a variety of identification information, and the like are illustrative words for the convenience of explanation. Accordingly, the disclosure is not limited to the terms described below, and other terms having equivalent technical meanings may be used.

Hereinafter, terms and names defined in the 3rd-generation partnership project long-term evolution (3GPP LTE) standard will be used for the convenience of explanation. However, the disclosure is not limited to the above terms and names, and may be applied to systems conforming to other standards in the same manner.

In the following description, a base station is an entity that performs resource allocation with respect to a terminal, and may be at least one of a gNode B (gNB), an eNode B (eNB), a Node B, a base station (BS), a radio access unit, a base station controller, or a node in a network. The terminal may include user equipment (UE), a mobile station (MS), a cellular phone, a smart phone, a computer, or a multimedia system capable of performing a communication function. In the disclosure, downlink (DL) is a wireless transmission path of a signal transmitted from a base station to a terminal, and uplink (UL) is a wireless transmission path of a signal transmitted from a terminal to a base station. In addition, although embodiments of the disclosure will be described based on an NR system below, the embodiments of the disclosure may be applied to other communication systems having a similar technical background or channel form. In addition, the embodiments of the disclosure may be applied to other communication systems through some modifications according to a determination of those skilled in the art without departing from the scope of the disclosure.

In the disclosure, the terms "physical channel" and "signal" may be used interchangeably with "data" or "control signal". For example, although Physical Downlink Shared Channel (PDSCH) is a physical channel through which data is transmitted, PDSCH may be referred to as "data" in the disclosure.

In the following embodiments of the disclosure, higher layer signaling may be a method of transmitting a signal from a base station to a terminal using a downlink data channel of a physical layer or a signal from a terminal to a base station using an uplink data channel of a physical layer, and may also be referred to as "RRC signaling" or a "medium access control (MAC) control element (CE)".

FIG. 1 is a diagram illustrating a structure of an LTE system according to an embodiment of the disclosure.

Referring to FIG. 1, as shown in the drawing, a radio access network of an LTE system includes next-generation base stations (Evolved Node Bs) (hereinafter, referred to as "eNBs", "Node Bs", or "base stations") 1a-05, 1a-10, 1a-15, and 1a-20, a mobility management entity (MME) 1a-25, and a serving-gateway (S-GW) 1a-30. User equipment (hereinafter, referred to as "UE" or a "terminal") 1a-35 accesses an external network through the eNBs 1a-05, 1a-10, 1a-15, and 1a-20 and the S-GW 1a-30.

In FIG. 1, the eNBs 1a-05, 1a-10, 1a-15, and 1a-20 correspond to existing Node Bs of a universal mobile telecommunication system (UMTS). The eNB is connected to the UE 1a-35 via a radio channel and plays a more complex role than the existing Node B. In the LTE system, since all user traffic including real-time services, such as voice-over-IP (VoIP) through the Internet protocol, is served through a shared channel, a device for collecting status information, such as buffer status, available transmission power status, and channel status of UEs, and performing scheduling is required. The eNBs 1a-05, 1a-10, 1a-15, and 1a-20 serve as such a device.

One eNB typically controls multiple cells. For example, in order to realize a data rate of 100 Mbps, the LTE system uses, as radio access technology, orthogonal frequency division multiplexing (hereinafter, referred to as "OFDM") in, for example, a 20 MHz bandwidth. Further, an adaptive modulation and coding (hereinafter, referred to as "AMC") scheme is applied to determine a modulation scheme and a channel coding rate in accordance with the channel status of a terminal. The S-GW 1a-30 is a device for providing data bearers and generates or removes data bearers under the control of the MME 1a-25. The MME 1a-25 is a device that performs various control functions, as well as a mobility management function for a terminal, and is connected to a plurality of base stations 1a-05, 1a-10, 1a-15, and 1a-20.

Figure 2:
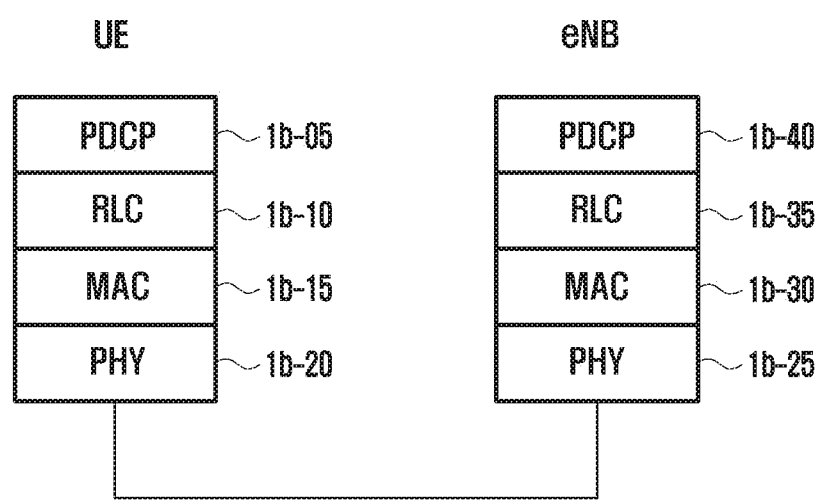
FIG. 2 is a diagram illustrating a radio protocol structure in an LTE system according to an embodiment of the disclosure.

FIG. 2 is a diagram illustrating a radio protocol structure in an LTE system according to an embodiment of the disclosure.

Referring to FIG. 2, the radio protocol of an LTE system includes a packet data convergence protocol (PDCP) 1b-05 or 1b-40, a radio link control (RLC) 1b-10 or 1b-35, and a medium access control (MAC) 1b-15 or 1b-30 in a terminal and an eNB, respectively. The PDCP 1b-05 or 1b-40 performs operations, such as IP header compression/decompression and the like. The primary functions of the PDCP are summarized as follows.

Header compression and decompression (ROHC only)
 Transfer of user data
 In-sequence delivery of higher layer packet data units (PDUs) at PDCP re-establishment procedure for RLC acknowledged mode (AM)
 Sequence reordering (for split bearers in DC (only support for RLC AM): PDCP PDU routing for transmission and PDCP PDU reordering for reception)
 Duplicate detection of lower layer service data units (SDUs) at PDCP re-establishment procedure for RLC AM
 Retransmission of PDCP SDUs at handover and, for split bearers in DC, of PDCP PDUs at PDCP data-recovery procedure, for RLC AM
 Ciphering and deciphering
 Timer-based SDU discard in uplink.

The radio link control (hereinafter, referred to as "RLC") 1*b*-10 or 1*b*-35 reconfigures a PDCP PDU (packet data unit) to an appropriate size and performs automatic repeat query (ARQ) operation and the like. The primary functions of the RLC are summarized as follows.

Data transfer function (transfer of higher layer PDUs)
 ARQ function (error correction through ARQ (only for AM data transfer))
 Concatenation, segmentation, and reassembly of RLC SDUs (only for UM and AM data transfer)
 Re-segmentation of RLC data PDUs (only for AM data transfer)
 Reordering of RLC data PDUs (only for UM and AM data transfer)
 Duplicate detection (only for UM and AM data transfer)
 Protocol error detection (only for AM data transfer)
 RLC SDU discard (only for UM and AM data transfer)
 RLC re-establishment The MAC 1*b*-15 or 1*b*-30 is connected to a plurality of RLC entities configured in a terminal or a base station, multiplexes RLC PDUs into MAC PDUs, and demultiplexes RLC PDUs from MAC PDUs. The primary functions of the MAC are summarized as follows.

Mapping between logical channels and transport channels
 Multiplexing/demultiplexing of MAC SDUs belonging to one or different logical channels into/from transport blocks (TB) delivered to/from the physical layer on transport channels
 Scheduling information reporting
 Hybrid ARQ (HARQ) function (error correction through HARQ)
 Priority handling between logical channels of one UE
 Priority handling between UEs by means of dynamic scheduling
 multimedia broadcast multicast service (MBMS) service identification
 Transport format selection
 Padding The physical layers 1*b*-20 and 1*b*-25 channel-code and modulate higher layer data, and convert the same into OFDM symbols to then be transmitted through a radio channel, or demodulate OFDM symbols received through a radio channel and channel-decode the same to then be transmitted to higher layers. In addition, hybrid ARQ (HARQ) is also used for additional error correction in the physical layer, and a receiving end transmits 1 bit of information indicating whether or not a packet transmitted from a transmitting end has been received. This is called HARQ acknowledgement (ACK)/negative Acknowledgement (NACK) information. Downlink HARQ ACK/NACK information with respect to uplink transmission may be transmitted through a physical hybrid-ARQ indicator channel (PHICH), and uplink HARQ ACK/NACK information with respect to downlink transmission may be transmitted through a physical uplink control channel (PUCCH) or a physical uplink shared channel (PUSCH).

Meanwhile, the PHY layer may include one or more frequencies/carriers, and a technique of simultaneously configuring and using a plurality of frequencies is called "carrier aggregation" (hereinafter, referred to as "CA"). The CA technique may use a primary carrier and one or more subcarriers, instead of using one carrier, for communication between a terminal {or user equipment (UE)} and a base station (E-UMTS terrestrial radio access network (UTRAN) Node B or eNB), thereby dramatically increasing the amount of transmission in proportion to the number of subcarriers. Meanwhile, in the LTE system, a cell in the base station using a primary carrier is referred to as a "primary cell (PCell)", and a subcarrier is referred to as a "secondary cell (SCell)".

Although not shown, the radio resource control (RRC) layer is provided on the PDCP layer of a terminal and a base station, respectively, and the RRC layer may transmit and receive control messages related to access and measurement for radio resource control.

Figure 3:
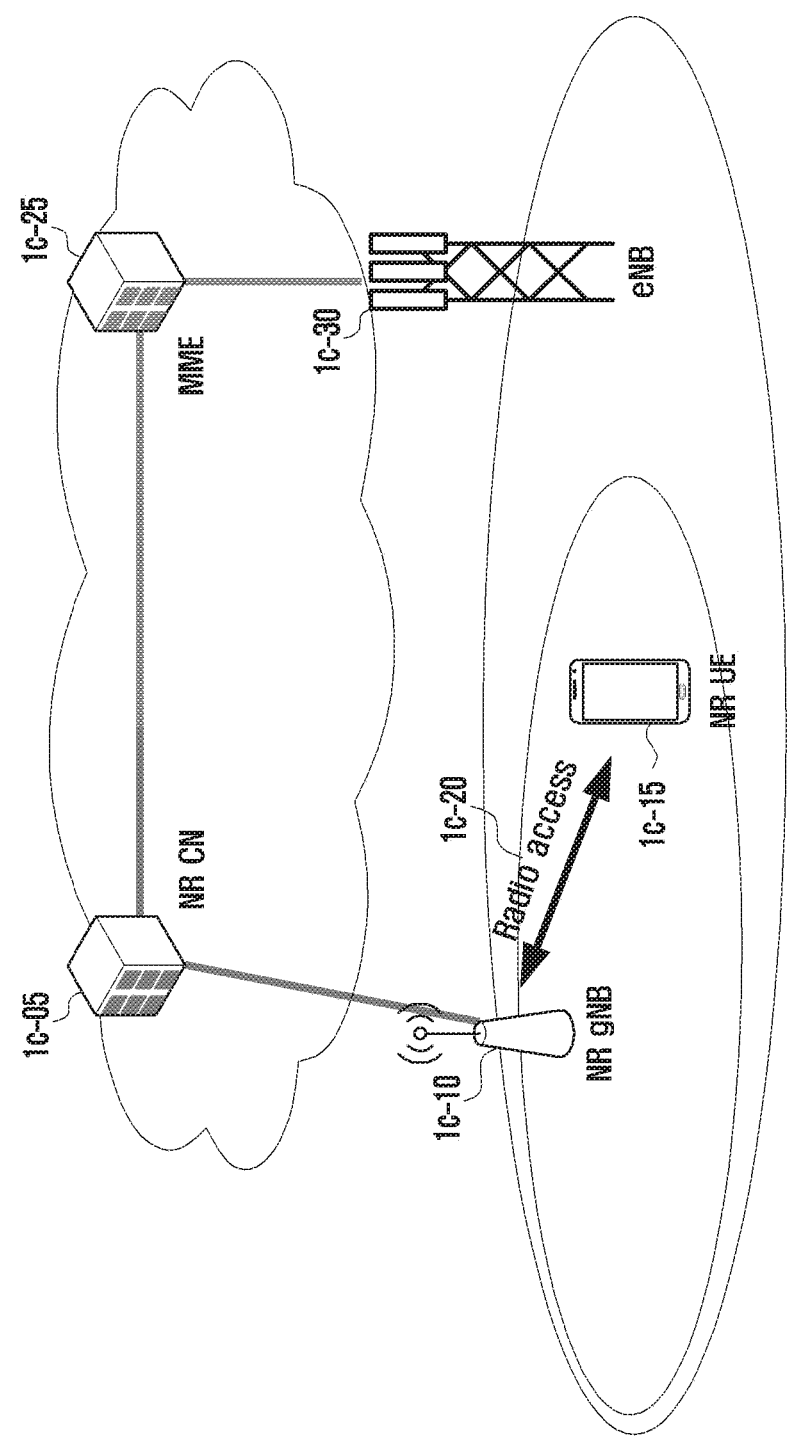
FIG. 3 is a diagram illustrating a structure of a next-generation mobile communication system according to an embodiment of the disclosure.

FIG. 3 is a diagram illustrating a structure of a next-generation mobile communication system according to an embodiment of the disclosure.

Referring to FIG. 3, a radio access network of a next-generation mobile communication system includes a new radio node B (hereinafter, referred to as an "NR NB") 1*c*-10 and a new radio core network (NR CN) {or a next-generation core network (NG CN)} 1*c*-05. New radio user equipment (hereinafter, referred to as "NR UE" or a "terminal") 1*c*-15 accesses an external network 1*c*-20 through the NR NB 1*c*-10 and the NR CN 1*c*-05. The NR CN 1*c*-05 may be used interchangeably with a "5G core network (5G CN)" or a "5G core (5GC)".

In FIG. 3, the NR NB 1*c*-10 corresponds to an evolved Node B (eNB) in an existing LTE system. The NR NB is connected to the NR UE 1*c*-15 through a radio channel, and may provide services superior to those of the existing node B. In the next-generation mobile communication system, since all user traffic is served through a shared channel, a device for collecting status information, such as buffer status, available transmission power status, and channel status of UEs, and performing scheduling is required. The NR NB 1*c*-10 serves as such a device.

One NR NB typically controls multiple cells. In order to realize super-high data rates compared to the existing LTE system, the next-generation mobile communication system may have a bandwidth equal to or greater than the maximum bandwidth of the existing system, may employ, as wireless access technology, Orthogonal Frequency Division Multiplexing (hereinafter, referred to as "OFDM"), and may further employ a beamforming technique in addition thereto. In addition, all of a plurality of subcarrier spacings (SCS) may be supported by one system. It is also possible for the control signal and the data signal to have different SCSs.

In the new radio (NR) system, the downlink transmission bandwidth and the uplink transmission bandwidth may be different from each other in a frequency-division duplexing (FDD) system in which the downlink and the uplink are separately operated by frequencies. The channel bandwidth represents an RF bandwidth corresponding to a system transmission bandwidth. Table 1-01 and Table 1-02 show some relationship of the system transmission bandwidth, the subcarrier spacing, and the channel bandwidth defined in the NR system in a frequency band below 6 GHz and in a frequency band above 6 GHz, respectively. For example, a transmission bandwidth of an NR system having a 100 MHz channel bandwidth and a 30 kHz subcarrier spacing includes 273 RBs. In the following, N/A may be a combination of a bandwidth and a subcarrier, which are not supported by the NR system.

TABLE 1-01

| Channel bandwidth $BW_{channel}$ [MHz] | Subcarrier spacing | 5 | 10 | 20 | 50 | 80 | 100 |
|---|---|---|---|---|---|---|---|
| Transmission bandwidth configuration $N_{RB}$ | 15 kHz | 25 | 52 | 106 | 270 | N/A | N/A |
| | 30 kHz | 11 | 24 | 51 | 133 | 217 | 273 |
| | 60 kHz | N/A | 11 | 24 | 65 | 107 | 135 |

TABLE 1-02

| | Channel bandwidth $BW_{channel}$ [MHz] | | | |
|---|---|---|---|---|
| Subcarrier spacing | 50 | 100 | 20 | 50 |
| Transmission bandwidth configuration $N_{RB}$ 60 kHz | 66 | 132 | 264 | N/A |
| 120 kHz | 32 | 66 | 132 | 264 |

In addition, an adaptive modulation and coding (AMC) scheme in which a modulation scheme and a channel coding rate are determined according to the channel state of a terminal is applied. In addition, a method in which a single system manages a plurality of bandwidth parts (BWPs) is used. The base station may configure one or more bandwidth parts with respect to the terminal, and may configure the following information for each bandwidth part.

For example, the base station may configure information shown in Table 2 with respect to a terminal.

TABLE 2

```
BWP ::=                       SEQUENCE {
    bwp-Id                           BWP-Id,
    (identifier of bandwidth part)
    locationAndBandwidth        INTEGER (1..65536),
    (location of bandwidth part)
    subcarrierSpacing       ENUMERATED {n0,n1,n2,n3,n4,n5},
    (subcarrier spacing)
    cyclicPrefix
        ENUMERATED { extended }
    (cyclic prefix)
}
```

In addition to the configuration information, various parameters associated with the bandwidth part may be configured in a terminal. The information may be transmitted to a terminal by a base station through higher layer signaling {e.g., radio resource control (RRC) signaling}. At least one of the configured bandwidth parts may be activated. Information on whether or not to activate the configured bandwidth part may be semi-statically transmitted from the base station to the terminal through RRC signaling, or may be dynamically transmitted from the base station to the terminal through downlink control information (DCI).

The terminal prior to an RRC connection may receive a configuration of an initial bandwidth part (BWP) for initial access from the base station through a master information block (MIB). More specifically, the terminal may receive configuration information on a control resource set (CORESET) and a search space through which a physical layer downlink control channel (PDCCH) for reception of system information {remaining system information, which may correspond to remaining minimum system information (RMSI) or system information block 1 (SIB1)} required for initial access through the MIB in the initial access phase may be transmitted. The control resource set and the search space configured using an MIB may be regarded as an identifier (ID) "0", respectively. The base station may notify the terminal of configuration information, such as frequency allocation information, time allocation information, numerology, and the like, for control resource set #0 through an MIB.

In addition, the base station may notify the terminal of configuration information on a monitoring period and an occasion for control resource set #0 (i.e., configuration information on search space #0) through an MIB. The terminal may regard the frequency domain configured with control resource set #0 obtained from the MIB as an initial bandwidth part for initial access. At this time, an identifier (ID) of the initial bandwidth part may be regarded as 0.

The configuration of the bandwidth part supported by the fifth generation (5G) may be used for various purposes.

For example, in the case where the bandwidth supported by the terminal is smaller than the system bandwidth, it may be supported by the configuration of the bandwidth part. For example, a frequency location of the bandwidth part may be configured in the terminal so that the terminal may transmit and receive data at a specific frequency location within the system bandwidth.

As another example, a base station may configure a plurality of bandwidth parts with respect to a terminal for the purpose of supporting different numerologies. For example, in order to support transmission and reception of data using a subcarrier spacing of 15 kHz and a subcarrier spacing of 30 kHz by a terminal, two bandwidth parts may be configured as a subcarrier spacing of 15 kHz and a subcarrier spacing of 30 kHz, respectively. Different bandwidth parts may be frequency-division-multiplexed, and in the case of transmitting and receiving data at a specific subcarrier spacing, a bandwidth part configured in the corresponding subcarrier spacing may be activated.

As another example, the base station may configure bandwidth parts having different bandwidths with respect to a terminal for the purpose of reducing power consumption of the terminal. For example, if a terminal supports a very large bandwidth (e.g., a 100 MHz bandwidth) and always transmits and receives data through the corresponding bandwidth, it may cause very large power consumption. In particular, it is very inefficient in terms of power consumption to monitor unnecessary downlink control channels with a large bandwidth of 100 MHz in the absence of traffic. In order to reduce power consumption of the terminal, the base station may configure a bandwidth part having a relatively small bandwidth (e.g., a 20 MHz bandwidth part) with respect to the terminal. In the absence of traffic, the terminal may perform a monitoring operation through a 20 MHz bandwidth part, and, if data is produced, the terminal may transmit and receive data through a 100 MHz bandwidth part according to the indication of the base station.

In a method of configuring the bandwidth part, the terminal that has not yet been RRC-connected may receive configuration information about an initial bandwidth part through a master information block (MIB) and/or an SIB in the initial access stage. More specifically, the terminal may be configured to have a control resource set (CORESET) for a downlink control channel through which downlink control information (DCI) for scheduling a system information block (SIB) is transmitted from an MIB of a physical broadcast channel (PBCH). The bandwidth of the control resource set configured through the MIB may be regarded as an initial bandwidth part, and the terminal may receive a PDSCH through which an SIB is transmitted through the configured initial bandwidth part. The initial bandwidth part may be used for other system information (OSI), paging, and random access, as well as reception of an SIB. If an SIB received based on the MIB includes configuration information on the initial bandwidth part, the initial bandwidth part may be configured based on the SIB.

The NR CN 1c-05 performs functions, such as mobility support, bearer configuration, and quality of service (QoS) configuration. The NR CN 1c-05 is a device that performs various control functions, as well as a mobility management function for a terminal, and is connected to a plurality of base stations. In addition, the next-generation mobile communication system may interwork with an existing LTE system, and the NR CN 1c-05 is connected to the MME 1c-25 through a network interface. The MME 1c-25 is connected to the eNB 1c-30, which is an existing base station.

Figure 4:
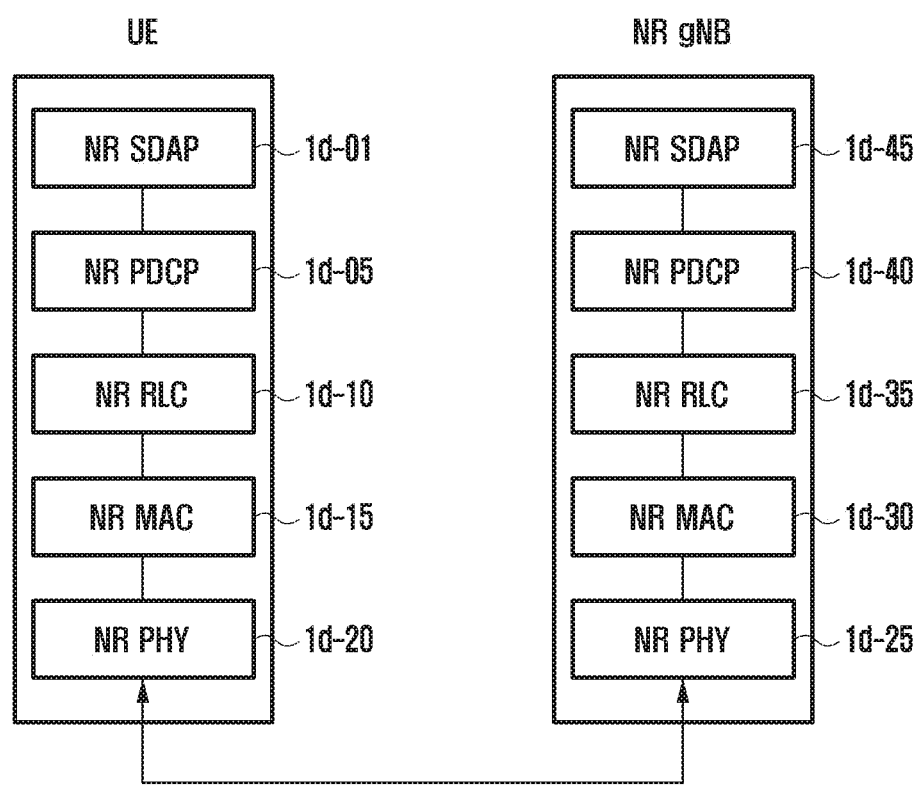
FIG. 4 is a diagram illustrating a radio protocol structure of a next-generation mobile communication system according to an embodiment of the disclosure.

FIG. 4 is a diagram illustrating a radio protocol structure of a next-generation mobile communication system according to an embodiment of the disclosure.

Referring to FIG. 4, the radio protocol of the next-generation mobile communication system includes NR SDAP 1d-01 or 1d-45, NR PDCP 1d-05 or 1d-40, NR RLC 1d-10 or 1d-35, and NR MAC 1d-15 or 1d-30 in a terminal and an NR base station, respectively.

The primary functions of the NR service data adaptation protocol (SDAP) 1d-01 or 1d-45 may include some of the following functions.
  Transfer of user plane data
  Mapping between QoS flow and data radio bearers (DRB) for downlink and uplink
  Marking QoS flow ID in both downlink and uplink packets
  Mapping reflective QoS flow to DRB for UL SDAP PDUs With regard to the SDAP layer entity, the terminal may receive a configuration indicating whether or not to use a header of the SDAP layer entity or whether or not to use functions of the SDAP layer entity for each PDCP layer entity, for each bearer, or for each logical channel through an RRC message. In the case where the SDAP header is configured, a 1-bit non-access stratum (NAS) reflective QoS configuration indicator and a 1-bit AS reflective QoS configuration indicator of the SDAP header may instruct the terminal to update or reconfigure mapping information between the QoS flow and the data bearers in uplink and downlink. The SDAP header may include QoS flow ID information indicating the QoS. The QoS information may be used as data processing priority, scheduling information, or the like in order to support effective services.

The primary functions of the NR PDCP 1d-05 or 1d-40 may include some of the following functions.
  Header compression and decompression (ROHC only)
  Transfer of user data
  In-sequence delivery of upper layer PDUs
  Out-of-sequence delivery of upper layer PDUs
  Sequence reordering (PDCP PDU reordering for reception)
  Duplicate detection of lower layer SDUs
  Retransmission of PDCP SDUs
  Ciphering and deciphering
  Timer-based SDU discard in uplink The above reordering function of the NR PDCP entity denotes a function of reordering PDCP PDUs received from a lower layer, based on a PDCP sequence number (SN), may include a function of transmitting data to an upper layer in the reordered order, may include a function of directly transmitting data to an upper layer without consideration of an order, may include a function of reordering the sequence and recording lost PDCP PDUs, may include a function of sending a status report of the lost PDCP PDUs to the transmitting end, and may include a function of making a request for retransmission of the lost PDCP PDUs.

The primary functions of the NR RLC 1d-10 or 1d-35 may include some of the following functions.
  Data transfer function (transfer of upper layer PDUs)
  In-sequence delivery of upper layer PDUs
  Out-of-sequence delivery of upper layer PDUs
  ARQ function (error correction through ARQ)
  Concatenation, segmentation, and reassembly of RLC SDUs
  Re-segmentation of RLC data PDUs
  Reordering of RLC data PDUs
  Duplicate detection
  Protocol error detection
  RLC SDU discard
  RLC re-establishment The above in-sequence delivery function of the NR RLC entity denotes a function of transferring RLC SDUs received from a lower layer to an upper layer in sequence, may include a function of, if one original RLC SDU is divided into a plurality of RLC SDUs and received, reassembling and transmitting the same, may include a function of reordering the received RLC PDUs, based on an RLC sequence number (SN) or a PDCP sequence number (SN), may include a function of reordering the sequence and recording lost RLC PDUs, may include a function of sending a status report of the lost RLC PDUs to the transmitting end, may include a function of making a request for retransmission of the lost RLC PDUs, may include a function of, if there is a lost RLC SDU, transmitting only the RLC SDUs prior to the lost RLC SDU to an upper layer in sequence, may include a function of, if a predetermined timer expires even though there is a lost RLC SDU, transmitting all RLC SDUs received before the timer starts to an upper layer in sequence, or may include a function of, if a predetermined timer expires even though there is a lost RLC SDU, transmitting all RLC SDUs received until the present to an upper layer in sequence. In addition, the RLC PDUs may be processed in the order of reception (in the order of arrival regardless of a serial number or a sequence number thereof), and may be transmitted to the PDCP entity in an out-of-sequence delivery manner. In the case of segments, the segments, which are stored in the buffer or will be received later, may be received and reconfigured into one complete RLC PDU, and the RLC PDU may be processed and transmitted to the PDCP entity. The NR RLC layer may not include a concatenation function, which may be performed in the NR MAC layer or may be replaced with a multiplexing function of the NR MAC layer.

The out-of-sequence delivery of the NR RLC entity denotes a function of directly delivering RLC SDUs received from a lower layer to an upper layer regardless of sequence, may include a function of, if one original RLC SDU is divided into a plurality of RLC SDUs and is received, reassembling and delivering the same, and may include a function of storing and ordering RLC SNs or PDCP SNs of the received RLC PDUs, thereby recording the lost RLC PDUs.

The NR MAC 1d-15 or 1d-30 may be connected to a plurality of NR RLC entities configured in a single terminal, and the primary functions of the NR MAC may include some of the following functions.

Mapping between logical channels and transport channels
Multiplexing/demultiplexing of MAC SDUs
Scheduling information reporting
HARQ function (error correction through HARQ)
Priority handling between logical channels of one UE
Priority handling between UEs by means of dynamic scheduling
MBMS service identification
Transport format selection
Padding The NR PHY layers 1d-20 and 1d-25 may perform operations of channel-coding and modulating the upper layer data into OFDM symbols and transmitting the same through a radio channel, or operations of demodulating and channel-decoding the OFDM symbols received through the radio channel and transmitting the same to the upper layer.

Figure 5:
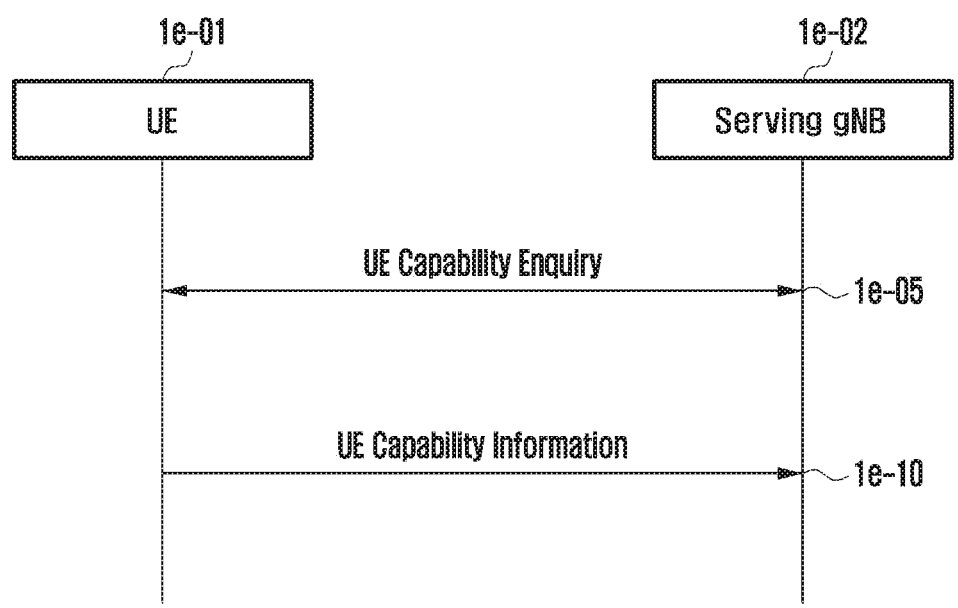
FIG. 5 is a diagram illustrating a structure of a message for reporting user equipment (UE) capability in a new radio (NR) system according to an embodiment of the disclosure.

FIG. 5 is a diagram illustrating a structure of a message for reporting UE capability in an NR system according to an embodiment of the disclosure.

Referring to FIG. 5, a terminal 1e-01 is connected to a serving base station 1e-02, and performs a procedure of reporting the capability supported by the terminal 1e-01 to the base station 1e-02. In operation 1e-05, the base station 1e-02 transmits, to the connected terminal 1e-01, a UE capability enquiry message requesting capability reporting. The message may include a UE capability request for each radio access technology (RAT) type made by the base station. The request for each RAT type may include information on a requested frequency band.

In addition, the UE capability enquiry message may include a single RRC message container requesting a plurality of RAT types, or an RRC message including a plurality of UE capability enquiry messages including a request for each RAT type may be transmitted to the terminal. That is, UE capability enquiry may be repeated multiple times in operation 1e-05, and the terminal may configure a plurality of UE capability information messages corresponding thereto, and may report the same multiple times. In the next-generation communication system, UE capability request may be performed with respect to MR-DC, as well as NR, LTE, and EN-DC. For reference, the UE capability enquiry message is generally transmitted in the process of establishing a DC connection by the terminal or after the DC connection is established, but may be transmitted in any condition when the base station requires the same.

The terminal receiving a request for a UE capability report from the base station in the above operation configures a UE capability according to the RAT type and band information requested by the base station. A method of configuring UE capability by the terminal in an NR system is summarized below.

1. If a terminal receives a list of LTE and/or NR bands through a request for UE capability from a base station, the terminal configures a band combination (BC) for EN-DC and NR stand-alone (SA). That is, the terminal configures a candidate list of BCs for EN-DC and NR SA, based on the bands requested by the base station through "FreqBandList". In addition, the bands have priorities in the order described in "FreqBandList".

2. If the "eutra-nr-only" flag or the "eutra" flag is set, the NR SA BCs are completely removed from the configured candidate list of BCs. This may only happen in the case where the LTE base station (eNB) requests "eutra" capability.

3. Afterwards, the terminal removes fallback BCs from the candidate list of BCs configured in the above operation. Here, the fallback BC corresponds to the case in which a band corresponding to at least one SCell is removed from a certain super set BCs, and may be omitted since the super set BC can cover the fallback BC. This operation is also applied to MR-DC (i.e., LTE bands). The remaining BCs after this operation constitute a final "candidate BC list".

4. The terminal selects BCs to be reported by selecting BCs conforming to the requested RAT type from the final "candidate BC list" above. In this operation, the terminal configures "supportedBandCombinationList" in a predetermined order. That is, the terminal configures the BCs and UE capability to be reported in the order of a predetermined RAT type (nr→ eutra-nr→ eutra). In addition, the terminal configures "featureSetCombination" for the configured "supportedBandCombinationList" and configures a list of "candidate feature set combinations" from the candidate BC list from which the list of fallback BCs (including equal or lower level capabilities) has been removed. The "candidate feature set combination" may include feature set combinations for both NR and EUTRA-NR BC, and may be obtained from feature set combinations of UE-NR-capabilities and UE-MRDC-capabilities containers.

5. In addition, if the requested RAT type is "eutra-nr" and affects, "featureSetCombinations" is included in two containers of "UE-MRDC-capabilities" and "UE-NR-capabilities". However, the feature set of NR is included only in "UE-NR-capabilities".

After the UE capability is configured, the terminal 1e-01 transmits a UE capability information message including the UE capability to the base station in operation 1e-10. The base station 1e-02 then performs appropriate scheduling and transmission/reception management with respect to the corresponding terminal, based on the UE capability received from the terminal 1e-01.

The disclosure provides a method of configuring and reporting UE capability, based on the case in which the base station makes a request for reporting UE capability using "UECapabilityEnquiry" including "UE-CapabilityRAT-Request" as described above, and further considers the case in which the terminal transmits the UE capability that temporarily changes to the base station. An operation method may vary according to various embodiments of the disclosure, and the disclosure and the following embodiments propose a method of supporting general UE capability restriction (temporary capability restriction) and specific application examples thereof.

A temporary change in UE capability may occur due to the following issues.

1. Sharing hardware with other communication methods (wireless local area network (WLAN), Bluetooth, global positioning system (GPS), and the like) different from NR in a terminal 2. Interference between NR and other communication methods (WLAN, Bluetooth, GPS, and the like)

3. Exceptional operation of a terminal (overheating, power saving mode, power consumption issue, and the like)

4. Change of a terminal mode {selectively determined from among dual mode. For example, in the case of a foldable terminal, the performance of the terminal may be configured differently between a folded state and an unfolded state thereof. The performance of the terminal may differ in hardware (such as antenna performance, support or non-support for MIMO, or the like) depending on the mode of the terminal, or the terminal may be intentionally configured to have different UE capabilities.}

Figure 6:
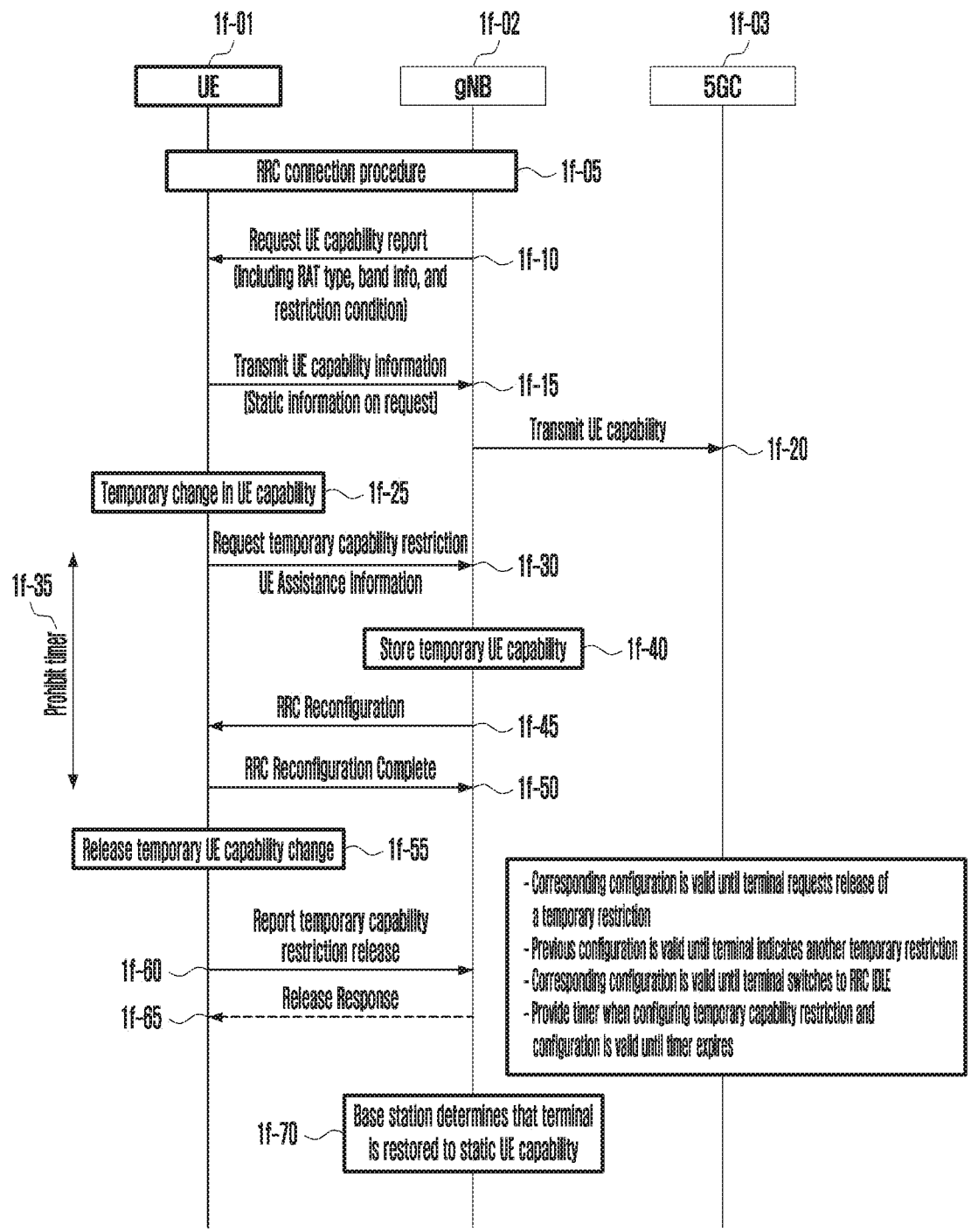
FIG. 6 is a diagram illustrating a method of a terminal in a radio resource control (RRC) connection state requesting a temporary change in UE capability according to an embodiment of the disclosure.

FIG. 6 is a diagram illustrating a method of a terminal in an RRC connection state requesting a temporary change in UE capability according to an embodiment of the disclosure.

Referring to FIG. 6, in particular, after a terminal requests a temporary UE capability restriction, a base station stores the request without acceptance/rejection of the base station and reflects the request through RRC reconfiguration.

In order to connect to a base station 1*f*-02, a terminal 1*f*-01 performs an RRC connection procedure including random access, thereby switching to an RRC connection state (1*f*-05). The terminal 1*f*-01 in the RRC connection state receives a request for reporting UE capability from the base station 1*f*-02 in operation 1*f*-05. In this operation, a plurality of "UE-CapabilityRAT-Requests" may be transmitted using "UECapabilityEnquiry", or a request for a report with respect to one RAT type may be transmitted. If a plurality of "UE-CapabilityRAT-Requests" is transmitted using "UECapabilityEnquiry" in the above operation, the terminal 1*f*-01 configures a UE capability, based on the priority according to the RAT type request. For example, the terminal 1*f*-01 configures a UE capability container according to the following priority in LTE.

ue-CapabilityRAT-Container for nr
ue-CapabilityRAT-Container for eutra-nr
ue-CapabilityRAT-Container for eutra If content of MR-DC is determined, a report of another RAT type has a priority value, and the terminal 1*f*-01 must make a report according thereto.

In operation 1*f*-15, the terminal 1*f*-01 transmits, to the base station 1*f*-02, "UECapabilityInformation" message including UE capability information configured according to the priority in the container thereof. The message is transmitted to the base station 1*f*-02 through an RRC message, and includes static UE capability for the RAT type, band information, or the like, which are requested by the base station 1*f*-02. Although the terminal 1*f*-01 may adjust implementation of the UE capability for the requested RAT type and band information and report the same, the terminal 1*f*-01 basically transmits static information on the terminal in this operation. This is due to the fact that information necessary to return to the previous static UE capability is required in the case where a temporary capability restriction request, which is reported later, expires.

In operation 1*f*-20, the base station 1*f*-02 transmits the UE capability information received from the terminal 1*f*-01 to a 5G CN 1*f*-03, and the 5G CN 1*f*-03 stores the received static UE capability information. The UE capability information stored in the 5G CN 1*f*-03 in the above operation may be maintained until the RRC connection of the terminal 1*f*-01 is released, and may be used for traffic configuration and mobility management with respect to the terminal 1*f*-01.

In the disclosure, the UE capability is statically transmitted to the base station 1*f*-02 and the 5G CN 1*f*-03, and if there is no separate signaling, the inherent capability of the terminal 1*f*-01 remains. However, in the case of an actual terminal 1*f*-01, the UE capability may need to be temporarily changed due to the four reasons described above and other reasons. That is, a temporary change in UE capability different from the performance of the static terminal may be generated/required due to sharing hardware with other communication modules in the terminal 1*f*-01, interference therewith, temporary heating, change of a terminal mode, and the like. In general, in the case where the UE capability is temporarily reduced, compared to the static UE capability, the terminal 1*f*-01 needs to report the same to the base station 1*f*-02 to make a request for scheduling and management conforming to the reduced UE capability.

For example, in the case of a foldable terminal, if the performance of the terminal is a static UE capability when the display is unfolded, the performance of the terminal in the state in which the display is folded may be configured to be lower. That is, a change in the state of the terminal may make a difference in the performance of an antenna and MIMO applied to the terminal, power performance thereof, or the like. In order to support the above case, a new signaling structure and a function thereof are required in addition to the existing method of reporting UE capability.

In an embodiment of the disclosure, in a specific case, the terminal may have a higher UE capability than the static UE capability that has already been reported by the terminal. For example, in the case of a foldable terminal, if the performance of the terminal is a static UE capability when the display is folded, the performance of the terminal when the display is unfolded may be configured to be higher. That is, a change in the state of the terminal may make a difference in the performance of an antenna and MIMO applied to the terminal, power performance thereof, or the like. In order to support the above case, a new signaling structure and a function thereof are required in addition to the existing method of reporting UE capability.

The embodiment proposes a method in which a terminal in a connection state requests a temporary capability restriction through an RRC message. If a condition required for a temporary change in UE capability is internally satisfied in operation 1*f*-25, the terminal 1*f*-01 may trigger the same. In operation 1*f*-30, the terminal 1*f*-01 requests a temporary capability restriction through an RRC message, such as UE assistance information. The RRC message may include at least one piece of information, which may be requested by the terminal, such as a cause of a request for a temporary UE capability change (e.g., cause values: hardware sharing, interference, overheating, mode change, battery issue, and the like), a band and band combination information to be supported, changes in the physical functions of the terminal (a change in the number of component carriers, a change in the number of MIMO layers, changes in the band and bandwidth information to be supported for each CC, a change in the support power, a change in the frequency range to be supported, and the like), or the like. Detailed items included in the RRC message and a signaling method thereof will be described in more detail in another embodiment later.

When the terminal reports a change in UE capability, if only a UE capability in which the temporary change is smaller than the static UE capability is reported, only a subset of the static UE capability can always be reported. That is, this is a request for temporarily having some reduced capability of the overall static UE capability. However, if it is possible to report a UE capability in which the temporary change is higher than the static UE capability, a new UE capability higher than the UE capability reported in the previous static report must be signaled.

In addition, a prohibit timer 1*f*-35 for prohibiting a request for a change in UE capability may be configured in order to prevent the terminal 1*f*-01 from repeating or re-requesting the temporary capability restriction within a specific time after requesting the temporary capability restriction using an RRC message, and an application period of the requested UE capability may be guaranteed for a specific time according thereto. If the prohibit timer is not configured, the terminal 1f-01 may frequently transmit UE capability reports, which makes it difficult for the base station 1f-02 to perform scheduling and management with respect to the terminal 1f-01. The prohibit timer 1f-35 may be configured to be included in msg 4 during an RRC connection procedure, and may be included in an RRC reconfiguration message. Alternatively, the prohibit timer 1f-35 may be configured as a default value according to internal settings of the terminal, or may be obtained from system information.

In operation 1f-40, the base station 1f-02 stores the temporary capability restriction information received from the terminal 1f-01 and determines whether or not to reflect the same. In this case, the received information is managed only in an access stratum (AS) area, instead of transmitting the same to the 5G CN. In an embodiment of the disclosure, the base station 1f-02 does not transmit a separate confirm/reject message after receiving the RRC message including the temporary capability restriction from the terminal 1f-01. If the base station 1f-02 is to reflect the temporary capability restriction from the terminal 1f-01, the base station 1f-02 may reflect the temporary capability restriction, thereby transmitting new RRC configuration information to the terminal 1f-01 through an RRC reconfiguration message in operation 1f-45. Alternatively, the base station 1f-02 may omit operation 1f-45 without reflecting the temporary capability restriction even in the state in which the temporary capability restriction is received from the terminal 1f-01. That is, the base station 1f-02 maintains the RRC configuration (RRC reconfiguration) based on the UE capability received in the previous operation 1f-10. The terminal 1f-01 receiving the RRC reconfiguration from the base station 1f-02 in operation 1f-45 transmits information indicating that the RRC reconfiguration has been received to the base station 1f-02 through an RRC reconfiguration complete message for the configuration (operation 1f-50).

If the terminal 1f-01 needs to release the temporary change of the UE capability in the state in which the temporarily changed UE capability is reflected through the above process of temporarily changing the UE capability and the RRC reconfiguration according thereto (operation 1f-55), the terminal 1f-01 informs the base station 1f-02 that the temporary change in the UE capability has been completed and that the terminal has returned to the original static UE capability through a temporary capability restriction release message in operation 1f-60. Upon receiving the RRC message, the base station 1f-02 may transmit, to the terminal 1f-01, a release response RRC message indicating that the corresponding release message has been received in operation 1f-65. In operation 1f-70, the base station 1f-02 may determine that the terminal 1f-01 has returned to the static UE capability, and may then transmit a new RRC reconfiguration message. Alternatively, the release response message in operation 1f-65 may be omitted. That is, if the temporary capability restriction release message is received in operation 1f-60, the base station 1f-02 may transmit a new RRC reconfiguration message to the terminal 1f-01, instead of responding thereto.

In addition to the case in which the terminal 1f-01 explicitly requests the release of the temporary UE capability change as described above, the base station 1f-02 may identify a temporary capability change of the terminal in the following cases. The following conditions may be simultaneously applied to the terminal 1f-01.

1. The case in which a terminal explicitly requests a release of a temporary restriction
2. The case in which a terminal previously instructs a request for a new temporary restriction
3. The case in which a terminal switches to an RRC idle state or an RRC inactive state. The terminal may switch to an RRC idle state or an RRC inactive state, based on a timer, according to request by a base station, or according to request by a terminal.
4. The case in which a retention period of the temporary capability restriction of the terminal is configured by providing a separate timer and in which the timer expires (the timer may be included in the RRC reconfiguration transmitted to the terminal. In addition, a plurality of timers may be configured depending on the situation. For example, the timer may be configured to be different depending on cause values of the temporary UE capability restriction, or may be configured to have different values for each terminal in an RRC connection state, an idle state, and an inactive state). If the terminal requests an extension of the configured timer value, the terminal may request a timer desired to be extended in a manner using UE assistance information, a new RRC message, or MAC CE.

Figure 7:
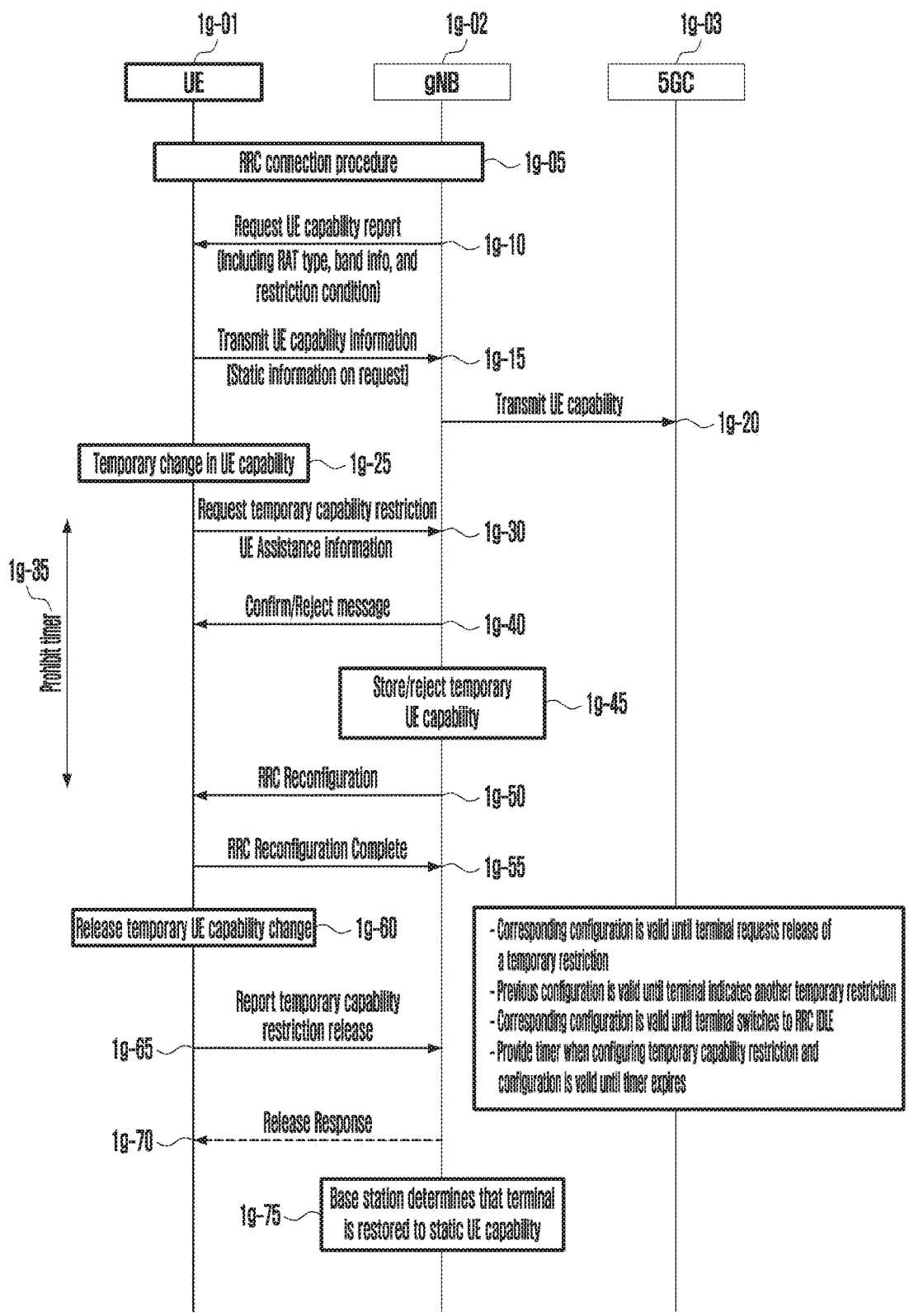
FIG. 7 is a diagram illustrating a method of a terminal in an RRC connection state requesting a temporary change in UE capability according to an embodiment of the disclosure.

FIG. 7 is a diagram illustrating a method of a terminal in an RRC connection state requesting a temporary change in UE capability according to an embodiment of the disclosure.

Referring to FIG. 7, in particular, after requesting a temporary UE capability restriction, a terminal receives an acceptance/rejection message of the base station, thereby determining whether or not to apply a request for a temporary UE capability change of the terminal.

In order to connect to a base station 1g-02, a terminal 1g-01 performs an RRC connection procedure including random access, thereby switching to an RRC connection state (1g-05). The terminal 1g-01 in the RRC connection state receives a request for reporting UE capability from the base station 1g-02 in operation 1g-05. In the above operation, a plurality of "UE-CapabilityRAT-Requests" may be transmitted using "UECapabilityEnquiry", or a request for a report with respect to one RAT type may be transmitted. If a plurality of "UE-CapabilityRAT-Requests" is transmitted using "UECapabilityEnquiry" in the above operation, the terminal 1g-01 configures a UE capability, based on the priority according to the RAT type request. For example, the terminal 1g-01 configures a UE capability container according to the following priority in LTE.

ue-CapabilityRAT-Container for nr
ue-CapabilityRAT-Container for eutra-nr
ue-CapabilityRAT-Container for eutra If content of MR-DC is determined, reporting of another RAT type has a priority value, and the terminal 1g-01 must make a report according thereto.

In operation 1g-15, the terminal 1g-01 transmits, to the base station 1g-02, "UECapabilityInformation" message including the UE capability information configured according to the priority in the container thereof. The message is transmitted to the base station 1g-02 through an RRC message, and includes static UE capability for the RAT type, band information, or the like, which are requested from the base station 1g-02. Although the terminal 1g-01 may adjust implementation of the UE capability for the requested RAT type and band information and report the same, the terminal 1g-01 basically transmits static information on the terminal in this operation. This is due to the fact that information necessary to return to the previous static UE capability is required in the case where a temporary capability restriction request, which is reported later, expires.

In operation 1g-20, the base station 1g-02 transmits the UE capability information received from the terminal 1g-01 to a 5G CN 1g-03, and the 5G CN 1g-03 stores the received static UE capability information. The UE capability information stored in the 5G CN 1g-03 in the above operation may be maintained until the RRC connection of the terminal 1g-01 is released, and may be used for traffic configuration and mobility management with respect to the terminal 1g-01.

In an embodiment of the disclosure, the UE capability is statically transmitted to the base station 1g-02 and the 5G CN 1g-03, and if there is no separate signaling, the inherent capability of the terminal 1g-01 remains. However, in the case of an actual terminal 1g-01, the UE capability may need to be temporarily changed due to the four reasons described above and other reasons. That is, a temporary change in the UE capability different from the performance of the static terminal may be generated/required due to sharing hardware with other communication modules in the terminal 1g-01, interference therewith, temporary heating, change of a terminal mode, and the like. In general, in the case where the UE capability is temporarily reduced, compared to the static UE capability, the terminal 1g-01 needs to report the same to the base station 1g-02 to make a request for scheduling and management conforming to the reduced UE capability. However, in a specific case, the terminal 1g-01 may have a UE capability higher than the static UE capability that has already been reported by the terminal 1g-01.

For example, in the case of a foldable terminal, if the performance of the terminal is a static UE capability when the display is folded, the performance of the terminal in the state in which the display is unfolded may be configured to be higher. That is, a change in the state of the terminal may make a difference in the performance of an antenna and MIMO applied to the terminal, power performance thereof, or the like. In order to support the above case, a new signaling structure and a function thereof are required in addition to the existing method of reporting UE capability.

The embodiment proposes a method in which a terminal in a connection state requests a temporary capability restriction through an RRC message. If a condition required for a temporary change in UE capability is internally satisfied in operation 1g-25, the terminal 1g-01 may trigger the same. In operation 1g-30, the terminal 1g-01 requests a temporary capability restriction through an RRC message, such as UE assistance information. The RRC message may include at least one piece of information, which may be requested by the terminal, such as a cause of a request for a temporary change in UE capability (e.g., cause values: hardware sharing, interference therewith, overheating, mode change, and the like), a band and band combination information to be supported, changes in the physical functions of the terminal (a change in the number of component carriers, a change in the number of MIMO layers, changes in the band and bandwidth information to be supported for each CC, a change in the support power, a change in the frequency range to be supported, and the like), or the like. Detailed items included in the RRC message and a signaling method thereof will be described in more detail in another embodiment below.

When the terminal reports the change in UE capability, if only a UE capability in which the temporary change is smaller than the static UE capability is reported, only a subset of the static UE capability can always be reported. That is, this is a request for temporarily having some reduced capability of the overall static UE capability. However, if it is possible to report a UE capability in which the temporary change is higher than the static UE capability, a new UE capability higher than the UE capability reported in the previous static report must be signaled.

In addition, a prohibit timer 1g-35 for prohibiting a request for a change in UE capability may be configured in order to prevent the terminal from repeating or re-requesting the temporary capability restriction within a specific time after requesting the temporary capability restriction using an RRC message, and an application period of the requested UE capability may be guaranteed for a specific time according thereto. If the prohibit timer is not configured, the terminal 1g-01 may frequently transmit UE capability reports, which makes it difficult for the base station 1g-02 to perform scheduling and management with respect to the terminal 1g-01. The prohibit timer 1g-35 may be configured to be included in msg 4 during an RRC connection procedure, and may be included in an RRC reconfiguration message. Alternatively, the prohibit timer 1g-35 may be configured as a default value according to internal settings of the terminal, or may be obtained from system information.

Thereafter, the base station 1g-02 may transmit a temporary capability restriction confirm/reject message in response to the temporary capability restriction request message. If the base station 1g-02 accepts the temporary capability restriction request from the terminal 1g-01, the base station 1g-02 transmits a confirm message, and if the base station 1g-02 rejects the temporary capability restriction request, the base station 1g-02 transmits a reject message. Both the messages may be transmitted using RRC messages.

In operation 1g-45, the base station 1g-02 stores or does not reflect the temporary capability restriction information received from the terminal 1g-01 according to whether or not the temporary capability restriction determined in the operation is reflected. The base station 1g-02 manages the received information only in an access stratum (AS) area, instead of transmitting the same to the 5G CN 1g-03. According to an embodiment of the disclosure, a separate confirm/reject message is transmitted after receiving an RRC message including the temporary capability restriction from the terminal 1g-01.

In operation 1g-50, the base station 1g-02 may reflect the temporary capability restriction, thereby transmitting new RRC configuration information to the terminal 1g-01 through an RRC reconfiguration message. However, if the base station 1g-02 rejects the temporary capability restriction request from the terminal 1g-01 (if the base station 1g-02 transmits a reject message in operation 1g-40), the base station 1g-02 may omit operation 1g-50 without reflecting the temporary capability restriction. That is, the base station 1g-02 maintains the RRC configuration (RRC reconfiguration) based on the UE capability received in the previous operation 1g-10. The terminal 1g-01 receiving the RRC reconfiguration from the base station 1g-02 in operation 1g-50 transmits information indicating that the RRC reconfiguration has been received to the base station 1g-02 through an RRC reconfiguration complete message for the configuration (operation 1g-55).

If the terminal 1g-01 needs to release the temporary change of the UE capability in the state in which the temporarily changed UE capability is reflected through the above process of temporarily changing the UE capability and the RRC reconfiguration according thereto (operation 1g-60), the terminal 1g-01 informs the base station 1g-02 that the temporary change in the UE capability has been completed and that the terminal has returned to the original static UE capability through a temporary capability restriction release message in operation 1g-65. Upon receiving the RRC message, the base station 1g-02 may transmit, to the terminal 1g-01, a release response RRC message indicating that the corresponding release message has been received in operation 1g-70.

In operation 1g-75, the base station 1g-02 may determine that the terminal 1g-01 has returned to the static UE capability, and may then transmit a new RRC reconfiguration message to the terminal 1g-01. Alternatively, the release response message in operation 1g-70 may be omitted. That is, if the base station 1g-02 receives the temporary capability restriction release message in operation 1g-65, the base station 1g-02 may transmit a new RRC reconfiguration message to the terminal 1g-01, instead of responding thereto.

In addition to the case in which the terminal 1g-01 explicitly requests a release of the temporary UE capability change as described above, the base station 1g-02 may identify a temporary capability change of the terminal in the following cases. The following conditions may be simultaneously applied to the terminal 1g-01.

1. The case in which a terminal explicitly requests a release of a temporary restriction
2. The case in which a terminal previously instructs a request for a new temporary restriction
3. The case in which a terminal switches to an RRC idle state or an RRC inactive state.
4. The case in which a retention period of the temporary capability restriction of the terminal is configured by providing a separate timer and in which the timer expires (the timer may be included in the RRC reconfiguration transmitted to the terminal. In addition, a plurality of timers may be configured depending on the situation. For example, the timer may be configured to be different depending on cause values of the temporary UE capability restriction, or may be configured to have different values for each terminal in an RRC connection state, an idle state, and an inactive state). If the terminal requests an extension of the configured timer value, the terminal may request a timer desired to be extended in a manner using UE assistance information, a new RRC message, or MAC CE.

Figure 8:
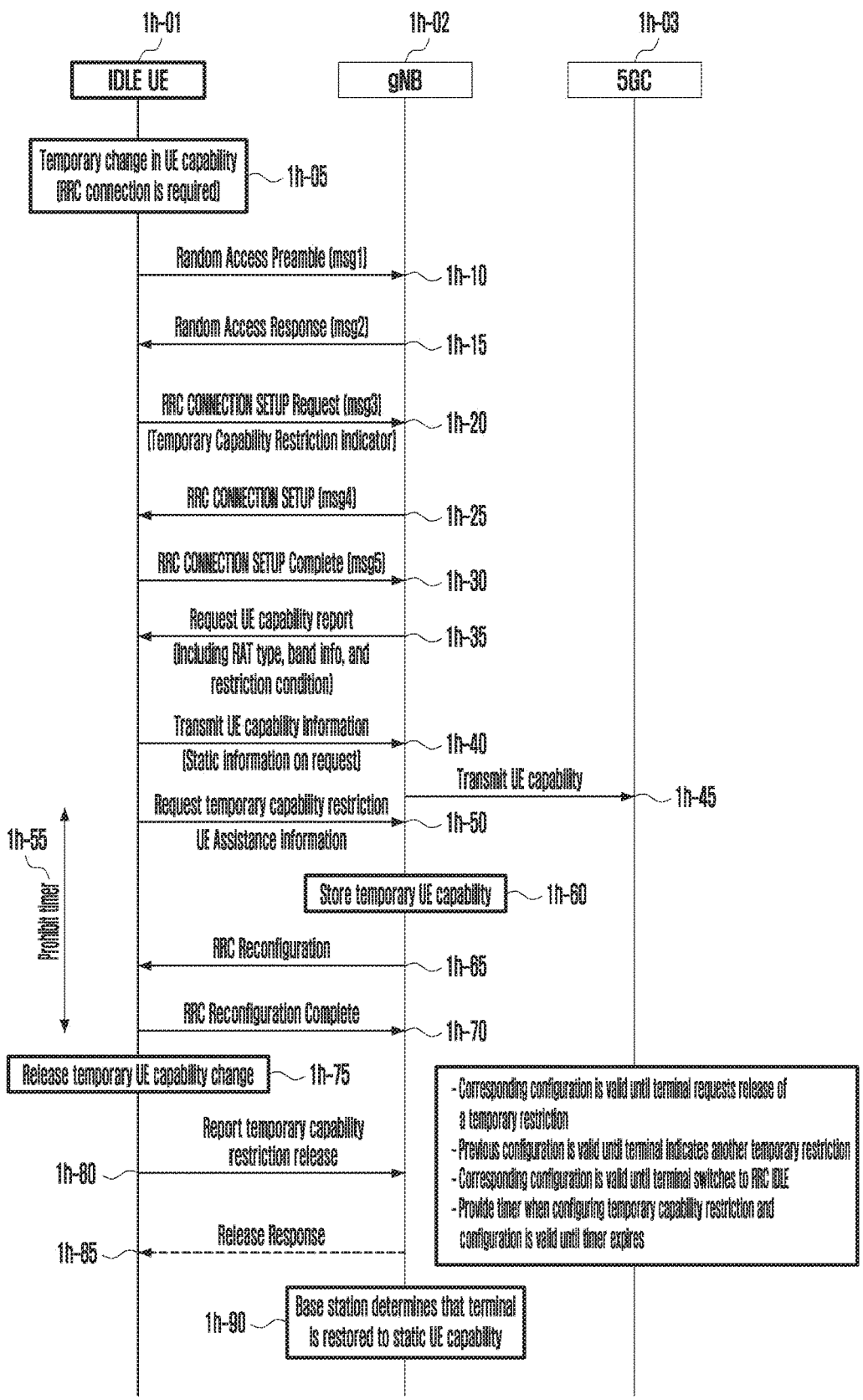
FIG. 8 is a diagram illustrating a method of a terminal in an RRC idle state requesting a temporary change in UE capability according to an embodiment of the disclosure.

FIG. 8 is a diagram illustrating a method of a terminal in an RRC idle state requesting a temporary change in UE capability according to an embodiment of the disclosure.

Referring to FIG. 8, in particular, after a terminal requests a temporary UE capability restriction in the operation of requesting switching from an idle state to a connection state, if the terminal enters an RRC connection state, the terminal requests the content of the temporary UE capability restriction.

A terminal 1h-01 in an RRC idle state may have a temporary change in UE capability in operation 1h-05. In general, the UE capability may change due to sharing hardware with other communication technologies, interference therewith, heating, or the like while the terminal is in connection. However, even in the idle state, the UE capability of the terminal may be affected by the use of other communication technologies, such as WLAN, Bluetooth, or the like, so that management is required in consideration of the same from the initial RRC connection state.

In an embodiment of the disclosure, even if the UE capability is temporarily changed in the idle state, it is not necessary to trigger an RRC connection procedure. Even if the changed UE capability is not reported in the state other than the RRC connection state, it does not affect the configuration by the base station. Therefore, it may be possible to trigger an RRC connection procedure only when a general RRC connection is required (when uplink/downlink data occurs). That is, although a temporary change in UE capability does not trigger the RRC connection procedure, if the RRC connection procedure is triggered for another reason, it is necessary to determine whether or not the terminal currently needs a temporary change in the UE capability, and, if the capability change is necessary, a subsequent procedure reflects the same.

In an embodiment of the disclosure, in order to notify the base station in advance that the UE capability has been temporarily changed in the idle state, the RRC connection procedure may be triggered even when the RRC connection is not necessary.

In general, if there is a static UE capability that the terminal reported to the base station in the previous RRC connection state in the corresponding operation, the base station may receive the UE capability from the CN (UE capability retrieve condition 1), and in this case, the base station may not request the UE capability of the terminal after the RRC connection procedure. However, if the base station fails to retrieve the static UE capability of the terminal (UE capability retrieve condition 2), the base station may request and receive the UE capability of the terminal after the RRC connection procedure. The operation of the base station and the terminal may be different according to the above conditions.

The terminal 1h-01 triggers random access to the base station 1h-02 in operation 1h-10. That is, the terminal 1h-01 transmits a random access preamble (msg 1) to the base station 1h-02 and starts an RRC connection procedure. In an embodiment of the disclosure, it is possible to notify of a temporary capability restriction using a random access preamble (msg 1). At least one of a preamble ID, a time resource, and a frequency resource, which are predefined, may be used. Alternatively, the random access preamble (msg 1) may include an indicator indicating a temporary capability restriction. In operation 1h-15, the terminal 1h-01 receives a random access response (msg 2) from the base station 1h-02 and synchronizes uplink. Thereafter, in operation 1h-20, the terminal 1h-01 may include an indicator indicating a temporary capability restriction in an RRC Connection Setup Request message (msg 3). By including an indicator indicating that there is a change in the UE capability in this operation, the base station may recognize in advance that the terminal 1h-01 will request a temporary capability restriction later.

In the above operation, msg 3 does not include details of the temporary capability restriction because msg 3 is sensitive to size and is not able to contain a large amount of information. For example, msg 3 may be a message, such as RRC Setup Request, RRC Resume Request, RRC Reestablishment Request, or the like. In an LTE system, msg 3 of 56 bits is used, and the minimum uplink grant size is also 56 bits in NR. For reference, msg 3 must have a good link performance within cell coverage because it is a request message to attempt to connect to a network. In addition, as the size of a packet transmitted by the terminal 1h-01 is smaller, the terminal coverage is extended. Therefore, in the case where uplink grants of 56 bits or more are allocated, the performance of cell access coverage may deteriorate. As a result, in the NR system, a separate logical channel identifier (LCID) is further allocated to a MAC header in order to distinguish between an uplink grant of 56 bits for transmission of a common control channel (CCCH) and an uplink grant of 56 bits or more (e.g., 72 bits). However, in the case where a 56-bit uplink grant is allocated, since msg 3 cannot carry and transmit all of 5G-S-TMSI that is increased by 8 bits, compared to SAE-Temporary Mobile Subscriber Identity (S-TMSI) in LTE, msg 3 must transmit a portion of the 5G-S-TMSI, and msg 5 must transmit the remaining portions thereof.

In operation 1h-25, the base station 1h-02 transmits an RRC Connection Setup message (msg 4) to the terminal 1h-01 in response to the received RRC Connection Setup Request message. The message may include a radio bearer configuration for signaling radio bearer (SRB) 1 and a master cell group (MCG) configuration (an RLC bearer, "mac-CellGroupConfig", "physicalCellGroupConfig and spCellConfig", and the like). The message includes general configurations of the base station 1h-02 for SRB 1 in this operation, and the terminal 1h-01 receives msg 4 and transmits an RRC Connection Setup Complete message (msg 5) in response to the configuration of SRB 1 in operation 1h-30.

The message may include a selected public land mobile network (PLMN) ID, a registered access and mobility management function (AMF), a globally unique AMF ID (GUAMI) type, a Single Network Slice Selection Assistance Information (S-NSSAI) list, a NAS message, and the like. Based on the content of msg 5 transmitted from the terminal 1h-01, the base station 1h-02 may retrieve the static capability and context of the terminal from the CN, and if there is no corresponding UE capability or if the base station 1h-02 fails to retrieve the same, the base station 1h-02 may request a report of the UE capability. That is, if UE capability retrieve condition 1 above is satisfied, operations 1h-35, 1h-40, and 1h-45 may be omitted, and operations 1h-35, 1h-40, and 1h-45 may be performed only when UE capability retrieve condition 2 is met.

In operation 1h-35, the terminal 1h-01 may receive a request for reporting UE capability from the base station 1h-02 through an RRC message, and a plurality of "UE-CapabilityRAT-Requests" may be transmitted using "UECapabilityEnquiry" in the message, or a request for a report with respect to one RAT type may be transmitted. If a plurality of "UE-CapabilityRAT-Requests" is transmitted using "UECapabilityEnquiry" in the above operation, the terminal 1h-01 configures a UE capability, based on the priority according to the RAT type request. The request may include band information, a restriction on the report content, and the like. For example, the terminal 1h-01 configures a UE capability container according to the following priority in LTE.

ue-CapabilityRAT-Container for nr
ue-CapabilityRAT-Container for eutra-nr
ue-CapabilityRAT-Container for eutra If content of MR-DC is determined, reporting of another RAT type has a priority value, and the terminal 1h-01 must make a report according thereto.

In operation 1h-40, the terminal 1h-01 transmits, to the base station 1h-02, "UECapabilityInformation" message including the UE capability information configured according to the priority in the container thereof. The message is transmitted to the base station 1h-02 through an RRC message, and includes static UE capability for the RAT type, band information, or the like, which are requested from the base station 1h-02. Although the terminal 1h-01 may adjust implementation of the UE capability for the requested RAT type and band information and report the same, the terminal 1h-01 basically transmits static information on the terminal in this operation. This is due to the fact that information necessary to return to the previous static UE capability is required in the case where a temporary capability restriction request, which is reported later, expires.

In operation 1h-45, the base station 1h-02 transmits the UE capability information received from the terminal 1h-01 to a 5G CN 1h-03, and the 5G CN 1h-03 stores the received static UE capability information. The UE capability information stored in the 5G CN 1h-03 in the above operation may be maintained until the RRC connection of the terminal 1h-01 is released, and may be used for traffic configuration and mobility management with respect to the terminal 1h-01.

Fundamentally, the UE capability is statically transmitted to the base station 1h-02 and the 5G CN 1h-03, and if there is no separate signaling, the inherent capability of the terminal 1h-01 remains. However, in the case of an actual terminal 1h-01, the UE capability may need to be temporarily changed due to the four reasons described above and other reasons. That is, a temporary change in UE capability different from the performance of the static terminal may be generated/required due to sharing hardware with other communication modules in the terminal, interference therewith, temporary heating, change of a terminal mode, and the like. In general, in the case where the UE capability is temporarily reduced, compared to the static UE capability, the terminal needs to report the same to the base station 1h-02 to make a request for scheduling and management conforming to the reduced UE capability. However, in a specific case, the terminal may have a UE capability higher than the static UE capability that has already been reported by the terminal.

For example, in the case of a foldable terminal, if the performance of the terminal is a static UE capability when the display is folded, the performance of the terminal in the state in which the display is unfolded may be configured to be higher. That is, a change in the state of the terminal may make a difference in the performance of an antenna and MIMO applied to the terminal, power performance thereof, or the like. In order to support the above case, a new signaling structure and a function thereof are required in addition to the existing method of reporting UE capability.

The embodiment proposes a method in which a terminal in a connection state requests a temporary capability restriction through an RRC message. In operation 1h-50, the terminal 1h-01 transmits information on a temporary change in UE capability (i.e., temporary capability restriction) and a request for the same through an RRC message, such as UE assistance information. The RRC message may include at least one piece of information, which may be requested by the terminal 1h-01, such as a cause of a request for a temporary change in UE capability (e.g., cause values: hardware sharing, interference, overheating, mode change, and the like), a band and band combination information to be supported, changes in the physical functions of the terminal (a change in the number of component carriers, a change in the number of MIMO layers, changes in the band and bandwidth information to be supported for each CC, a change in the support power, a change in the frequency range to be supported, and the like), or the like. Detailed items included in the RRC message and a signaling method thereof will be described in more detail in another embodiment below.

When the terminal reports the change in UE capability, if only a UE capability in which the temporary change is smaller than the static UE capability is reported, only a subset of the static UE capability can always be reported. That is, this is a request for temporarily having some reduced capability of the overall static UE capability. However, if it is possible to report a UE capability in which the temporary change is higher than the static UE capability, a new UE capability higher than the UE capability reported in the previous static report must be signaled.

In addition, a prohibit timer 1h-55 for prohibiting a request for a change in UE capability may be configured in order to prevent the terminal from repeating or re-requesting the temporary capability restriction within a specific time after requesting the temporary capability restriction using an RRC message, and an application period of the requested UE capability may be guaranteed for a specific time according thereto. If the prohibit timer is not configured, the terminal 1h-01 may frequently transmit UE capability reports, which makes it difficult for the base station 1h-02 to perform scheduling and management with respect to the terminal 1h-01. The prohibit timer 1h-55 may be configured to be included in msg 4 during an RRC connection procedure, and may be included in an RRC reconfiguration message. Alternatively, the prohibit timer 1h-55 may be configured as a default value according to internal settings of the terminal, or may be obtained from system information.

Although not shown, the base station 1h-02 may transmit, to the terminal 1h-01, a temporary capability restriction confirm/reject message in response to the temporary capability restriction request message. If the base station 1h-02 accepts the temporary capability restriction request from the terminal, the base station 1h-02 transmits a confirm message, and if the base station 1h-02 rejects the temporary capability restriction request, the base station 1h-02 transmits a reject message. Both the messages may be transmitted using RRC messages.

In operation 1h-60, the base station 1h-02 stores or does not reflect the temporary capability restriction information received from the terminal 1h-01 according to whether or not the temporary capability restriction determined in the operation is reflected. The base station 1h-02 manages the received information only in an access stratum (AS) area, instead of transmitting the same to the 5G CN 1h-03. In operation 1h-65, the base station 1h-02 may reflect the temporary capability restriction, thereby transmitting new RRC configuration information to the terminal 1h-01 through an RRC reconfiguration message. However, if the base station 1h-02 rejects the temporary capability restriction request received from the terminal 1h-01, the base station 1h-02 may omit operation 1h-65 without reflecting the temporary capability restriction, or may configure RRC configuration, based on the original UE capability. That is, the base station 1h-02 maintains the RRC configuration (RRC reconfiguration) based on the UE capability received in the previous operation. The terminal 1h-01 receiving the RRC reconfiguration from the base station 1h-02 in operation 1h-65 transmits information indicating that the RRC reconfiguration has been received to the base station 1h-02 through an RRC reconfiguration complete message for the configuration (operation 1h-70).

If the terminal 1h-01 needs to release the temporary change of the UE capability in the state in which the temporarily changed UE capability is reflected through the above process of temporarily changing the UE capability and the RRC reconfiguration according thereto (operation 1h-75), the terminal 1h-01 informs the base station 1h-02 that the temporary change in the UE capability has been completed and that the terminal has returned to the original static UE capability through a temporary capability restriction release message in operation 1h-80. Upon receiving the RRC message, the base station 1h-02 may transmit, to the terminal 1h-01, a release response RRC message indicating that the corresponding release message has been received in operation 1h-85.

In operation 1h-90, the base station 1h-02 may determine that the terminal 1h-01 has returned to the static UE capability, and may then transmit a new RRC reconfiguration message to the terminal. Alternatively, the release response message in operation 1h-85 may be omitted. That is, if the base station 1h-02 receives the temporary capability restriction release message in operation 1h-80, the base station 1h-02 may transmit a new RRC reconfiguration message to the terminal 1h-01, instead of responding thereto.

In addition to the case in which the terminal 1h-01 explicitly requests a release of the temporary UE capability change as described above, the base station 1h-02 may identify a temporary capability change of the terminal in the following cases. The following conditions may be simultaneously applied to the terminal 1h-01.

1. The case in which a terminal explicitly requests a release of a temporary restriction
2. The case in which a terminal previously instructs a request for a new temporary restriction
3. The case in which a terminal switches to an RRC idle state or an RRC inactive state.
4. The case in which a retention period of the temporary capability restriction of the terminal is configured by providing a separate timer and in which the timer expires (the timer may be included in the RRC reconfiguration transmitted to the terminal. In addition, a plurality of timers may be configured depending on the situation. For example, the timer may be configured to be different depending on cause values of the temporary UE capability restriction, or may be configured to have different values for each terminal in an RRC connection state, an idle state, and an inactive state). If the terminal requests an extension of the configured timer value, the terminal may request a timer desired to be extended in a manner using UE assistance information, a new RRC message, or MAC CE.

Figure 9:
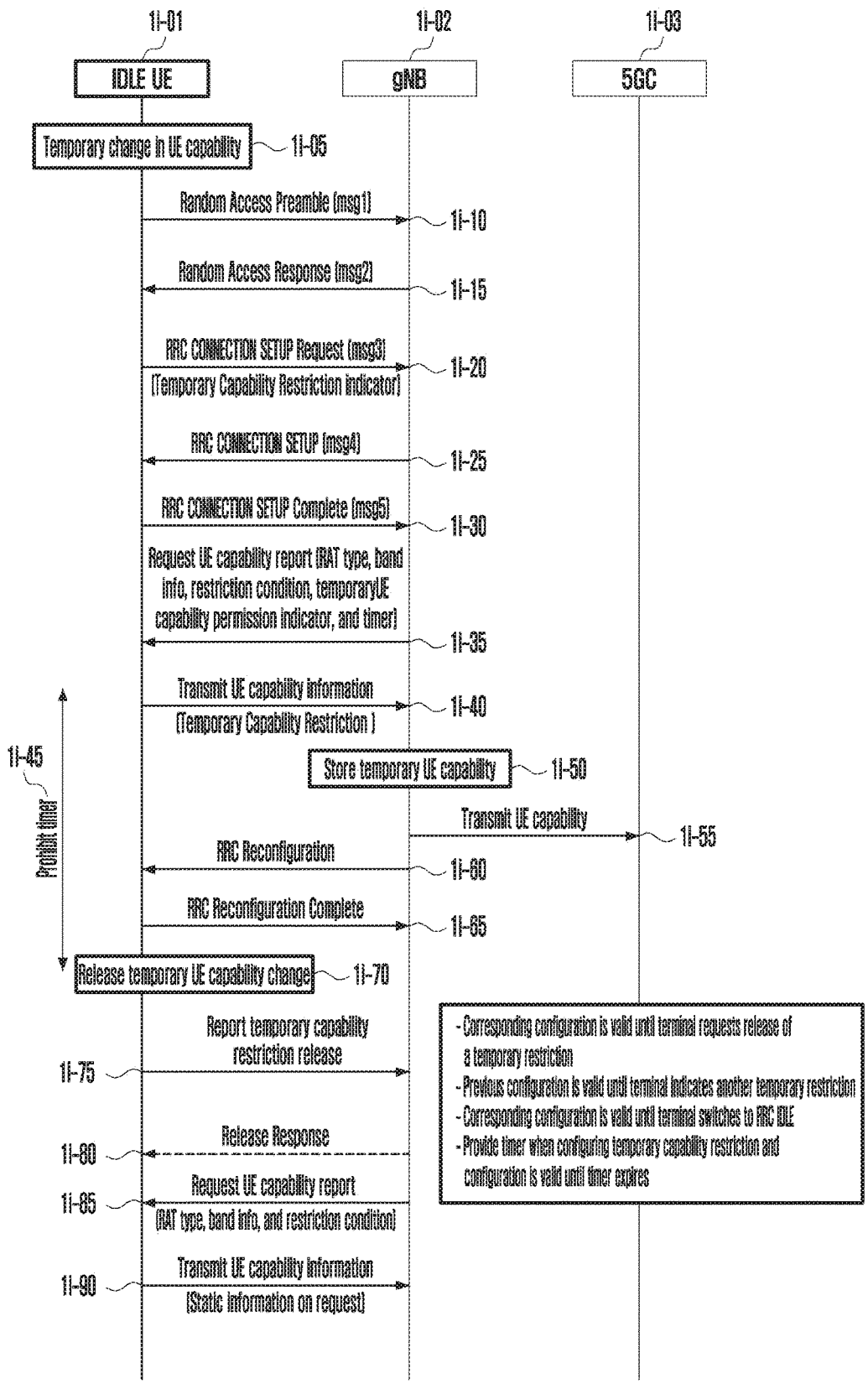
FIG. 9 is a diagram illustrating a method of a terminal in an RRC idle state requesting a temporary change in UE capability according to an embodiment of the disclosure.

FIG. 9 is a diagram illustrating a method of a terminal in an RRC idle state requesting a temporary change in UE capability according to an embodiment of the disclosure.

Referring to FIG. 9, in particular, after a terminal requests a temporary UE capability restriction in the operation of requesting switching from an idle state to a connection state, if the terminal enters an RRC connection state, the terminal requests the content of the temporary UE capability restriction.

A terminal 1i-01 in an RRC idle state may have a temporary change in UE capability in operation 1i-05. In general, the UE capability may change due to sharing hardware with other communication technologies, interference therewith, heating, or the like while the terminal is in connection. However, even in the idle state, the UE capability of the terminal may be affected by the use of other communication technologies, such as WLAN, Bluetooth, or the like, so that management is required in consideration of the same from the initial RRC connection state. In an embodiment of the disclosure, even if the UE capability is temporarily changed in the idle state, it is not necessary to trigger an RRC connection procedure. Even if the changed UE capability is not reported in the state other than the RRC connection state, it does not affect the configuration by the base station. Therefore, it may be possible to trigger an RRC connection procedure only when a general RRC connection is required (when uplink/downlink data occurs). That is, although a temporary change in UE capability does not trigger the RRC connection procedure, if the RRC connection procedure is triggered for another reason, it is necessary to determine whether or not the terminal currently needs a temporary change in the UE capability, and, if the capability change is necessary, a subsequent procedure reflects the same. In an embodiment of the disclosure, in order to notify the base station in advance that the UE capability has been temporarily changed in the idle state, the RRC connection procedure may be triggered even when the RRC connection is not necessary.

In general, if there is a static UE capability that the terminal reported to the base station in the previous RRC connection state in the corresponding operation, the base station may receive the UE capability from the CN (UE capability retrieve condition 1), and in this case, the base station may not request the UE capability of the terminal after the RRC connection procedure. However, if the base station fails to retrieve the static UE capability of the terminal (UE capability retrieve condition 2), the base station may request and receive the UE capability of the terminal after the RRC connection procedure. The operation of the base station and the terminal may be different according to the above conditions.

The terminal 1i-01 triggers random access to the base station 1i-02 in operation 1i-10. That is, the terminal 1i-01 transmits a random access preamble (msg 1) to the base station 1i-02 and starts an RRC connection procedure. In an embodiment of the disclosure, it is possible to notify of a temporary capability restriction using a random access preamble (msg 1). At least one of a preamble ID, a time resource, and a frequency resource, which are predefined, may be used. Alternatively, the random access preamble (msg 1) may include an indicator indicating a temporary capability restriction. In operation 1i-15, the terminal 1i-01 receives a random access response (msg 2) from the base station 1i-02 and synchronizes uplink. Thereafter, in operation 1i-20, the terminal 1i-01 may include an indicator indicating a temporary capability restriction in an RRC Connection Setup Request message (msg 3). By including an indicator indicating that there is a change in the UE capability in this operation, the base station may recognize in advance that the terminal 1i-01 will request a temporary capability restriction later.

In the above operation, msg 3 does not include details of the temporary capability restriction because msg 3 is sensitive to size and is not able to contain a large amount of information. For example, msg 3 may be a message, such as RRC Setup Request, RRC Resume Request, RRC Reestablishment Request, or the like. In an LTE system, msg 3 of 56 bits is used, and the minimum uplink grant size is also 56 bits in NR. For reference, msg 3 must have a good link performance within cell coverage because it is a request message to attempt to connect to a network. In addition, as the size of a packet transmitted by the terminal 1i-01 is smaller, the terminal coverage is extended. Therefore, in the case where uplink grants of 56 bits or more are allocated, the performance of cell access coverage may deteriorate. As a result, in the NR system, a separate logical channel identifier (LCID) is further allocated to a MAC header in order to distinguish between an uplink grant of 56 bits for transmission of a common control channel (CCCH) and an uplink grant of 56 bits or more (e.g., 72 bits). However, in the case where a 56-bit uplink grant is allocated, since msg 3 cannot carry and transmit all of 5G-S-TMSI that is increased by 8 bits, compared to S-TMSI in LTE, msg 3 must transmit a portion of the 5G-S-TMSI, and msg 5 must transmit the remaining portions thereof.

In operation 1i-25, the base station 1i-02 transmits an RRC Connection Setup message (msg 4) in response to the received RRC Connection Setup Request message. The message may include a radio bearer configuration for SRB 1 and an MCG configuration (an RLC bearer, "mac-CellGroupConfig", "physicalCellGroupConfig and spCellConfig", and the like). The message includes general configurations of the base station 1i-02 for SRB 1 in this operation, and the terminal 1i-01 receives msg 4 and transmits an RRC Connection Setup Complete message (msg 5) in response to the configuration of SRB 1 in operation 1i-30. The message may include at least one of a selected PLMN ID, a registered AMF, a globally unique AMF ID (GUAMI) type, a Single Network Slice Selection Assistance Information (S-NSSAI) list, a NAS message, and the like. Based on the content of msg 5 transmitted from the terminal 1i-01, the base station 1i-02 may retrieve the static capability and context of the terminal from the CN, and if there is no corresponding UE capability or if the base station 1i-02 fails to retrieve the same, the base station 1i-02 may request a report of the UE capability. That is, if UE capability retrieve condition 1 above is satisfied, operations 1i-35, 1i-40, and 1i-45 may be omitted, and operations 1i-35, 1i-40, and 1i-45 may be performed only when UE capability retrieve condition 2 is met.

In operation 1i-35, the terminal 1i-01 may receive a request for reporting UE capability from the base station 1i-02 through an RRC message. A plurality of "UE-CapabilityRAT-Requests" may be transmitted using "UECapabilityEnquiry" in the message, or a request for a report with respect to one RAT type may be transmitted. If a plurality of "UE-CapabilityRAT-Requests" is transmitted using "UECapabilityEnquiry" in the above operation, the terminal 1i-01 configures a UE capability, based on the priority according to the RAT type request. The request may include band information, a restriction on the report content, and the like. For example, the terminal 1i-01 configures a UE capability container according to the following priority in LTE.

ue-CapabilityRAT-Container for nr
ue-CapabilityRAT-Container for eutra-nr
ue-CapabilityRAT-Container for eutra If content of MR-DC is determined, reporting of another RAT type has a priority value, and the terminal 1i-01 must make a report according thereto. In the above operation, since the base station 1i-02 is aware that the terminal 1i-01 has a temporary change in the UE capability by receiving information indicating the same in operation 1i-20, the base station 1i-02 may instruct the terminal 1i-01 to report the temporary UE capability. That is, it may include a 1-bit indicator or restriction information that may be reported by reflecting the changed capability. For example, signaling indicating that permission is allowed only for the restriction on MIMO, the restriction on the number of CCs, and the like may be included. In addition, prohibit timer information may be included.

In operation 1i-40, the terminal 1i-01 transmits, to the base station 1i-02, "UECapabilityInformation" message including the information on the temporarily changed UE capability, which is configured according to the priority, based on the request of the base station, in the container thereof. The message may be transmitted to the base station 1i-02 through an RRC message, or may be transmitted using a new message, such as UE assistance information or the like.

A prohibit timer 1i-45 for prohibiting a request for a change in UE capability may be configured in order to prevent the terminal 1i-01 from repeating or re-requesting the temporary capability restriction within a specific time after requesting the temporary capability restriction using an RRC message, and an application period of the requested UE capability may be guaranteed for a specific time according thereto. If the prohibit timer is not configured, the terminal 1*i*-01 may frequently transmit UE capability reports, which makes it difficult for the base station 1*i*-02 to perform scheduling and management with respect to the terminal. The prohibit timer 1*i*-45 may be configured to be included in msg4 during an RRC connection procedure, and may be included in an RRC reconfiguration message. Alternatively, the prohibit timer 1*i*-45 may be configured as a default value according to internal settings of the terminal, or may be obtained from system information. Although not shown, the base station 1*i*-02 may transmit a temporary capability restriction confirm/reject message in response to the temporary capability restriction request message. If the base station 1*i*-02 accepts the temporary capability restriction request from the terminal, the base station 1*i*-02 transmits a confirm message, and if the base station 1*i*-02 rejects the temporary capability restriction request, the base station 1*i*-02 transmits a reject message. Both the messages may be transmitted using RRC messages.

In operation 1*i*-50, the base station 1*i*-02 stores or does not reflect the temporary capability restriction information received from the terminal 1*i*-01 according to whether or not the temporary capability restriction determined in the operation is reflected. The base station 1*i*-02 manages the received information only in an access stratum (AS) area, instead of transmitting the same to the 5G CN 1*i*-03. However, in an embodiment of the disclosure, if there is no UE capability stored in the 5G CN 1*i*-03 (UE capability retrieve condition 2), the terminal information may be transmitted to the 5G CN 1*i*-03 (operation 1*i*-55). Thereafter, in the case where the terminal 1*i*-01 reports static UE capability information, the corresponding information is overridden by a new static UE capability.

In operation 1*i*-60, the base station 1*i*-02 may reflect the temporary capability restriction, thereby transmitting new RRC configuration information to the terminal 1*i*-01 through an RRC reconfiguration message. However, if the base station 1*i*-02 rejects the temporary capability restriction request received from the terminal 1*i*-01, the base station 1*i*-02 may omit operation 1*i*-60 without reflecting the temporary capability restriction, or may configure RRC reconfiguration, based on the original UE capability. That is, the base station 1*i*-02 maintains the RRC configuration (RRC reconfiguration) based on the UE capability received in the previous operation. The terminal 1*i*-01 receiving the RRC reconfiguration from the base station 1*i*-02 in operation 1*i*-60 transmits information indicating that the RRC reconfiguration has been received to the base station 1*i*-02 through an RRC reconfiguration complete message for the configuration (operation 1*i*-65).

If the terminal 1*i*-01 needs to release the temporary change of the UE capability in the state in which the temporarily changed UE capability is reflected through the above process of temporarily changing the UE capability and the RRC reconfiguration according thereto (operation 1*i*-70), the terminal 1*i*-01 informs the base station 1*i*-02 that the temporary change in the UE capability has been completed and that the terminal has returned to the original static UE capability through a temporary capability restriction release message in operation 1*i*-75. Upon receiving the RRC message, the base station 1*i*-02 may transmit, to the terminal 1*i*-01, a release response RRC message indicating that the corresponding release message has been received in operation 1*i*-80. In addition, in operation 1*i*-85, the base station 1*i*-02 may determine that the terminal 1*i*-01 has returned to the static UE capability, and may then transmit a new RRC reconfiguration message to the terminal, or may request a new static UE capability. Alternatively, the release response message in operation 1*i*-80 may be omitted. That is, if the base station 1*i*-02 receives the temporary capability restriction release message in operation 1*i*-80, the base station 1*i*-02 may transmit a new RRC reconfiguration message, instead of responding thereto. The terminal 1*i*-01 receiving the UE capability request in operation 1*i*-85 transmits the corresponding information to the base station 1*i*-02 by including the relevant static UE capability therein in operation 1*i*-90. The base station 1*i*-02 may store the UE capability, and may transmit the same to the CN.

In addition to the case in which the terminal 1*i*-01 explicitly requests a release of the temporary UE capability change as described above, the base station 1*i*-02 may identify a temporary capability change of the terminal in the following cases. The following conditions may be simultaneously applied to the terminal 1*i*-01.

1. The case in which a terminal explicitly requests a release of a temporary restriction
2. The case in which a terminal previously instructs a request for a new temporary restriction
3. The case in which a terminal switches to an RRC idle state or an RRC inactive state.
4. The case in which a retention period of the temporary capability restriction of the terminal is configured by providing a separate timer and in which the timer expires (the timer may be included in the RRC reconfiguration transmitted to the terminal. In addition, a plurality of timers may be configured depending on the situation. For example, the timer may be configured to be different depending on cause values of the temporary UE capability restriction, or may be configured to have different values for each terminal in an RRC connection state, an idle state, and an inactive state). If the terminal requests an extension of the configured timer value, the terminal may request a timer desired to be extended in a manner using UE assistance information, a new RRC message, or MAC CE.

Figure 10:
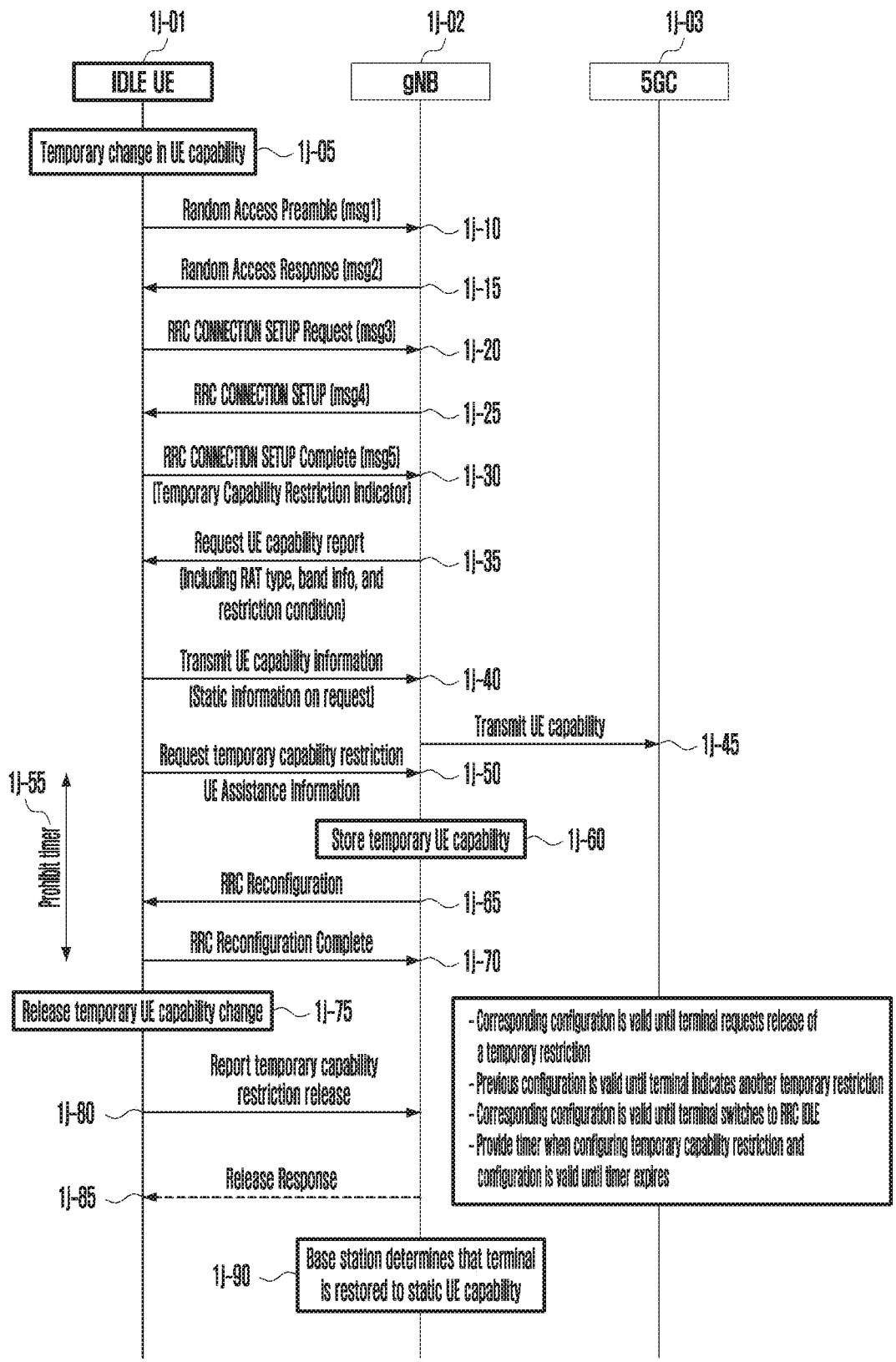
FIG. 10 is a diagram illustrating a method of a terminal in an RRC idle state requesting a temporary change in UE capability according to an embodiment of the disclosure.

FIG. 10 is a diagram illustrating a method a terminal in an RRC idle state requesting a temporary change in UE capability according to an embodiment of the disclosure.

Referring to FIG. 10, in particular, in the case where a terminal requests a temporary UE capability restriction in the operation of requesting switching from an idle state to a connection state, the terminal makes a request by including a corresponding indicator in msg 5 and transmits the content of change in the UE capability in a connection state.

A terminal 1*j*-01 in an RRC idle state may have a temporary change in UE capability in operation 1*j*-05. In general, the UE capability may change due to sharing hardware with other communication technologies, interference therewith, heating, or the like while the terminal is in connection. However, even in the idle state, the UE capability of the terminal may be affected by the use of other communication technologies, such as WLAN, Bluetooth, or the like, so that management is required in consideration of the same from the initial RRC connection state. In an embodiment of the disclosure, even if the UE capability is temporarily changed in the idle state, it is not necessary to trigger an RRC connection procedure. Even if the changed UE capability is not reported in the state other than the RRC connection state, it does not affect the configuration by the base station. Therefore, it may be possible to trigger an RRC connection procedure only when a general RRC connection is required (when uplink/downlink data occurs). That is, although a temporary change in UE capability does not trigger the RRC connection procedure, if the RRC connection procedure is triggered for another reason, it is necessary to determine whether or not the terminal currently needs a temporary change in the UE capability, and, if the capability change is necessary, a subsequent procedure reflects the same. In an embodiment of the disclosure, in order to notify the base station in advance that the UE capability has been temporarily changed in the idle state, the RRC connection procedure may be triggered even when the RRC connection is not necessary.

In general, if there is a static UE capability that the terminal reported to the base station in the previous RRC connection state in the corresponding operation, the base station may receive the UE capability from the CN (UE capability retrieve condition 1), and in this case, the base station may not request the UE capability of the terminal after the RRC connection procedure. However, if the base station fails to retrieve the static UE capability of the terminal (UE capability retrieve condition 2), the base station may request and receive the UE capability of the terminal after the RRC connection procedure. The operation of the base station and the terminal may be different according to the above conditions.

The terminal 1j-01 triggers random access to the base station 1j-02 in operation 1j-10. That is, the terminal 1j-01 transmits a random access preamble (msg 1) to the base station 1j-02 and starts an RRC connection procedure. In an embodiment of the disclosure, it is possible to notify of a temporary capability restriction using a random access preamble (msg 1). At least one of a preamble ID, a time resource, and a frequency resource, which are predefined, may be used. Alternatively, the random access preamble (msg 1) may include an indicator indicating a temporary capability restriction. In operation 1j-15, the terminal 1j-01 receives a random access response (msg 2) from the base station 1j-02 and synchronizes uplink. Thereafter, in operation 1j-20, the terminal 1j-01 may transmit an RRC Connection Setup Request message (msg 3) to the base station 1j-02.

In the above operation, msg 3 does not include details of the temporary capability restriction because msg 3 is sensitive to size and is not able to contain a large amount of information. For example, msg 3 may be a message, such as RRC Setup Request, RRC Resume Request, RRC Reestablishment Request, or the like. In an LTE system, msg 3 of 56 bits is used, and the minimum uplink grant size is also 56 bits in NR. For reference, msg 3 must have a good link performance within cell coverage because it is a request message to attempt to connect to a network. In addition, as the size of a packet transmitted by the terminal 1j-01 is smaller, the terminal coverage is extended. Therefore, in the case where uplink grants of 56 bits or more are allocated, the performance of cell access coverage may deteriorate. As a result, in the NR system, a separate logical channel identifier (LCID) is further allocated to a MAC header in order to distinguish between an uplink grant of 56 bits for transmission of a CCCH and an uplink grant of 56 bits or more (e.g., 72 bits). However, in the case where a 56-bit uplink grant is allocated, since msg 3 cannot carry and transmit all of 5G-S-TMSI that is increased by 8 bits, compared to S-TMSI in LTE, msg 3 must transmit a portion of the 5G-S-TMSI, and msg 5 must transmit the remaining portions thereof.

In operation 1j-25, the base station 1j-02 transmits an RRC Connection Setup message (msg 4) in response to the received RRC Connection Setup Request message. The message may include a radio bearer configuration for SRB 1 and an MCG configuration (an RLC bearer, "mac-CellGroupConfig", "physicalCellGroupConfig and spCellConfig", and the like). The message includes general configurations of the base station 1j-02 for SRB 1 in this operation, and the terminal 1j-01 receives msg 4 and transmits an RRC Connection Setup Complete message (msg 5) in response to the configuration of SRB 1 in operation 1j-30. The message may include at least one of a selected PLMN ID, a registered AMF, a globally unique AMF ID (GUAMI) type, a Single Network Slice Selection Assistance Information (S-NSSAI) list, a NAS message, and the like. According to an embodiment of the disclosure, the message may include a temporary capability restriction indicator. That is, since the message includes an indicator indicating that the terminal 1j-01 has a temporary change in the UE capability, the base station 1j-02 may recognize the same.

Based on the content of msg 5 transmitted from the terminal 1j-01, the base station 1j-02 may retrieve the static capability and context of the terminal from the CN, and if there is no corresponding UE capability or if the base station 1j-02 fails to retrieve the same, the base station 1j-02 may request a report of the UE capability. That is, if UE capability retrieve condition 1 above is satisfied, operations 1j-35, 1j-40, and 1j-45 may be omitted, and operations 1j-35, 1j-40, and 1j-45 may be performed only when UE capability retrieve condition 2 is met.

In operation 1j-35, the terminal 1j-01 may receive a request for reporting UE capability from the base station 1j-02 through an RRC message. A plurality of "UE-CapabilityRAT-Requests" may be transmitted using "UECapabilityEnquiry" in the message, or a request for a report with respect to one RAT type may be transmitted. If a plurality of "UE-CapabilityRAT-Requests" is transmitted using "UECapabilityEnquiry" in the above operation, the terminal 1j-01 configures a UE capability, based on the priority according to the RAT type request. The request may include band information, a restriction on the report content, and the like. For example, the terminal 1j-01 configures a UE capability container according to the following priority in LTE.

ue-CapabilityRAT-Container for nr
ue-CapabilityRAT-Container for eutra-nr
ue-CapabilityRAT-Container for eutra If content of MR-DC is determined, reporting of another RAT type has a priority value, and the terminal 1j-01 must make a report according thereto.

In operation 1j-40, the terminal 1j-01 transmits, to the base station 1j-02, "UECapabilityInformation" message including the UE capability information configured according to the priority in the container thereof. The message is transmitted to the base station 1j-02 through an RRC message, and includes static UE capability for the RAT type, band information, or the like, which are requested from the base station 1j-02. Although the terminal 1j-01 may adjust implementation of the UE capability for the requested RAT type and band information and report the same, the terminal basically transmits static information on the terminal in this operation. This is due to the fact that information necessary to return to the previous static UE capability is required in the case where a temporary UE capability restriction request, which is reported later, expires.

In operation 1j-45, the base station 1j-02 transmits the UE capability information received from the terminal 1j-01 to a 5G CN 1j-03, and the 5G CN 1j-03 stores the received static UE capability information. The UE capability information stored in the 5G CN 1j-03 in the above operation may be maintained until the RRC connection of the terminal 1j-01 is released, and may be used for traffic configuration and mobility management with respect to the terminal.

Fundamentally, the UE capability is statically transmitted to the base station 1j-02 and the 5G CN 1j-03, and if there is no separate signaling, the inherent capability of the terminal 1*j*-01 remains. However, in the case of an actual terminal 1*j*-01, the UE capability may need to be temporarily changed due to the four reasons described above and other reasons. That is, a temporary change in UE capability different from the performance of the static terminal may be generated/required due to sharing hardware with other communication modules in the terminal, interference therewith, temporary heating, change of a terminal mode, and the like. In general, in the case where the UE capability is temporarily reduced, compared to the static UE capability, the terminal needs to report the same to the base station to make a request for scheduling and management conforming to the reduced UE capability. However, in a specific case, the terminal may have a UE capability higher than the static UE capability that has already been reported by the terminal. For example, in the case of a foldable terminal, if the performance of the terminal is a static UE capability when the display is folded, the performance of the terminal in the state in which the display is unfolded may be configured to be higher. That is, a change in the state of the terminal may make a difference in the performance of an antenna and MIMO applied to the terminal, power performance thereof, or the like. In order to support the above case, a new signaling structure and a function thereof are required in addition to the existing method of reporting UE capability.

The embodiment proposes a method in which a terminal in a connection state requests a temporary capability restriction through an RRC message. In operation 1*j*-50, the terminal 1*j*-01 transmits information on a temporary change in UE capability (i.e., a temporary capability restriction) and a request for the same through an RRC message, such as UE assistance information. The RRC message may include at least one piece of information, which may be requested by the terminal 1*j*-01, such as a cause of a request for a temporary change in UE capability (e.g., cause values: hardware sharing, interference, overheating, mode change, and the like), a band and band combination information to be supported, changes in the physical functions of the terminal (a change in the number of component carriers, a change in the number of MIMO layers, changes in the band and bandwidth information to be supported for each CC, a change in the support power, a change in the frequency range to be supported, and the like), or the like. Detailed items included in the RRC message and a signaling method thereof will be described in more detail in another embodiment below.

When the terminal reports the change in UE capability, if only a UE capability in which the temporary change is smaller than the static UE capability is reported, only a subset of the static UE capability can always be reported. That is, this is a request for temporarily having some reduced capability of the overall static UE capability. However, if it is possible to report a UE capability in which the temporary change is higher than the static UE capability, a new UE capability higher than the UE capability reported in the previous static report must be signaled.

In addition, a prohibit timer 1*j*-55 for prohibiting a request for a change in UE capability may be configured in order to prevent the terminal 1*j*-01 from repeating or re-requesting the temporary capability restriction within a specific time after requesting the temporary capability restriction using an RRC message, and an application period of the requested UE capability may be guaranteed for a specific time accordingly. If the prohibit timer is not configured, the terminal 1*j*-01 may frequently transmit UE capability reports, which makes it difficult for the base station 1*j*-02 to perform scheduling and management with respect to the terminal 1*j*-01. The prohibit timer 1*j*-55 may be configured to be included in msg 4 during an RRC connection procedure, and may be included in an RRC reconfiguration message. Alternatively, the prohibit timer 1*j*-55 may be configured as a default value according to internal settings of the terminal, or may be obtained from system information. Although not shown, the base station 1*j*-02 may transmit a temporary capability restriction confirm/reject message in response to the temporary capability restriction request message. If the base station 1*j*-02 accepts the temporary capability restriction request from the terminal 1*j*-01, the base station 1*j*-02 transmits a confirm message to the terminal 1*j*-01, and if the base station 1*j*-02 rejects the temporary capability restriction request, the base station 1*j*-02 transmits a reject message. Both the messages may be transmitted using RRC messages.

In operation 1*j*-60, the base station 1*j*-02 stores or does not reflect the temporary capability restriction information received from the terminal 1*j*-01 according to whether or not the temporary capability restriction determined in the operation is reflected. The base station 1*j*-02 manages the received information only in an access stratum (AS) area, instead of transmitting the same to the 5G CN 1*j*-03. In operation 1*j*-65, the base station 1*j*-02 may reflect the temporary capability restriction, thereby transmitting new RRC configuration information to the terminal 1*j*-01 through an RRC reconfiguration message. However, if the base station 1*j*-02 rejects the temporary capability restriction request received from the terminal 1*j*-01, the base station 1*j*-02 may omit operation 1*j*-65 without reflecting the temporary capability restriction, or may configure RRC reconfiguration, based on the original UE capability. That is, the base station 1*j*-02 maintains the RRC configuration (RRC reconfiguration) based on the UE capability received in the previous operation 1*j*-10. The terminal 1*j*-01 receiving the RRC reconfiguration from the base station 1*j*-02 in operation 1*j*-65 transmits information indicating that the RRC reconfiguration has been received to the base station 1*j*-02 through an RRC reconfiguration complete message for the configuration (operation 1*j*-70).

If the terminal 1*j*-01 needs to release the temporary change of the UE capability in the state in which the temporarily changed UE capability is reflected through the above process of temporarily changing the UE capability and the RRC reconfiguration according thereto (operation 1*j*-75), the terminal 1*j*-01 informs the base station 1*j*-02 that the temporary change in the UE capability has been completed and that the terminal has returned to the original static UE capability through a temporary capability restriction release message in operation 1*j*-80. Upon receiving the RRC message, the base station 1*j*-02 may transmit, to the terminal 1*j*-01, a release response RRC message indicating that the corresponding release message has been received in operation 1*j*-85. In addition, in operation 1*j*-90, the base station 1*j*-02 may determine that the terminal 1*j*-01 has returned to the static UE capability, and may then transmit a new RRC reconfiguration message. Alternatively, the release response message in operation 1*j*-85 may be omitted. That is, if the base station 1*j*-02 receives the temporary capability restriction release message in operation 1*j*-80, the base station 1*j*-02 may transmit a new RRC reconfiguration message to the terminal 1*j*-01, instead of responding thereto.

In addition to the case in which the terminal 1*j*-01 explicitly requests a release of the temporary UE capability change as described above, the base station 1*j*-02 may identify a temporary capability change of the terminal in the following cases. The following conditions may be simultaneously applied to the terminal 1*j*-01.

1. The case in which a terminal explicitly requests a release of a temporary restriction
2. The case in which a terminal previously instructs a request for a new temporary restriction
3. The case in which a terminal switches to an RRC idle state or an RRC inactive state.
4. The case in which a retention period of the temporary capability restriction of the terminal is configured by providing a separate timer and in which the timer expires (the timer may be included in the RRC reconfiguration transmitted to the terminal. In addition, a plurality of timers may be configured depending on the situation. For example, the timer may be configured to be different depending on cause values of the temporary UE capability restriction, or may be configured to have different values for each terminal in an RRC connection state, an idle state, and an inactive state). If the terminal requests an extension of the configured timer value, the terminal may request a timer desired to be extended in a manner using UE assistance information, a new RRC message, or MAC CE.

Figure 11:
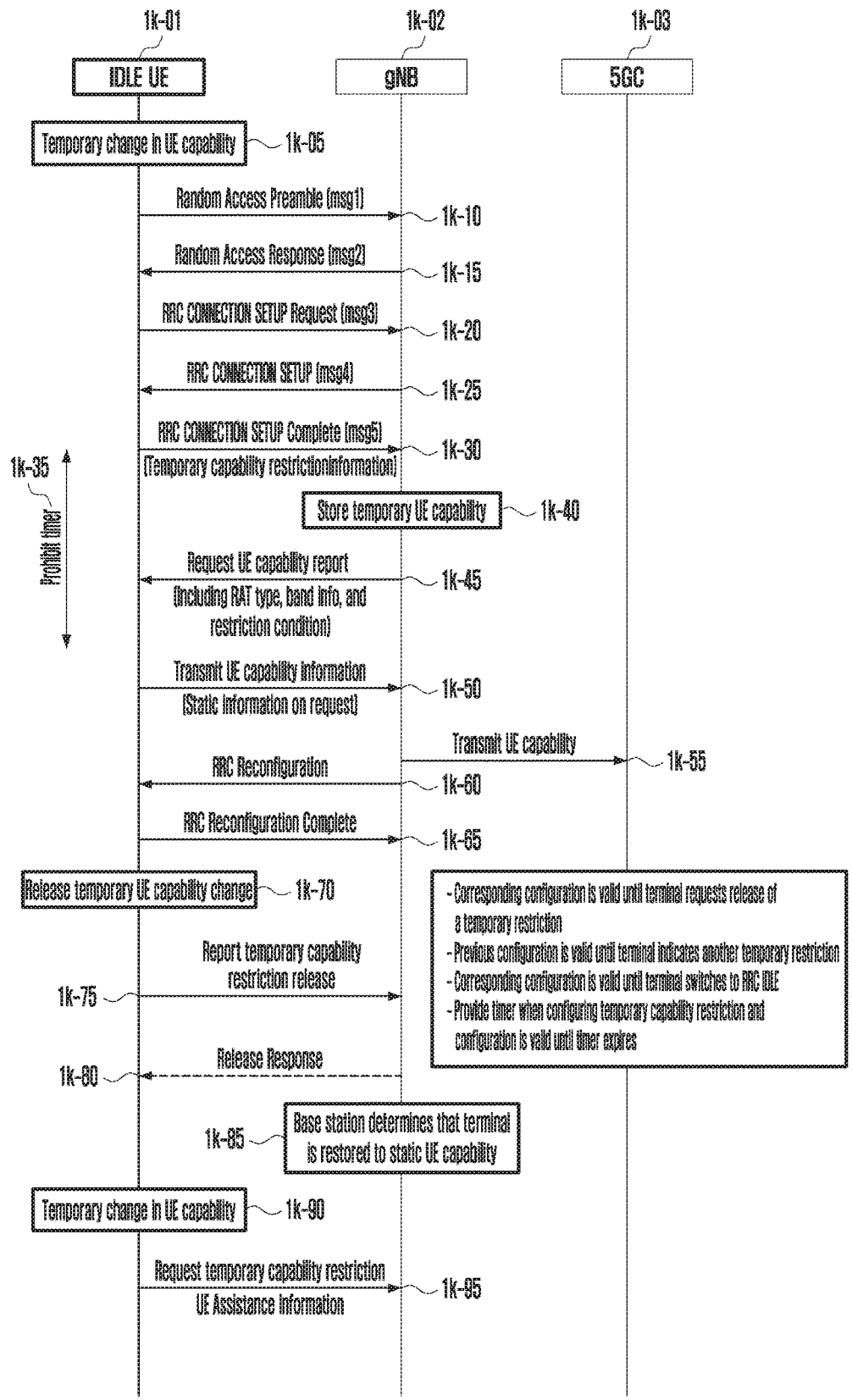
FIG. 11 is a diagram illustrating a method of a terminal in an RRC idle state requesting a temporary change in UE capability according to an embodiment of the disclosure.

FIG. 11 is a diagram illustrating a method of a terminal in an RRC idle state requesting a temporary change in UE capability according to an embodiment of the disclosure.

Referring to FIG. 11, in particular, in the case where a terminal requests a temporary capability restriction in the operation of requesting switching from an idle state to a connection state, the terminal makes a request by including relevant information.

A terminal 1*k*-01 in an RRC idle state may have a temporary change in UE capability in operation 1*k*-05. In general, the UE capability may change due to sharing hardware with other communication technologies, interference therewith, heating, or the like while the terminal is in connection. However, even in the idle state, the UE capability of the terminal may be affected by the use of other communication technologies, such as WLAN, Bluetooth, or the like, so that management is required in consideration of the same from the initial RRC connection state. In an embodiment of the disclosure, even if the UE capability is temporarily changed in the idle state, it is not necessary to trigger an RRC connection procedure. Even if the changed UE capability is not reported in the state other than the RRC connection state, it does not affect the configuration by the base station. Therefore, it may be possible to trigger an RRC connection procedure only when a general RRC connection is required (when uplink/downlink data occurs). That is, although a temporary change in UE capability does not trigger the RRC connection procedure, if the RRC connection procedure is triggered for another reason, it is necessary to determine whether or not the terminal currently needs a temporary change in the UE capability, and, if the capability change is necessary, a subsequent procedure reflects the same.

In general, if there is a static UE capability that the terminal reported to the base station in the previous RRC connection state in the corresponding operation, the base station may receive the UE capability from the CN (UE capability retrieve condition 1), and in this case, the base station may not request the UE capability of the terminal after the RRC connection procedure. However, if the base station fails to retrieve the static UE capability of the terminal (UE capability retrieve condition 2), the base station may request and receive the UE capability of the terminal after the RRC connection procedure. The operation of the base station and the terminal may be different according to the above conditions.

The terminal 1*k*-01 triggers random access to the base station 1*k*-02 in operation 1*k*-10. That is, the terminal 1*k*-01 transmits a random access preamble (msg 1) to the base station 1*k*-02 and starts an RRC connection procedure. In an embodiment of the disclosure, it is possible to notify of a temporary capability restriction using a random access preamble (msg 1). At least one of a preamble ID, a time resource, and a frequency resource, which are predefined, may be used. Alternatively, the random access preamble (msg 1) may include an indicator indicating a temporary capability restriction. In operation 1*k*-15, the terminal 1*k*-01 receives a random access response (msg 2) from the base station 1*k*-02 and synchronizes uplink. Thereafter, in operation 1*k*-20, the terminal 1*k*-01 may include a temporary capability restriction in an RRC Connection Setup Request message (msg 3). By including an indicator indicating that there is a change in the UE capability in this operation, the base station may recognize in advance that the terminal 1*k*-01 will request a temporary capability restriction later.

In the above operation, msg 3 does not include details of the temporary capability restriction because msg 3 is sensitive to size and is not able to contain a large amount of information. For example, msg 3 may be a message, such as RRC Setup Request, RRC Resume Request, RRC Reestablishment Request, or the like. In an LTE system, msg 3 of 56 bits is used, and the minimum uplink grant size is also 56 bits in NR. For reference, msg 3 must have a good link performance within cell coverage because it is a request message to attempt to connect to a network. In addition, as the size of a packet transmitted by the terminal 1*k*-01 is smaller, the terminal coverage is extended. Therefore, in the case where uplink grants of 56 bits or more are allocated, the performance of cell access coverage may deteriorate. As a result, in the NR system, a separate logical channel identifier (LCID) is further allocated to a MAC header in order to distinguish between an uplink grant of 56 bits for transmission of a CCCH and an uplink grant of 56 bits or more (e.g., 72 bits). However, in the case where a 56-bit uplink grant is allocated, since msg 3 cannot carry and transmit all of 5G-S-TMSI that is increased by 8 bits, compared to S-TMSI in LTE, msg 3 must transmit a portion of the 5G-S-TMSI, and msg 5 must transmit the remaining portions thereof.

In operation 1*k*-25, the base station 1*k*-02 transmits an RRC Connection Setup message (msg 4) in response to the received RRC Connection Setup Request message. The message may include a radio bearer configuration for SRB 1 and an MCG configuration (an RLC bearer, "mac-CellGroupConfig", "physicalCellGroupConfig and spCellConfig", and the like). The message includes general configurations of the base station 1*k*-02 for SRB 1 in this operation, and the terminal 1*k*-01 receives msg 4 and transmits an RRC Connection Setup Complete message (msg 5) in response to the configuration of SRB 1 (operation 1*k*-30). The message may include at least one of a selected PLMN ID, a registered AMF, a globally unique AMF ID (GUAMI) type, a Single Network Slice Selection Assistance Information (S-NSSAI) list, a NAS message, and the like, and may include temporary capability restriction information. This case may be established in the state in which the terminal has reported the static UE capability to the base station in the previous connection state (UE capability retrieve condition 1), or may be possible in the state in which there is no previous information. The RRC message may include at least one piece of information, which may be requested by the terminal 1k-01, such as a cause of a request for a temporary change in UE capability (e.g., cause values: hardware sharing, interference, overheating, mode change, and the like), a band and band combination information to be supported, changes in the physical functions of the terminal (a change in the number of component carriers, a change in the number of MIMO layers, changes in the band and bandwidth information to be supported for each CC, a change in the support power, a change in the frequency range to be supported, and the like), or the like. Detailed items included in the RRC message and a signaling method thereof will be described in more detail in another embodiment below.

When the terminal reports the change in UE capability, if only a UE capability in which the temporary change is smaller than the static UE capability is reported, only a subset of the static UE capability can always be reported. That is, this is a request for temporarily having some reduced capability of the overall static UE capability. However, if it is possible to report a UE capability in which the temporary change is higher than the static UE capability, a new UE capability higher than the UE capability reported in the previous static report must be signaled.

In addition, a prohibit timer 1k-35 for prohibiting a request for a change in UE capability may be configured in order to prevent the terminal 1k-01 from repeating or re-requesting the temporary capability restriction within a specific time after requesting the temporary capability restriction using an RRC message, and an application period of the requested UE capability may be guaranteed for a specific time according thereto. If the prohibit timer is not configured, the terminal 1k-01 may frequently transmit UE capability reports, which makes it difficult for the base station 1k-02 to perform scheduling and management with respect to the terminal. The prohibit timer 1k-35 may be configured to be included in msg 4 during an RRC connection procedure, and may be included in an RRC reconfiguration message. Alternatively, the prohibit timer 1k-35 may be configured as a default value according to internal settings of the terminal, or may be obtained from system information.

In operation 1k-40, the base station 1k-02 stores or does not reflect the temporary capability restriction information received from the terminal 1k-01 according to whether or not the temporary capability restriction determined in the operation is reflected. Based on the content of msg 5 transmitted from the terminal 1k-01, the base station 1k-02 may retrieve the static capability and context of the terminal from the core network (CN), and if there is no corresponding UE capability or if the base station 1k-02 fails to retrieve the same, the base station 1k-02 may request a report of the UE capability. That is, if UE capability retrieve condition 1 above is satisfied, operations 1k-45, 1k-50, and 1k-55 may be omitted, and operations 1k-45, 1k-50, and 1k-55 may be performed only when UE capability retrieve condition 2 is met.

In operation 1k-45, the terminal 1k-01 may receive a request for reporting UE capability from the base station 1k-02 through an RRC message. A plurality of "UE-CapabilityRAT-Requests" may be transmitted using "UECapabilityEnquiry" in the message, or a request for a report with respect to one RAT type may be transmitted. If a plurality of "UE-CapabilityRAT-Requests" is transmitted using "UECapabilityEnquiry" in the above operation, the terminal 1k-01 configures a UE capability, based on the priority according to the RAT type request. The request may include band information, a restriction on the report content, and the like.

For example, the terminal 1k-01 configures a UE capability container according to the following priority in LTE.
    ue-CapabilityRAT-Container for nr
    ue-CapabilityRAT-Container for eutra-nr
    ue-CapabilityRAT-Container for eutra If content of MR-DC is determined, reporting of another RAT type has a priority value, and the terminal must make a report according thereto.

In operation 1k-50, the terminal 1k-01 transmits, to the base station 1k-02, "UECapabilityInformation" message including the UE capability information configured according to the priority in the container thereof. The message is transmitted to the base station 1k-02 through an RRC message, and includes static UE capability for the RAT type, band information, or the like, which are requested from the base station 1k-02. Although the terminal 1k-01 may adjust implementation of the UE capability for the requested RAT type and band information and report the same, the terminal 1k-01 basically transmits static information on the terminal in this operation. This is due to the fact that information necessary to return to the previous static UE capability is required in the case where a temporary UE capability restriction request, which is reported later, expires.

In operation 1k-55, the base station 1k-02 transmits the UE capability information received from the terminal 1k-01 to a 5G CN 1k-03, and the 5G CN 1k-03 stores the received static UE capability information. The UE capability information stored in the 5G CN 1k-03 in the above operation may be maintained until the RRC connection of the terminal 1k-01 is released, and may be used for traffic configuration and mobility management with respect to the terminal 1k-01. In this case, the base station 1k-02 does not transmit, to the CN, the temporary capability restriction information received from the terminal 1k-01 in operation 1k-30.

In operation 1k-60, the base station 1k-02 may reflect the temporary capability restriction received in operation 1k-30, thereby transmitting new RRC configuration information to the terminal 1k-01 through an RRC reconfiguration message. However, if the base station 1k-02 rejects the temporary capability restriction request received from the terminal 1k-01, the base station 1k-02 may omit operation 1k-60 without reflecting the temporary capability restriction, or may configure RRC reconfiguration, based on the original UE capability. That is, the base station 1k-02 maintains the RRC configuration (RRC reconfiguration) based on the UE capability received in the previous operation. The terminal 1k-01 receiving the RRC reconfiguration from the base station 1k-02 in operation 1k-60 transmits information indicating that the RRC reconfiguration has been received to the base station 1k-02 through an RRC reconfiguration complete message for the configuration (operation 1k-65).

If the terminal 1k-01 needs to release the temporary change of the UE capability in the state in which the temporarily changed UE capability is reflected through the above process of temporarily changing the UE capability and the RRC reconfiguration according thereto (operation 1k-70), the terminal 1k-01 informs the base station 1k-02 that the temporary change in the UE capability has been completed and that the terminal has returned to the original static UE capability through a temporary capability restriction release message in operation 1k-75. Upon receiving the RRC message, the base station 1k-02 may transmit, to the terminal 1k-01, a release response RRC message indicating that the corresponding release message has been received in operation 1k-80. In operation 1k-85, the base station 1k-02 may determine that the terminal 1k-01 has returned to the static UE capability, and may then transmit a new RRC reconfiguration message to the terminal 1k-01.

Alternatively, the release response message in operation 1k-85 may be omitted. That is, if the base station 1k-02 receives the temporary capability restriction release message in operation 1k-75, the base station 1k-02 may transmit a new RRC reconfiguration message to the terminal 1k-01, instead of responding thereto.

In addition to the case in which the terminal 1k-01 explicitly requests a release of the temporary UE capability change as described above, the base station 1k-02 may identify a temporary capability change of the terminal 1k-01 in the following cases. The following conditions may be simultaneously applied to the terminal 1k-01.

1. The case in which a terminal explicitly requests a release of a temporary restriction
2. The case in which a terminal previously instructs a request for a new temporary restriction
3. The case in which a terminal switches to an RRC idle state or an RRC inactive state.
4. The case in which a retention period of the temporary capability restriction of the terminal is configured by providing a separate timer and in which the timer expires (the timer may be included in the RRC reconfiguration transmitted to the terminal. In addition, a plurality of timers may be configured depending on the situation. For example, the timer may be configured to be different depending on cause values of the temporary UE capability restriction, or may be configured to have different values for each terminal in an RRC connection state, an idle state, and an inactive state). If the terminal requests an extension of the configured timer value, the terminal may request a timer desired to be extended in a manner using UE assistance information, a new RRC message, or MAC CE.

For example, if the capability of the terminal is changed again in operation 1k-90, the terminal 1k-01 transmits, to the base station 1k-02, information on the temporary change in the UE capability (i.e., a temporary capability restriction) and a request therefor through an RRC message, such as UE assistance information in operation 1k-95.

Figure 12:
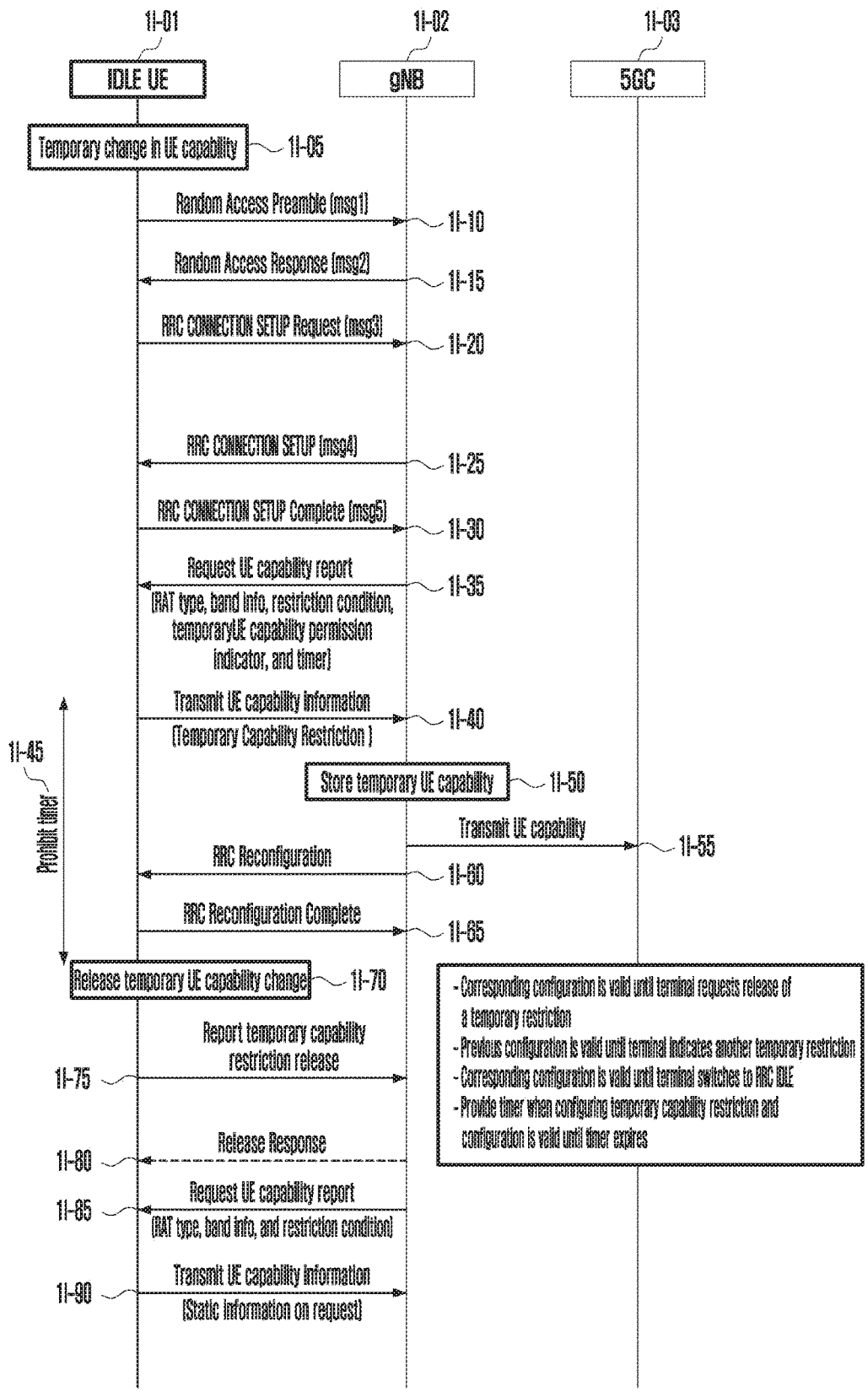
FIG. 12 is a diagram illustrating a method of a terminal in an RRC idle state requesting a temporary change in UE capability according to an embodiment of the disclosure.

FIG. 12 is a diagram illustrating a method of a terminal in an RRC idle state requesting a temporary change in UE capability according to an embodiment of the disclosure.

Referring to FIG. 12, in particular, after a terminal requests a temporary UE capability restriction in the operation of requesting switching from an idle state to a connection state, if the terminal enters an RRC connection state, the terminal requests the content of the temporary UE capability restriction.

A terminal 1l-01 in an RRC idle state may have a temporary change in UE capability in operation 1l-05. In general, the UE capability may change due to sharing hardware with other communication technologies, interference therewith, heating, or the like while the terminal is in connection. However, even in the idle state, the UE capability of the terminal may be affected by the use of other communication technologies, such as WLAN, Bluetooth, or the like, so that management is required in consideration of the same from the initial RRC connection state. In an embodiment of the disclosure, even if the UE capability is temporarily changed in the idle state, it is not necessary to trigger an RRC connection procedure. Even if the changed UE capability is not reported in the state other than the RRC connection state, it does not affect the configuration by the base station. Therefore, it may be possible to trigger an RRC connection procedure only when a general RRC connection is required (when uplink/downlink data occurs). That is, although a temporary change in UE capability does not trigger the RRC connection procedure, if the RRC connection procedure is triggered for another reason, it is necessary to determine whether or not the terminal currently needs a temporary change in the UE capability, and, if the capability change is necessary, a subsequent procedure reflects the same. In an embodiment of the disclosure, in order to notify the base station in advance that the UE capability has been temporarily changed in the idle state, the RRC connection procedure may be triggered even when the RRC connection is not necessary.

In general, if there is a static UE capability that the terminal reported to the base station in the previous RRC connection state in the corresponding operation, the base station may receive the UE capability from the CN (UE capability retrieve condition 1), and in this case, the base station may not request the UE capability of the terminal after the RRC connection procedure. However, if the base station fails to retrieve the static UE capability of the terminal (UE capability retrieve condition 2), the base station may request and receive the UE capability of the terminal after the RRC connection procedure. The operation of the base station and the terminal may be different according to the above conditions.

The terminal 1l-01 triggers random access to the base station 1l-02 in operation 1l-10. That is, the terminal 1l-01 transmits a random access preamble (msg 1) to the base station 1l-02 and starts an RRC connection procedure. In an embodiment of the disclosure, it is possible to notify of a temporary capability restriction using a random access preamble (msg 1). At least one of a preamble ID, a time resource, and a frequency resource, which are predefined, may be used. Alternatively, the random access preamble (msg 1) may include an indicator indicating a temporary capability restriction. In operation 1l-15, the terminal 1l-01 receives a random access response (msg 2) from the base station 1l-02 and synchronizes uplink. Thereafter, in operation 1l-20, the terminal 1l-01 transmits an RRC Connection Setup Request message (msg 3).

In the above operation, msg 3 does not include details of the temporary capability restriction because msg 3 is sensitive to size and is not able to contain a large amount of information. For example, msg 3 may be a message, such as RRC Setup Request, RRC Resume Request, RRC Reestablishment Request, or the like. In an LTE system, msg 3 of 56 bits is used, and the minimum uplink grant size is also 56 bits in NR. For reference, msg 3 must have a good link performance within cell coverage because it is a request message to attempt to connect to a network. In addition, as the size of a packet transmitted by the terminal 1l-01 is smaller, the terminal coverage is extended. Therefore, in the case where uplink grants of 56 bits or more are allocated, the performance of cell access coverage may deteriorate. As a result, in the NR system, a separate logical channel identifier (LCID) is further allocated to a MAC header in order to distinguish between an uplink grant of 56 bits for transmission of a CCCH and an uplink grant of 56 bits or more (e.g., 72 bits). However, in the case where a 56-bit uplink grant is allocated, since msg 3 cannot carry and transmit all of 5G-S-TMSI that is increased by 8 bits, compared to S-TMSI in LTE, msg 3 must transmit a portion of the 5G-S-TMSI, and msg 5 must transmit the remaining portions thereof.

In operation 1l-25, the base station 1l-02 transmits an RRC Connection Setup message (msg 4) in response to the received RRC Connection Setup Request message. The message may include a radio bearer configuration for SRB 1 and an MCG configuration (an RLC bearer, "mac-Cell- GroupConfig", "physicalCellGroupConfig and spCellConfig", and the like). The message includes general configurations of the base station 1/-02 for SRB 1 in this operation, and the terminal 1/-01 receives msg 4 and transmits an RRC Connection Setup Complete message (msg 5) in response to the configuration of SRB 1 in operation 1/-30. The message may include at least one of a selected PLMN ID, a registered AMF, a globally unique AMF ID (GUAMI) type, a Single Network Slice Selection Assistance Information (S-NSSAI) list, a NAS message, and the like, and may include an indicator indicating a temporary capability restriction. By including an indicator indicating that there is a change in the UE capability in this operation, the base station may recognize in advance that the terminal will request a temporary capability restriction later. Based on the content of msg 5 transmitted from the terminal 1/-01, the base station 1/-02 may retrieve the static capability and context of the terminal from the CN, and if there is no corresponding UE capability or if the base station 1/-02 fails to retrieve the same, the base station 1/-02 may request a report of the UE capability. That is, if UE capability retrieve condition 1 above is satisfied, operations 1/-35, 1/-40, and 1/-45 may be omitted, and operations 1/-35, 1/-40, and 1/-45 may be performed only when UE capability retrieve condition 2 is met.

In operation 1/-35, the terminal 1/-01 may receive a request for reporting UE capability from the base station 1/-02 through an RRC message. A plurality of "UE-CapabilityRAT-Requests" may be transmitted using "UECapabilityEnquiry" in the message, or a request for a report with respect to one RAT type may be transmitted. If a plurality of "UE-CapabilityRAT-Requests" is transmitted using "UECapabilityEnquiry" in the above operation, the terminal 1/-01 configures a UE capability, based on the priority according to the RAT type request. The request may include band information, a restriction on the report content, and the like. For example, the terminal 1/-01 configures a UE capability container according to the following priority in LTE.

ue-CapabilityRAT-Container for nr
ue-CapabilityRAT-Container for eutra-nr
ue-CapabilityRAT-Container for eutra If content of MR-DC is determined, reporting of another RAT type has a priority value, and the terminal 1/-01 must make a report according thereto. In the above operation, since the base station 1/-02 is aware that the terminal 1/-01 has a temporary change in the UE capability by receiving information indicating the same in operation 1/-20, the base station 1/-02 may instruct the terminal 1/-01 to report the temporary UE capability. That is, it may include a 1-bit indicator or restriction information that may be reported by reflecting the changed capability. For example, signaling indicating that permission is allowed only for the restriction on MIMO, the restriction on the number of CCs, and the like may be included. In addition, prohibit timer information may be included.

In operation 1/-40, the terminal 1/-01 transmits, to the base station 1/-02, "UECapabilityInformation" message including the information on the temporarily changed UE capability, which is configured according to the priority, based on the request of the base station 1/-02, in the container thereof. The message may be transmitted to the base station 1/-02 through an RRC message, or may be transmitted using a new message, such as UE assistance information or the like.

A prohibit timer 1/-45 for prohibiting a request for a change in UE capability may be configured in order to prevent the terminal 1/-01 from repeating or re-requesting the temporary capability restriction within a specific time after requesting the temporary capability restriction using an RRC message, and an application period of the requested UE capability may be guaranteed for a specific time according thereto. If the prohibit timer is not configured, the terminal 1/-01 may frequently transmit UE capability reports, which makes it difficult for the base station 1/-02 to perform scheduling and management with respect to the terminal 1/-01. The prohibit timer 1/-45 may be configured to be included in msg4 during an RRC connection procedure, and may be included in an RRC reconfiguration message. Alternatively, the prohibit timer 1/-45 may be configured as a default value according to internal settings of the terminal, or may be obtained from system information. Although not shown, the base station 1/-02 may transmit a temporary capability restriction confirm/reject message in response to the temporary capability restriction request message. If the base station 1/-02 accepts the temporary capability restriction request from the terminal 1/-01, the base station 1/-02 transmits a confirm message to the terminal 1/-01, and if the base station 1/-02 rejects the temporary capability restriction request, the base station 1/-02 transmits a reject message. Both the messages may be transmitted using RRC messages.

In operation 1/-50, the base station 1/-02 stores or does not reflect the temporary capability restriction information received from the terminal 1/-01 according to whether or not the temporary capability restriction determined in the operation is reflected. The base station 1/-02 manages the received information only in an access stratum (AS) area, instead of transmitting the same to the 5G CN 1/-03. However, in an embodiment of the disclosure, if there is no UE capability stored in the 5G CN 1/-03 (UE capability retrieve condition 2), the terminal information may be transmitted to the 5G CN 1/-03 (operation 1/-55). Thereafter, in the case where the terminal 1/-01 reports static UE capability information, the corresponding information is overridden by a new static UE capability.

In operation 1/-60, the base station 1/-02 may reflect the temporary capability restriction, thereby transmitting new RRC configuration information to the terminal 1/-01 through an RRC reconfiguration message. However, if the base station 1/-02 rejects the temporary capability restriction request received from the terminal 1/-01, the base station 1/-02 may omit operation 1/-60 without reflecting the temporary capability restriction, or may configure RRC reconfiguration, based on the original UE capability. That is, the base station 1/-02 maintains the RRC configuration (RRC reconfiguration) based on the UE capability received in the previous operation. The terminal 1/-01 receiving the RRC reconfiguration from the base station 1/-02 in operation 1/-60 transmits information indicating that the RRC reconfiguration has been received to the base station 1/-02 through an RRC reconfiguration complete message for the configuration (operation 1/-65).

If the terminal 1/-01 needs to release the temporary change of the UE capability in the state in which the temporarily changed UE capability is reflected through the above process of temporarily changing the UE capability and the RRC reconfiguration according thereto (operation 1/-70), the terminal 1/-01 informs the base station 1/-02 that the temporary change in the UE capability has been completed and that the terminal has returned to the original static UE capability through a temporary capability restriction release message in operation 1/-75. Upon receiving the RRC message, the base station 1/-02 may transmit, to the terminal 1*l*-01, a release response RRC message indicating that the corresponding release message has been received in operation 1*l*-80.

In operation 1*l*-85, the base station 1*l*-02 may determine that the terminal 1*l*-01 has returned to the static UE capability, and may then transmit a new RRC reconfiguration message to the terminal, or may request a new static UE capability. Alternatively, the release response message in operation 1*l*-80 may be omitted. That is, if the base station 1*l*-02 receives the temporary capability restriction release message in operation 1*l*-80, the base station 1*l*-02 may transmit a new RRC reconfiguration message, instead of responding thereto. The terminal 1*l*-01 receiving the UE capability request in operation 1*l*-85 transmits the corresponding information to the base station 1*l*-02 by including the relevant static UE capability therein in operation 1*l*-90. The base station 1*l*-02 may store the UE capability, and may transmit the same to the CN.

In addition to the case in which the terminal 1*l*-01 explicitly requests a release of the temporary UE capability change as described above, the base station 1*l*-02 may identify a temporary capability change of the terminal in the following cases. The following conditions may be simultaneously applied to the terminal 1*l*-01.

1. The case in which a terminal explicitly requests a release of a temporary restriction
2. The case in which a terminal previously instructs a request for a new temporary restriction
3. The case in which a terminal switches to an RRC idle state or an RRC inactive state.
4. The case in which a retention period of the temporary capability restriction of the terminal is configured by providing a separate timer and in which the timer expires (the timer may be included in the RRC reconfiguration transmitted to the terminal. In addition, a plurality of timers may be configured depending on the situation. For example, the timer may be configured to be different depending on cause values of the temporary UE capability restriction, or may be configured to have different values for each terminal in an RRC connection state, an idle state, and an inactive state). If the terminal requests an extension of the configured timer value, the terminal may request a timer desired to be extended in a manner using UE assistance information, a new RRC message, or MAC CE.

Figure 13:
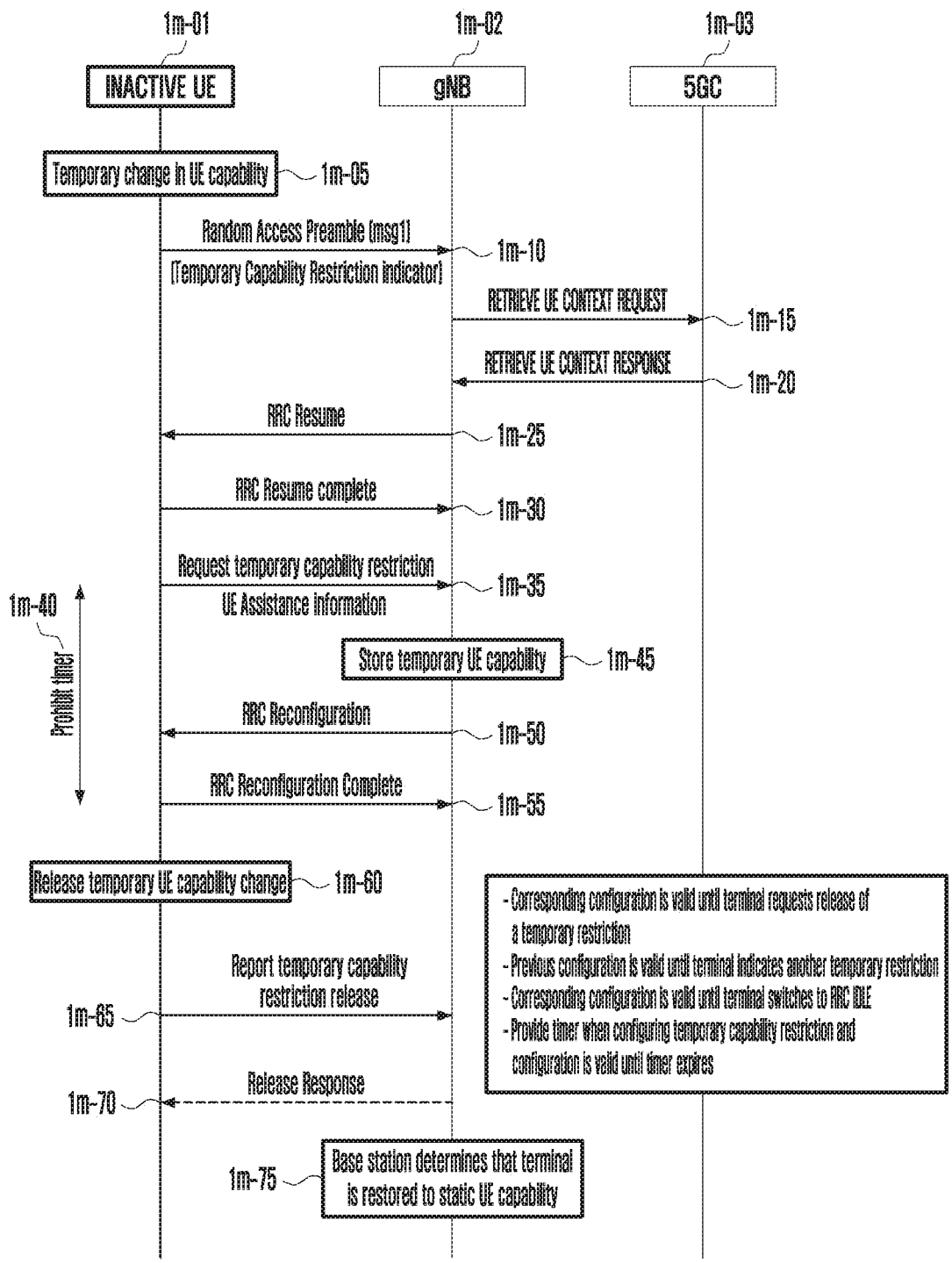
FIG. 13 is a diagram illustrating a method of a terminal in an RRC inactive state requesting a temporary change in UE capability according to an embodiment of the disclosure.

FIG. 13 is a diagram illustrating a method of a terminal in an RRC inactive state requesting a temporary change in UE capability according to an embodiment of the disclosure.

Referring to FIG. 13, in particular, after a terminal requests a temporary UE capability restriction in the operation of requesting switching from an inactive state to a connection state, if the terminal enters an RRC connection state, the terminal requests the temporary UE capability restriction.

A terminal 1*m*-01 in an RRC inactive state may have a temporary change in UE capability in operation 1*m*-05. In general, the UE capability may change due to sharing hardware with other communication technologies, interference therewith, heating, or the like while the terminal is in connection. However, even in an inactive state, the UE capability may be affected by the use of other communication technologies, such as WLAN, Bluetooth, or the like, so that management is required in consideration of the same from the initial RRC connection state. In an embodiment of the disclosure, even if the UE capability is temporarily changed in an inactive state, it is not necessary to trigger an RRC Resume procedure. Even if the changed UE capability is not reported in the state other than the RRC connection state, it does not affect the configuration by the base station. Therefore, it may be possible to trigger an RRC Resume procedure only when a general RRC connection is required (when uplink/downlink data occurs). That is, although a temporary change in UE capability does not trigger the RRC Resume procedure, if the RRC Resume procedure is triggered for another reason, it is necessary to determine whether or not the terminal currently needs a temporary change in the UE capability, and, if the capability change is necessary, a subsequent procedure reflects the same.

In an embodiment of the disclosure, in order to notify the base station in advance that the UE capability has been temporarily changed in the inactive state, the RRC connection procedure may be triggered even when the RRC connection is not necessary.

In general, if there is a static UE capability that the terminal reported to the base station in the previous RRC connection state in the corresponding operation, the base station may receive the UE capability from the CN (UE capability retrieve condition 1), and in this case, the base station may not request the UE capability of the terminal after the RRC connection procedure. However, if the base station fails to retrieve the static UE capability of the terminal (UE capability retrieve condition 2), the base station may request and receive the UE capability of the terminal after the RRC connection procedure. The operation of the base station and the terminal may be different according to the above conditions.

The terminal 1*m*-01 may include an indicator indicating a temporary capability restriction in an RRC Resume Request message (msg 3) in operation 1*m*-10. By including an indicator indicating that there is a change in the UE capability in this operation, the base station may recognize in advance that the terminal 1*m*-01 will request a temporary capability restriction later. In the above operation, msg 3 does not include details of the temporary capability restriction because msg 3 is sensitive to size and is not able to contain a large amount of information. For example, msg 3 may be a message, such as RRC Setup Request, RRC Resume Request, RRC Reestablishment Request, or the like. In operation 1*m*-15, the base station 1*m*-02 transmits, to a 5G CN 1*m*-03, a retrieve message for determining whether or not there are context of the terminal and UE capability information stored in the 5G CN 1*m*-03 and for requesting the same, and receives a response thereto from the 5G CN 1*m*-03 in operation 1*m*-20. If there is the information, the base station 1*m*-02 stores the static UE capability.

In operation 1*m*-25, the base station 1*m*-02 transmits an RRC Resume message (msg 4) in response to the received RRC Resume Request message. The message may include a radio bearer configuration for SRB 1 and an MCG configuration (an RLC bearer, "mac-CellGroupConfig", "physical-CellGroupConfig and spCellConfig", and the like). The message includes general configurations of the base station 1*m*-02 for SRB 1 in this operation, and the terminal 1*m*-01 receives msg 4 and transmits an RRC Resume Complete message (msg 5) in response to the configuration of SRB 1 in operation 1*m*-30. The message may include at least one of a selected PLMN ID, a NAS message, and the like. Based on the content of msg 5 transmitted from the terminal 1*m*-01, the base station 1*m*-02 may retrieve the static capability and context of the terminal from the CN, and if there is no corresponding UE capability or if the base station 1*m*-02 fails to retrieve the same, the base station 1*m*-02 may request a report of the UE capability.

In operation 1*m*-35, the terminal 1*m*-01 may make a request for temporary change of the UE capability to the base station 1m-02. The information on the temporary change in the UE capability (i.e., a temporary capability restriction) and a request for the same may be transmitted through an RRC message, such as UE assistance information in the above operation. The RRC message may include at least one piece of information, which may be requested by the terminal 1m-01, such as a cause of a request for a temporary change in UE capability (e.g., cause values: hardware sharing, interference, overheating, mode change, and the like), a band and band combination information to be supported, changes in the physical functions of the terminal (a change in the number of component carriers, a change in the number of MIMO layers, changes in the band and bandwidth information to be supported for each CC, a change in the support power, a change in the frequency range to be supported, and the like), or the like. Detailed items included in the RRC message and a signaling method thereof will be described in more detail in another embodiment below.

When the terminal reports the change in UE capability, if only a UE capability in which the temporary change is smaller than the static UE capability is reported, only a subset of the static UE capability can always be reported. That is, this is a request for temporarily having some reduced capability of the overall static UE capability. However, if it is possible to report a UE capability in which the temporary change is higher than the static UE capability, a new UE capability higher than the UE capability reported in the previous static report must be signaled.

In addition, a prohibit timer 1m-40 for prohibiting a request for a change in UE capability may be configured in order to prevent the terminal 1m-01 from repeating or re-requesting the temporary capability restriction within a specific time after requesting the temporary capability restriction using an RRC message, and an application period of the requested UE capability may be guaranteed for a specific time according thereto. If the prohibit timer is not configured, the terminal 1m-01 may frequently transmit UE capability reports, which makes it difficult for the base station 1m-02 to perform scheduling and management with respect to the terminal. The prohibit timer 1m-40 may be configured to be included in msg 4 during an RRC connection procedure, and may be included in an RRC reconfiguration message. Alternatively, the prohibit timer 1m-40 may be configured as a default value according to internal settings of the terminal, or may be obtained from system information. Although not shown, the base station 1m-02 may transmit, to the terminal 1m-01, a temporary capability restriction confirm/reject message in response to the temporary capability restriction request message. If the base station 1m-02 accepts the temporary capability restriction request from the terminal 1m-01, the base station 1m-02 transmits a confirm message to the terminal 1m-01, and if the base station 1m-02 rejects the temporary capability restriction request, the base station 1m-02 transmits a reject message to the terminal 1m-01. Both the messages may be transmitted using RRC messages.

In operation 1m-45, the base station 1m-02 stores or does not reflect the temporary capability restriction information received from the terminal 1m-01 according to whether or not the temporary capability restriction determined in the operation is reflected. The base station 1m-02 manages the received information only in an access stratum (AS) area, instead of transmitting the same to the 5G CN 1m-03. In operation 1m-50, the base station 1m-02 may reflect the temporary capability restriction, thereby transmitting new RRC configuration information to the terminal 1m-01 through an RRC reconfiguration message. However, if the base station 1m-02 rejects the temporary capability restriction request received from the terminal 1m-01, the base station 1m-02 may omit operation 1m-50 without reflecting the temporary capability restriction, or may configure RRC reconfiguration, based on the original UE capability. That is, the base station 1m-02 maintains the RRC configuration (RRC reconfiguration) based on the UE capability received in the previous operation. The terminal 1m-01 receiving the RRC reconfiguration from the base station 1m-02 in operation 1m-50 transmits information indicating that the RRC reconfiguration has been received to the base station 1m-02 through an RRC reconfiguration complete message for the configuration (operation 1m-55).

If the terminal 1m-01 needs to release the temporary change of the UE capability in the state in which the temporarily changed UE capability is reflected through the above process of temporarily changing the UE capability and the RRC reconfiguration according thereto (operation 1m-60), the terminal 1m-01 informs the base station 1m-02 that the temporary change in the UE capability has been completed and that the terminal has returned to the original static UE capability through a temporary capability restriction release message in operation 1m-65. Upon receiving the RRC message, the base station 1m-02 may transmit, to the terminal 1m-01, a release response RRC message indicating that the corresponding release message has been received in operation 1m-70.

In operation 1m-75, the base station 1m-02 may determine that the terminal 1m-01 has returned to the static UE capability, and may then transmit a new RRC reconfiguration message to the terminal 1m-01. Alternatively, the release response message in operation 1m-70 may be omitted. That is, if the base station 1m-02 receives the temporary capability restriction release message in operation 1m-65, the base station 1m-02 may transmit a new RRC reconfiguration message, instead of responding thereto.

In addition to the case in which the terminal 1m-01 explicitly requests a release of the temporary UE capability change as described above, the base station 1m-02 may identify a temporary capability change of the terminal in the following cases. The following conditions may be simultaneously applied to the terminal 1m-01.

1. The case in which a terminal explicitly requests a release of a temporary restriction
2. The case in which a terminal previously instructs a request for a new temporary restriction
3. The case in which a terminal switches to an RRC idle state or an RRC inactive state.
4. The case in which a retention period of the temporary capability restriction of the terminal is configured by providing a separate timer and in which the timer expires (the timer may be included in the RRC reconfiguration transmitted to the terminal. In addition, a plurality of timers may be configured depending on the situation. For example, the timer may be configured to be different depending on cause values of the temporary UE capability restriction, or may be configured to have different values for each terminal in an RRC connection state, an idle state, and an inactive state). If the terminal requests an extension of the configured timer value, the terminal may request a timer desired to be extended in a manner using UE assistance information, a new RRC message, or MAC CE.

Figure 14:
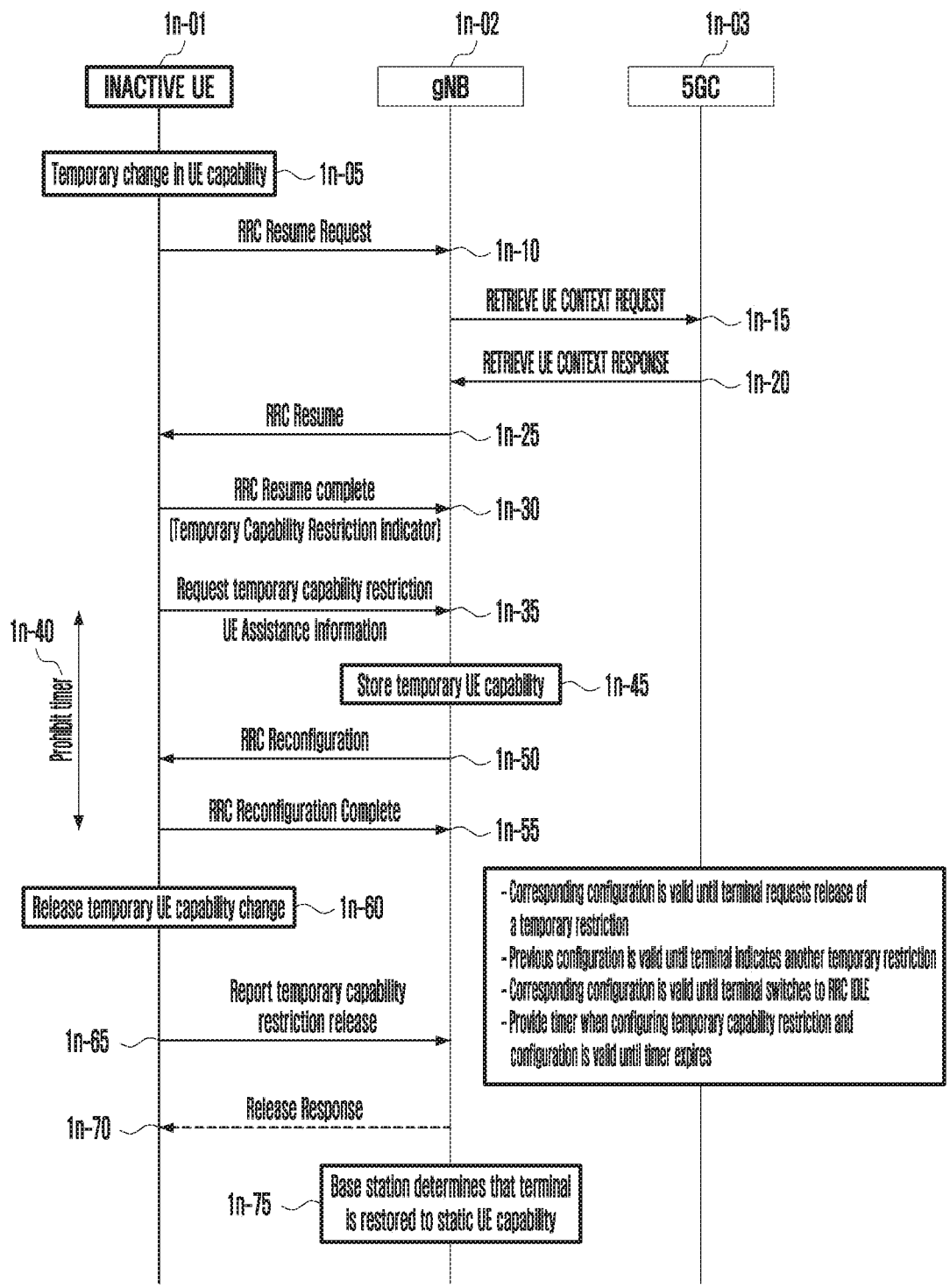
FIG. 14 is a diagram illustrating a method of a terminal in an RRC inactive state requesting a temporary change in UE capability according to an embodiment of the disclosure.

FIG. 14 is a diagram illustrating a method of a terminal in an RRC inactive state requesting a temporary change in UE capability according to an embodiment of the disclosure.

Referring to FIG. 14, in particular, after a terminal requests a temporary UE capability restriction in the operation of requesting switching from an inactive state to a connection state, if the terminal enters an RRC connection state, the base station requests the content of a temporary UE capability restriction.

A terminal 1n-01 in an RRC inactive state may have a temporary change in UE capability in operation 1n-05. In general, the UE capability may change due to sharing hardware with other communication technologies, interference therewith, heating, or the like while the terminal is in connection. However, even in an idle state, the UE capability may be affected by the use of other communication technologies, such as WLAN, Bluetooth, or the like, so that management is required in consideration of the same from the initial RRC connection state. In an embodiment of the disclosure, even if the UE capability is temporarily changed in an idle state, it is not necessary to trigger an RRC connection procedure. Even if the changed UE capability is not reported in the state other than the RRC connection state, it does not affect the configuration by the base station. Therefore, it may be possible to trigger an RRC connection procedure only when a general RRC connection is required (when uplink/downlink data occurs). That is, although a temporary change in UE capability does not trigger the RRC connection procedure, if the RRC connection procedure is triggered for another reason, it is necessary to determine whether or not the terminal currently needs a temporary change in the UE capability, and, if the capability change is necessary, a subsequent procedure reflects the same.

In an embodiment of the disclosure, in order to notify the base station in advance that the UE capability has been temporarily changed in the idle state, the RRC connection procedure may be triggered even when the RRC connection is not necessary.

In general, if there is a static UE capability that the terminal reported to the base station in the previous RRC connection state in the corresponding operation, the base station may receive the UE capability of the terminal from the CN (UE capability retrieve condition 1), and in this case, the base station may not request the UE capability of the terminal after the RRC connection procedure. However, if the base station fails to retrieve the static UE capability of the terminal (UE capability retrieve condition 2), the base station may request and receive the UE capability of the terminal after the RRC connection procedure. The operation of the base station and the terminal may be different according to the above conditions.

The terminal 1n-01 transmits an RRC Resume Request message (msg 3) to the base station 1n-02 in operation 1n-10. In the above operation, msg 3 does not include details of the temporary capability restriction because msg 3 is sensitive to size and is not able to contain a large amount of information. For example, msg 3 may be a message, such as RRC Setup Request, RRC Resume Request, RRC Reestablishment Request, or the like. In operation 1n-15, the base station 1n-02 transmits, to a 5G CN 1n-03, a retrieve message for determining whether or not there are context of the terminal and UE capability information stored in the 5G CN 1n-03 and for requesting the same, and receives a response thereto in operation 1n-20. If there is the information, the base station 1n-02 stores the static UE capability.

In operation 1n-25, the base station 1n-02 transmits an RRC Resume message (msg 4) in response to the received RRC Resume Request message. The message may include a radio bearer configuration for SRB 1 and an MCG configuration (an RLC bearer, "mac-CellGroupConfig", "physical-CellGroupConfig and spCellConfig", and the like). The message includes general configurations of the base station 1n-02 for SRB 1 in this operation, and the terminal 1n-01 receives msg 4 and transmits an RRC Resume Complete message (msg 5) in response to the configuration of SRB 1 in operation 1n-30. The message may include at least one of a selected PLMN ID, a NAS message, and the like, and may include an indicator for a temporary capability restriction. The base station 1n-02 may identify that there is a temporary change in the UE capability through the indicator, and may consider the same in the subsequent procedure. Based on the content of msg 5 transmitted from the terminal 1n-01, the base station 1n-02 may retrieve the static capability and context of the terminal from the CN, and if there is no corresponding UE capability or if the base station 1n-02 fails to retrieve the same, the base station 1n-02 may request a report of the UE capability.

In operation 1n-35, the terminal 1n-01 may make a request for temporary change of the UE capability to the base station 1n-02. The information on the temporary change in the UE capability (i.e., a temporary capability restriction) and a request for the same may be transmitted through an RRC message, such as UE assistance information in the above operation. The RRC message may include at least one piece of information, which may be requested by the terminal 1n-01, such as a cause of a request for a temporary change in UE capability (e.g., cause values: hardware sharing, interference, overheating, mode change, and the like), a band and band combination information to be supported, changes in the physical functions of the terminal (a change in the number of component carriers, a change in the number of MIMO layers, changes in the band and bandwidth information to be supported for each CC, a change in the support power, a change in the frequency range to be supported, and the like), or the like. Detailed items included in the RRC message and a signaling method thereof will be described in more detail in another embodiment below. When the terminal reports the change in UE capability, if only a UE capability in which the temporary change is smaller than the static UE capability is reported, only a subset of the static UE capability can always be reported. That is, this is a request for temporarily having some reduced capability of the overall static UE capability. However, if it is possible to report a UE capability in which the temporary change is higher than the static UE capability, a new UE capability higher than the UE capability reported in the previous static report must be signaled.

In addition, a prohibit timer 1n-40 for prohibiting a request for a change in UE capability may be configured in order to prevent the terminal 1n-01 from repeating or re-requesting the temporary capability restriction within a specific time after requesting the temporary capability restriction using an RRC message, and an application period of the requested UE capability may be guaranteed for a specific time according thereto. If the prohibit timer is not configured, the terminal 1n-01 may frequently transmit UE capability reports, which makes it difficult for the base station 1n-02 to perform scheduling and management with respect to the terminal. The prohibit timer 1n-40 may be configured to be included in msg 4 during an RRC connection procedure, and may be included in an RRC reconfiguration message. Alternatively, the prohibit timer 1n-40 may be configured as a default value according to internal settings of the terminal, or may be obtained from system information. Although not shown, the base station 1n-02 may transmit, to the terminal 1n-01, a temporary capability restriction confirm/reject message in response to the temporary capability restriction request message. If the base station 1n-02 accepts the temporary capability restriction request from the terminal 1n-01, the base station 1n-02 transmits a confirm message to the terminal 1n-01, and if the base station 1n-02 rejects the temporary capability restriction request, the base station 1n-02 transmits a reject message. Both the messages may be transmitted using RRC messages.

In operation 1n-45, the base station 1n-02 stores or does not reflect the temporary capability restriction information received from the terminal 1n-01 according to whether or not the temporary capability restriction determined in the operation is reflected. The base station 1n-02 is able to manage the received information only in an access stratum (AS) area, instead of transmitting the same to the 5G CN 1n-03. In operation 1n-50, the base station 1n-02 may reflect the temporary capability restriction, thereby transmitting new RRC configuration information to the terminal 1n-01 through an RRC reconfiguration message. However, if the base station 1n-02 rejects the temporary capability restriction request received from the terminal 1n-01, the base station 1n-02 may omit operation 1n-50 without reflecting the temporary capability restriction, or may configure RRC reconfiguration, based on the original UE capability. That is, the base station 1n-02 maintains the RRC configuration (RRC reconfiguration) based on the UE capability received in the previous operation. The terminal 1n-01 receiving the RRC reconfiguration from the base station 1n-02 in operation 1n-50 transmits information indicating that the RRC reconfiguration has been received to the base station 1n-02 through an RRC reconfiguration complete message for the configuration (operation 1n-55).

If the terminal 1n-01 needs to release the temporary change of the UE capability in the state in which the temporarily changed UE capability is reflected through the above process of temporarily changing the UE capability and the RRC reconfiguration according thereto (operation 1n-60), the terminal 1n-01 informs the base station 1n-02 that the temporary change in the UE capability has been completed and that the terminal has returned to the original static UE capability through a temporary capability restriction release message in operation 1n-65. Upon receiving the RRC message, the base station 1n-02 may transmit, to the terminal 1n-01, a release response RRC message indicating that the corresponding release message has been received in operation 1n-70. In operation 1n-75, the base station 1n-02 may determine that the terminal 1n-01 has returned to the static UE capability, and may then transmit a new RRC reconfiguration message to the terminal 1n-01.

Alternatively, the release response message in operation 1n-70 may be omitted. That is, if the base station 1n-02 receives the temporary capability restriction release message in operation 1n-65, the base station 1n-02 may transmit a new RRC reconfiguration message to the terminal 1n-01, instead of responding thereto.

In addition to the case in which the terminal 1n-01 explicitly requests a release of the temporary UE capability change as described above, the base station 1n-02 may identify a temporary capability change of the terminal in the following cases. The following conditions may be simultaneously applied to the terminal 1n-01.

1. The case in which a terminal explicitly requests a release of a temporary restriction
2. The case in which a terminal previously instructs a request for a new temporary restriction
3. The case in which a terminal switches to an RRC idle state or an RRC inactive state.
4. The case in which a retention period of the temporary capability restriction of the terminal is configured by providing a separate timer and in which the timer expires (the timer may be included in the RRC reconfiguration transmitted to the terminal. In addition, a plurality of timers may be configured depending on the situation. For example, the timer may be configured to be different depending on cause values of the temporary UE capability restriction, or may be configured to have different values for each terminal in an RRC connection state, an idle state, and an inactive state). If the terminal requests an extension of the configured timer value, the terminal may request a timer desired to be extended in a manner using UE assistance information, a new RRC message, or MAC CE.

Figure 15:
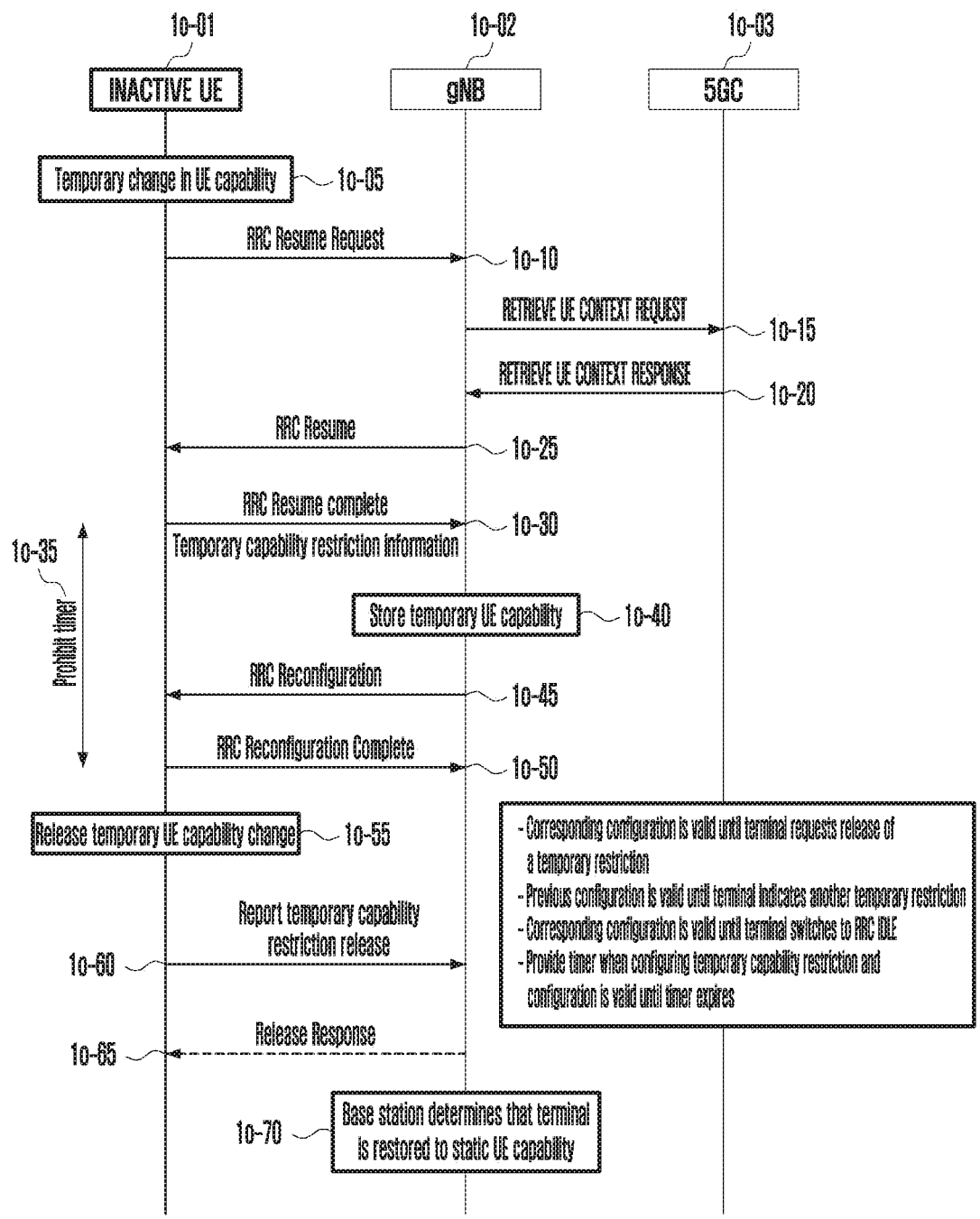
FIG. 15 is a diagram illustrating a method of a terminal in an RRC inactive state requesting a temporary change in UE capability according to an embodiment of the disclosure.

FIG. 15 is a diagram illustrating a method of a terminal in an RRC inactive state requesting a temporary change in UE capability according to an embodiment of the disclosure.

Referring to FIG. 15, in particular, in the case where a terminal transmits relevant information in the process of requesting a temporary UE capability restriction in the operation of requesting switching from an inactive state to a connection state.

A terminal 1o-01 in an RRC inactive state may have a temporary change in UE capability in operation 1o-05. In general, the UE capability may change due to sharing hardware with other communication technologies, interference therewith, heating, or the like while the terminal is in connection. However, even in an inactive state, the UE capability may be affected by the use of other communication technologies, such as WLAN, Bluetooth, or the like, so that management is required in consideration of the same from the initial RRC connection state. In an embodiment of the disclosure, even if the UE capability is temporarily changed in an inactive state, it is not necessary to trigger an RRC Resume procedure. Even if the changed UE capability is not reported in the state other than the RRC connection state, it does not affect the configuration by the base station. Therefore, it may be possible to trigger an RRC Resume procedure only when a general RRC connection is required (when uplink/downlink data occurs). That is, although a temporary change in UE capability does not trigger the RRC Resume procedure, if the RRC Resume procedure is triggered for another reason, it is necessary to determine whether or not the terminal currently needs a temporary change in the UE capability, and, if the capability change is necessary, a subsequent procedure reflects the same. In an embodiment of the disclosure, in order to notify the base station in advance that the UE capability has been temporarily changed in the idle state, the RRC connection procedure may be triggered even when the RRC connection is not necessary.

In general, if there is a static UE capability that the terminal reported to the base station in the previous RRC connection state in the corresponding operation, the base station may receive the UE capability of the terminal from the CN (UE capability retrieve condition 1), and in this case, the base station may not request the UE capability of the terminal after the RRC connection procedure. However, if the base station fails to retrieve the static UE capability of the terminal (UE capability retrieve condition 2), the base station may request and receive the UE capability of the terminal after the RRC connection procedure. The operation of the base station and the terminal may be different according to the above conditions.

The terminal 1o-01 transmits an RRC Resume Request message (msg 3) to the base station 1o-02 in operation 1o-10. In the above operation, msg 3 does not include details of the temporary capability restriction because msg 3 is sensitive to size and is not able to contain a large amount of information. For example, msg 3 may be a message, such as RRC Setup Request, RRC Resume Request, RRC Reestablishment Request, or the like. In operation 1o-15, the base station 1o-02 transmits, to a 5G CN 1o-03, a retrieve message for determining whether or not there are context of the terminal and UE capability information stored in the 5G CN 1o-03 and for requesting the same, and receives a response thereto in operation 1o-20. If there is the information, the base station 1o-02 stores the static UE capability.

In operation 1o-25, the base station 1o-02 transmits an RRC Resume message (msg 4) in response to the received RRC Resume Request message. The message may include a radio bearer configuration for SRB 1 and an MCG configuration (an RLC bearer, "mac-CellGroupConfig", "physical-CellGroupConfig and spCellConfig", and the like). The message includes general configurations of the base station 1o-02 for SRB 1 in this operation, and the terminal 1o-01 receives msg 4 and transmits an RRC Resume Complete message (msg 5) in response to the configuration of SRB 1 to the base station 1o-02 in operation 1o-30. The message may include at least one of a selected PLMN ID, a NAS message, and the like, and may include information on a temporary capability restriction. Based on the content of msg 5 transmitted from the terminal 1o-01, the base station 1o-02 may retrieve the static capability and context of the terminal from the CN, and if there is no corresponding UE capability or if the base station 1o-02 fails to retrieve the same, the base station 1o-02 may request a report of the UE capability.

Fundamentally, the UE capability is statically transmitted to the base station and the 5G CN, and if there is no separate signaling, the inherent capability of the terminal remains. However, in the case of an actual terminal, the UE capability may need to be temporarily changed due to the four reasons described above and other reasons. That is, a temporary change in UE capability different from the performance of the static terminal may be generated/required due to sharing hardware with other communication modules in the terminal, interference therewith, temporary heating, change of a terminal mode, and the like. In general, in the case where the UE capability is temporarily reduced, compared to the static UE capability, the terminal needs to report the same to the base station to make a request for scheduling and management conforming to the reduced UE capability. However, in a specific case, the terminal may have a UE capability higher than the static UE capability that has already been reported by the terminal For example, in the case of a foldable terminal, if the performance of the terminal is a static UE capability when the display is folded, the performance of the terminal in the state in which the display is unfolded may be configured to be higher. That is, a change in the state of the terminal may make a difference in the performance of an antenna and MIMO applied to the terminal, power performance thereof, or the like. In order to support the above case, a new signaling structure and a function thereof are required in addition to the existing method of reporting UE capability.

As described in the above operation 1o-30, msg 5 (i.e., the RRC Resume complete message) may include at least one piece of information, which may be requested by the terminal 1o-01, such as a cause of a request for a temporary change in UE capability (e.g., cause values: hardware sharing, interference, overheating, mode change, and the like), a band and band combination information to be supported, changes in the physical functions of the terminal (a change in the number of component carriers, a change in the number of MIMO layers, changes in the band and bandwidth information to be supported for each CC, a change in the support power, a change in the frequency range to be supported, and the like), or the like. Detailed items included in the RRC message and a signaling method thereof will be described in more detail in another embodiment below. When the terminal reports the change in UE capability, if only a UE capability in which the temporary change is smaller than the static UE capability is reported, only a subset of the static UE capability can always be reported. That is, this is a request for temporarily having some reduced capability of the overall static UE capability. However, if it is possible to report a UE capability in which the temporary change is higher than the static UE capability, a new UE capability higher than the UE capability reported in the previous static report must be signaled.

In addition, a prohibit timer 1o-40 for prohibiting a request for a change in UE capability may be configured in order to prevent the terminal from repeating or re-requesting the temporary capability restriction within a specific time after requesting the temporary capability restriction using an RRC message, and an application period of the requested UE capability may be guaranteed for a specific time according thereto. If the prohibit timer is not configured, the terminal 1o-01 may frequently transmit UE capability reports, which makes it difficult for the base station 1o-02 to perform scheduling and management with respect to the terminal. The prohibit timer 1o-35 may be configured to be included in msg 4 during an RRC connection procedure, and may be included in an RRC reconfiguration message. Alternatively, the prohibit timer 1o-35 may be configured as a default value according to internal settings of the terminal, or may be obtained from system information. Although not shown, the base station 1o-02 may transmit, to the terminal 1o-01, a temporary capability restriction confirm/reject message in response to the temporary capability restriction request message. If the base station 1o-02 accepts the temporary capability restriction request from the terminal 1o-01, the base station 1o-02 transmits a confirm message, and if the base station 1o-02 rejects the temporary capability restriction request, the base station 1o-02 transmits a reject message to the terminal 1o-01. Both the messages may be transmitted using RRC messages.

In operation 1o-40, the base station 1o-02 stores or does not reflect the temporary capability restriction information received from the terminal 1o-01 according to whether or not the temporary capability restriction determined in the operation is reflected. The base station 1o-02 manages the received information only in an access stratum (AS) area, instead of transmitting the same to the 5G CN 1o-03. In operation 1o-45, the base station 1o-02 may reflect the temporary capability restriction, thereby transmitting new RRC configuration information to the terminal 1o-01 through an RRC reconfiguration message. However, if the base station 1o-02 rejects the temporary capability restriction request received from the terminal 1o-01, the base station 1o-02 may omit operation 1o-45 without reflecting the temporary capability restriction, or may configure RRC reconfiguration, based on the original UE capability. That is, the base station 1o-02 maintains the RRC configuration (RRC reconfiguration) based on the UE capability received in the previous operation. The terminal 1o-01 receiving the RRC reconfiguration from the base station 1o-02 in operation 1o-45 transmits information indicating that the RRC reconfiguration has been received to the base station 1o-02 through an RRC reconfiguration complete message for the configuration (operation 1o-50).

If the terminal 1o-01 needs to release the temporary change of the UE capability in the state in which the temporarily changed UE capability is reflected through the above process of temporarily changing the UE capability and the RRC reconfiguration according thereto (operation 1o-55), the terminal 1o-01 informs the base station 1o-02 that the temporary change in the UE capability has been completed and that the terminal has returned to the original static UE capability through a temporary capability restriction release message in operation 1o-60. Upon receiving the RRC message, the base station 1o-02 may transmit, to the terminal 1o-01, a release response RRC message indicating that the corresponding release message has been received in operation 1o-65. In operation 1o-70, the base station 1o-02 may determine that the terminal 1o-01 has returned to the static UE capability, and may then transmit a new RRC reconfiguration message to the terminal 1o-01.

Alternatively, the release response message in operation 1o-65 may be omitted. That is, if the base station 1o-02 receives the temporary capability restriction release message in operation 1o-60, the base station 1o-02 may transmit, to the terminal 1o-01, a new RRC reconfiguration message, instead of responding thereto.

In addition to the case in which the terminal 1o-01 explicitly requests a release of the temporary UE capability change as described above, the base station 1o-02 may identify a temporary capability change of the terminal in the following cases. The following conditions may be simultaneously applied to the terminal 1o-01.

1. The case in which a terminal explicitly requests a release of a temporary restriction
2. The case in which a terminal previously instructs a request for a new temporary restriction
3. The case in which a terminal switches to an RRC idle state or an RRC inactive state.
4. The case in which a retention period of the temporary capability restriction of the terminal is configured by providing a separate timer and in which the timer expires (the timer may be included in the RRC reconfiguration transmitted to the terminal. In addition, a plurality of timers may be configured depending on the situation. For example, the timer may be configured to be different depending on cause values of the temporary UE capability restriction, or may be configured to have different values for each terminal in an RRC connection state, an idle state, and an inactive state). If the terminal requests an extension of the configured timer value, the terminal may request a timer desired to be extended in a manner using UE assistance information, a new RRC message, or MAC CE.

In the above embodiments of the disclosure, there are two ways for a terminal to request a temporary capability restriction. A first method allows msg 3 or msg 5 to include an indicator indicating that a temporary capability restriction has occurred and provides detailed information on the temporary capability restriction through a specific RRC message (e.g., "UEAssistanceInformation" message) in an RRC connection state. A second method is to include detailed information on the temporary capability restriction in msg 3 or msg 5 and provide the same.

Embodiment 4 of the disclosure describes in more detail the method in which the terminal includes temporary capability restriction request information as described in embodiments 1, 2, and 3, and may be applied to all of the above embodiments. Embodiment 4 primarily relates to a method of signaling detailed information on the temporary capability restriction using msg 3 and msg 5, and processes multiple values using bitmaps. That is, if a temporary capability restriction is performed by specifying more values using bitmaps, the terminal may dynamically, flexibly, and adaptively request adjustment of capability of the terminal according to a network environment, thereby providing the best user experience (UX) to a user.

1. Process multiple values using a bitmap.
   Only one cause value may occur, but it may occur in duplicate.
   For example, if overheating is caused by interference, both must be regarded as restriction causes.
   Therefore, bitmaps may be used by a method in which multiple causes can be explicitly transmitted at the same time.
   Multiple causes may be expressed using bitmaps, and scalability can be obtained for increasing causes. UE capability feature items according to cause values may be actively limited by a terminal by mapping the same using bitmaps.
2. Provide priority for multiple cause values using bitmaps
   Priority may be configured by setting additional bits (High 1/Low 0) for a desired UE capability feature.
   Since the terminal is really aware of the state of the terminal and appropriate solutions thereof, it is possible to specify the priority for an effective solution.
   If the priority is configured, the load of network for processing the restriction may be reduced.
3. Add bearer/RAT limitation.
   The split bearer and adding bearer items used in EN-DC are also managed using bitmaps.
   The RAT is limited in an environment with severe interference, thereby avoiding the situation.
   For example, it is useful to manage the use of a specific bearer using a bitmap since the operation as a split bearer may return to the use in LTE or 5G.
4. Provide priority for multiple reduced UE capabilities using bitmaps Embodiment 4-1 is example 1 of a method of processing a request for a temporary capability restriction proposed by the disclosure, and shows a method of configuring a cause value of a temporary capability restriction using a bitmap. If the cause values of the temporary capability restriction include the following four items, a 4-bit bitmap may be configured to indicate the cause values. That is, the bitmap size is equal to the number of cause values.

1) Hardware sharing
2) Interference
3) Overheating
4) Split bearer

The initial value may be "0000", or may be indicated in duplicate according to corresponding cause values. In the case where overheating occurs due to interference with other communication schemes, a corresponding value may be determined and transmitted as a value "0110".

Embodiment 4-2 is example 2 of a method of processing a request for a temporary capability restriction proposed by the disclosure, and shows a method of configuring cause values and priority of a temporary capability restriction using a bitmap. If the cause values of the temporary UE capability restriction include the following four items, and if the priority for each cause value is provided, corresponding cause values and priorities may be indicated by configuring a bitmap of 8 bits. That is, a bitmap size may be equal to the sum of the number of cause values and the number of priorities. Here, the priority means that the cause value having a higher priority, among the produced cause values, is to be determined.
1) Hardware sharing
2) Interference
3) Overheating
4) Split bearer
5) Priority of #1
6) Priority of #2
7) Priority of #3
8) Priority of #4

The initial value may be "0000 0000", or may be indicated in duplicate according to corresponding cause values. If overheating has occurred due to interference with other communication schemes, and if it is determined that the of overheating has a greater influence, among the cause values, that is, if overheating has a higher priority than interference, priority #3 may be determined and transmitted. That is, an 8-bit bitmap "0110 0010" may be set.

Embodiment 4-3 is example 3 of a method of processing a request for a temporary capability restriction proposed by the disclosure, and shows a method of configuring a list of UE features desired to be changed (or reduced) due to the temporary capability restriction using a bitmap. If a list of changed UE capability features required for the terminal is determined by eight items or less, it is possible to configure an 8-bit bitmap and to determine and indicate an item selected from among the UE capability lists to request change. That is, the bitmap size may be equal to the number of UE capability lists to request change. If there are 8 UE capability lists as follows, the terminal determines and transmits corresponding bits.
1) Number of CC
2) MIMO layer
3) BW
4) Power factor
5) Bearer
6) RAT limit
7) Reserve bit
8) Reserve bit The initial value may be "0000 0000", or may be indicated in duplicate according to corresponding values. In order to indicate a request for the change of a bearer and the change of an RAT type, an 8-bit bitmap "0000 1100" may be set. In other words, the method is to propose the limit of a bearer and RAT through a UE capability restriction when an issue occurs in the terminal due to a corresponding signaling, and, if the corresponding signaling is provided, signaling for values changed due to limitations is also required separately. That is, there must be a predetermined default value, or a value to be changed due to separate signaling must be indicated. The separate signaling may also be provided in the same message, and may then be included in another RRC message to be transmitted. For example, in the case where an MCG and an MCG split bearer are configured as bearer types, the split bearer may be primarily proposed, or a value explicitly indicating one of the two may be transmitted using another signaling. Similarly, it is possible to apply basic values and explicit signaling to other items.

Embodiment 4-4 is example 4 of a method of processing a request for a temporary capability restriction proposed by the disclosure, and shows a method of configuring a list of UE features desired to be changed (or reduced) due to the temporary capability restriction and the priority using a bitmap. If lists of changed UE capability features required for the terminal is determined by six items or less, and if six priorities corresponding to the features are signaled, it is possible to configure a 12-bit bitmap, to determine an item selected from among the UE capability lists to request change, and to indicate the priority thereof. That is, the bitmap size may be equal to the sum of the number of UE capability lists to request change and the priorities.
1) Number of CC
2) MIMO layer
3) BW
4) Power factor
5) Bearer
6) RAT limit
7) Priority of #1
8) Priority of #2
9) Priority of #3
10) Priority of #4
11) Priority of #5
12) Priority of #6

The initial value may be "0000 0000 0000", or may be indicated in duplicate according to corresponding values. In order to indicate the change of a bearer and the change of an RAT type, and, in particular, in order to indicate that the bearer control has a higher priority than the RAT type, a 12-bit bitmap "0000 1100 0010" may be set. In other words, the method is to propose the limit of a bearer and RAT through UE capability restriction when an issue occurs in the terminal due to a corresponding signaling, and is to make a request for processing the control of a bearer with a higher priority. If the corresponding signaling is provided, signaling for values changed due to limitations are also required separately. That is, there must be a predetermined default value, or a value to be changed must be indicated using separate signaling. The separate signaling may also be provided in the same message, and may then be included in another RRC message to be transmitted. For example, in the case where an MCG and an MCG split bearer are configured, the split bearer may be primarily proposed, or a value explicitly indicating one of the two may be transmitted using another signaling. Similarly, it is possible to apply basic values and explicit signaling to other items. In addition, a sequence and combination of values constituting the bitmap may be changed.

Embodiment 4-5 is example 5 of a method of processing a request for a temporary capability restriction proposed by the disclosure, and shows a method of configuring cause values of the temporary capability restriction, a list of UE features desired to be changed (or reduced), and the priorities of the corresponding values using a bitmap. If there are four candidate cause values for the temporary capability restriction of the terminal, if there are four priorities corresponding the values, if lists of changed UE capability features required for the terminal are determined by six items or less, and if six priorities corresponding to the features are signaled, it is possible to configure a 20-bit bitmap, to determine an item selected from the cause values and the UE capability lists to request change, and to indicate the priority thereof. That is, the bitmap size may be equal to the sum of the cause values, the priorities of the cause values, the number of UE capability lists to request change, and the priorities. The overall bitmap size may be adjusted by adding reserved values, and the bitmap may be configured as a combination of the previous embodiments.
1) Hardware sharing
2) Interference
3) Overheating
4) Split bearer
5) Priority of #1
6) Priority of #2

7) Priority of #3
8) Priority of #4
9) Number of CC
10) MIMO layer
11) BW
12) Power factor
13) Bearer
14) RAT limit
15) Priority of #9
16) Priority of #10
17) Priority of #11
18) Priority of #12
19) Priority of #13
20) Priority of #14

The initial value may be "0000 0000 0000 0000 0000", or may be indicated in duplicate according to corresponding values. If cause values are interference and overheating, and if overheating has a greater influence, in order to indicate the change of a bearer and the change of an RAT type, and, in particular, in order to indicate that the bearer control has a higher priority than the RAT type, a 20-bit bitmap "0110 0010 0000 1100 0010" may be set. In other words, the method is to propose the limit of a bearer and RAT through UE capability restriction when an issue (interference and overheating) occurs in the terminal due to a corresponding signaling (overheating has a greater influence), and is to make a request for processing the control of a bearer with a higher priority. If the corresponding signaling is provided, signaling for values changed due to limitations are also required separately. That is, there must be a predetermined default value, or a value to be changed must be indicated using separate signaling. The separate signaling may also be provided in the same message, and may then be included in another RRC message to be transmitted. For example, in the case where an MCG and an MCG split bearer are configured as bearer types, the split bearer may be primarily proposed, or a value explicitly indicating one of the two may be transmitted using another signaling. Similarly, it is possible to apply basic values and explicit signaling to other items. In addition, a sequence and combination of values constituting the bitmap may be changed.

As described above, changed values of UE features desired by the terminal may be selected and transmitted through separate signaling, instead of a bitmap. This may indicate a subset of static UE capability, or may be a value for requesting a new capability.

Figure 16:
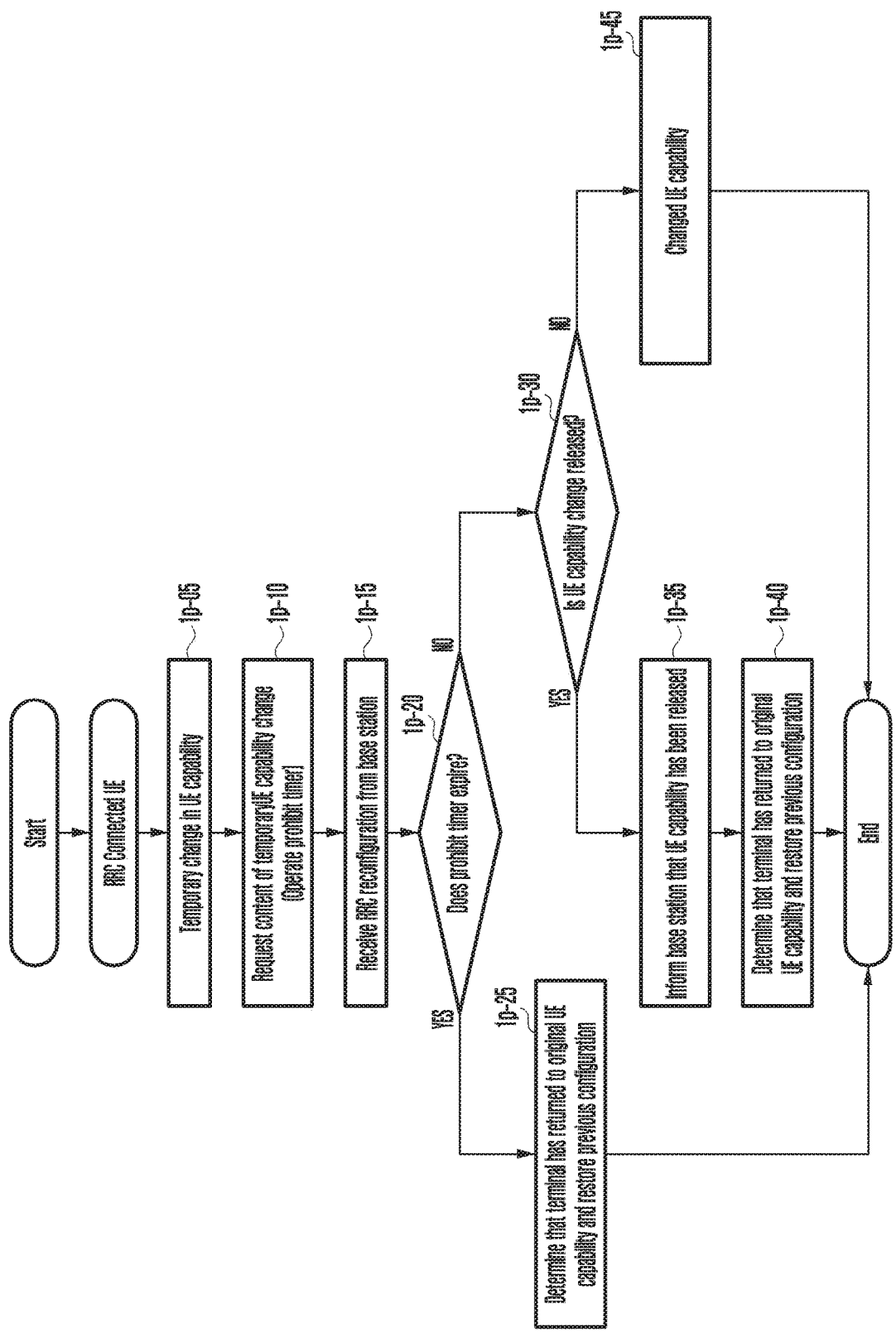
FIG. 16 is a diagram illustrating an overall operation in which a terminal in an RRC connection state requests a temporary change in UE capability according to an embodiment of the disclosure.

FIG. 16 is a diagram illustrating an overall operation in which a terminal in an RRC connection state requests a temporary change in UE capability according to an embodiment of the disclosure.

Referring to FIG. 16, a terminal in an RRC connection state may have a temporary change in UE capability due to internal issues of the terminal (operation 1p-05). Thereafter, the terminal may internally produce a message by including a reason for requesting the change in UE capability and the changed content therein. The message may be included in msg 3, msg 5, or another RRC message ("UEAssistanceInformation" or a new RRC message), and a detail description thereof has been made in the above embodiments. That is, the message may include an indicator for a temporary capability restriction or information about a requested temporary capability restriction. In operation 1p-10, the terminal transmits a message including the change content of the terminal to the base station, and operates a prohibit timer to prevent repetition of the request. In operation 1p-15, the terminal receives an RRC reconfiguration message from the base station and reflects the configuration for operation. In this operation, the base station may reflect the temporary capability restriction to provide the same, or may not reflect the same, or the operation may be omitted.

If the prohibit timer expires in operation 1p-20, the terminal determines that the terminal has returned to the original UE capability and restores the previous configuration in operation 1p-25. That is, the terminal may return to the configuration before the temporary capability restriction is applied. Alternatively, if there is no separate signaling from the base station, the configuration (applied with the temporary capability restriction) may be maintained. If the prohibit timer does not expire in operation 1p-20, and if a release of the UE capability change occurs in the terminal in operation 1p-30, the terminal may transmit, to the base station, a message indicating that the UE capability change has been released in operation 1p-35, and may determine that the terminal has returned to the original UE capability, thereby restoring the previous configuration in operation 1p-40. That is, the terminal may return to the configuration before the temporary capability restriction is applied. Alternatively, if there is no separate signaling from the base station, the configuration (applied with the temporary capability restriction) may be maintained. If the temporary capability restriction is required to be maintained without releasing the UE capability change in operation 1p-30, the changed UE capability is maintained (operation 1p-45).

Figure 17:
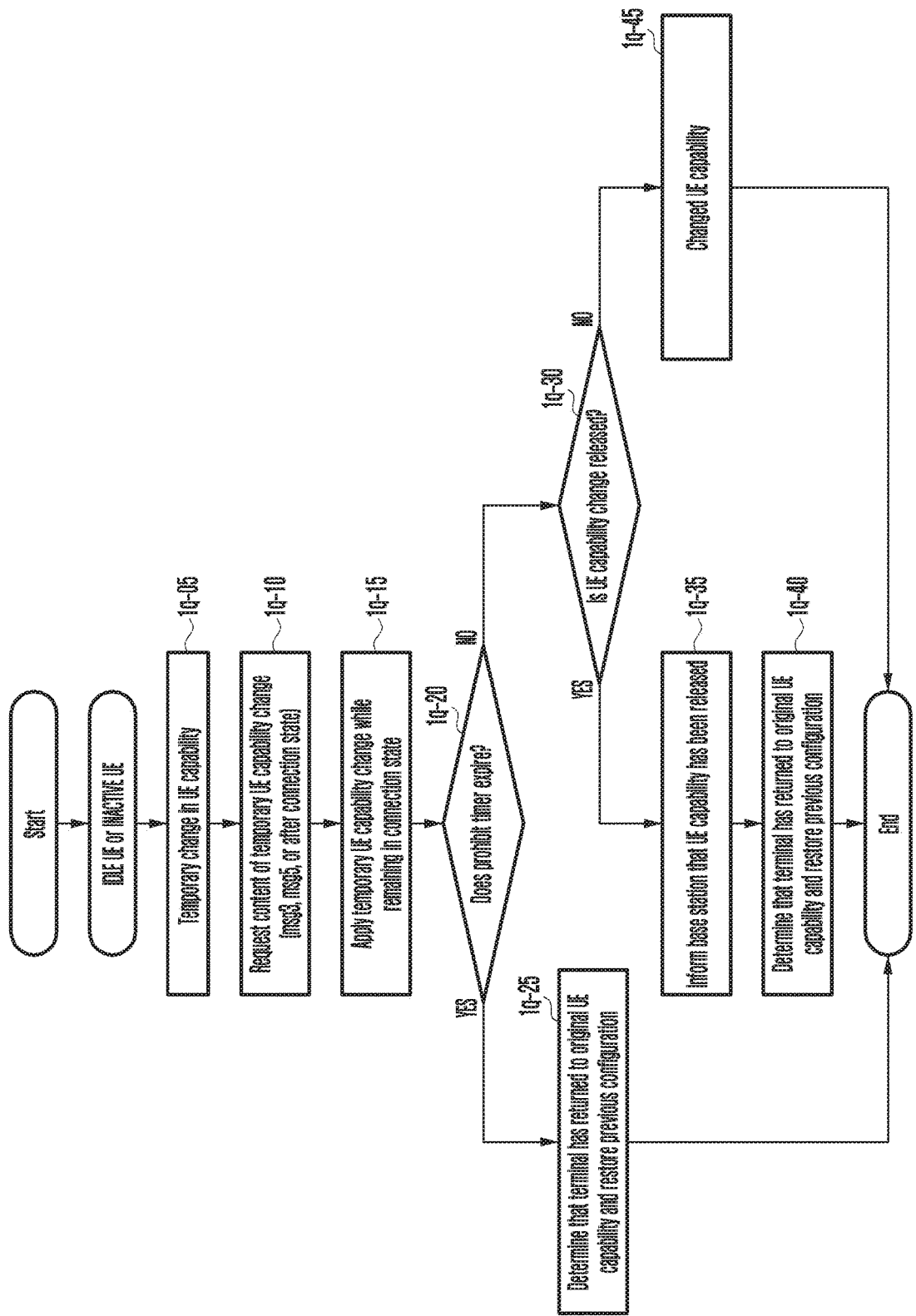
FIG. 17 is a diagram illustrating an overall operation in which a terminal in an idle or inactive state requests a temporary change in UE capability according to an embodiment of the disclosure.

FIG. 17 is a diagram illustrating an overall operation in which a terminal in an idle or inactive state requests a temporary change in UE capability according to an embodiment of the disclosure.

Figure 18:
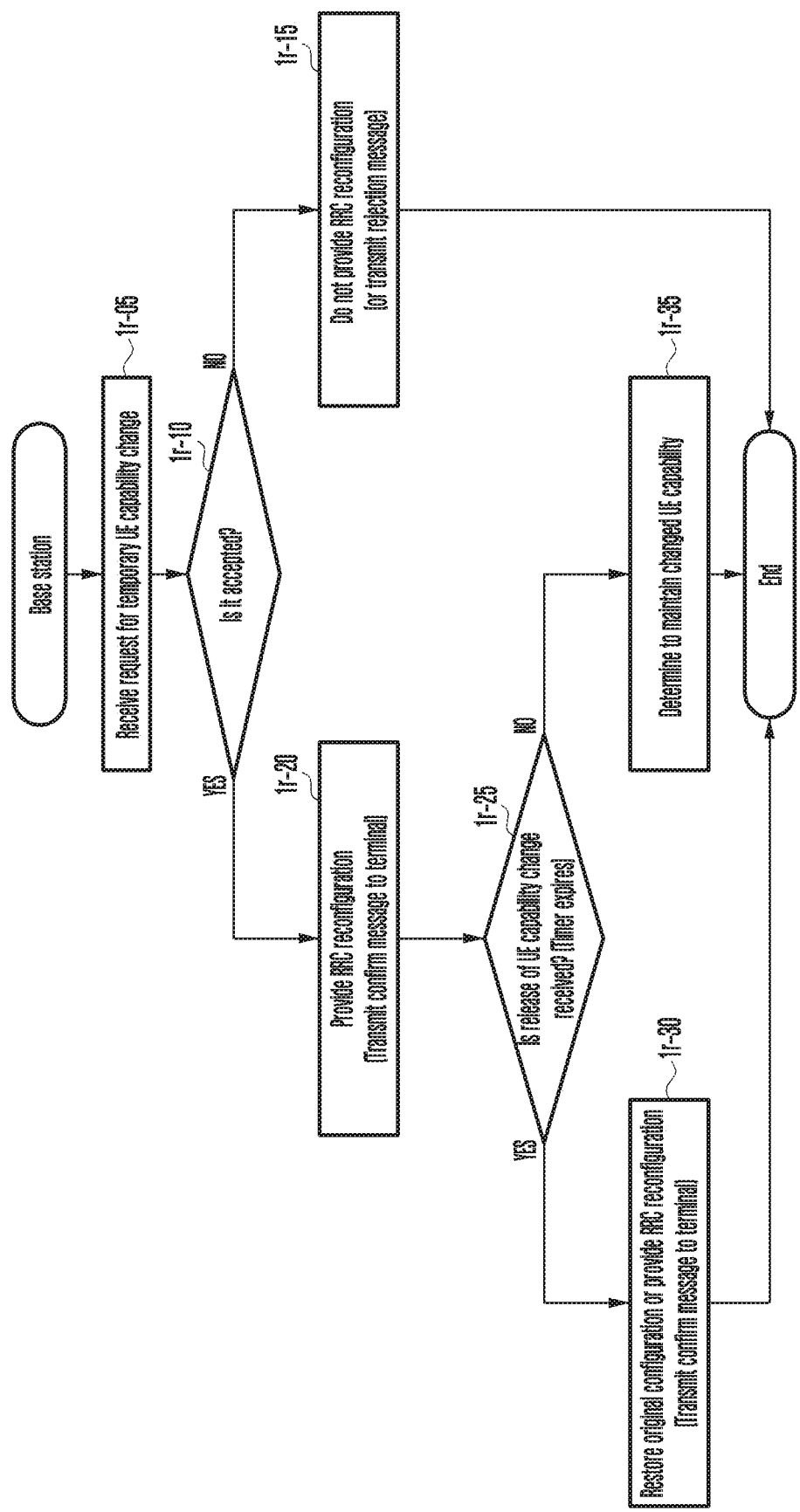
FIG. 18 is a diagram illustrating an overall operation of a base station that receives a temporary UE capability change of a terminal according to an embodiment of the disclosure.

Referring to FIG. 18, a terminal in an RRC idle/inactive state may have a temporary change in UE capability due to internal issues of the terminal (operation 1q-05). Thereafter, the terminal may internally produce a message by including a reason for requesting the change in UE capability and the changed content therein. The message may be included in msg 3 or msg 5, or may be included in another RRC message ("UEAssistanceInformation" or a new RRC message) after an RRC connection procedure is completed, and a detail description thereof has been made in the above embodiments. That is, the message may include an indicator for a temporary capability restriction or information about a requested temporary capability restriction. In operation 1q-10, the terminal transmits a message including the change content of the terminal to the base station, and operates a prohibit timer to prevent repetition of the request. In operation 1q-15, the terminal switches to a connection state and operates by applying the temporary UE capability change. Although not shown in the drawing, the terminal may switch to an RRC connection state, and may immediately apply a corresponding configuration in this operation. Alternatively, the base station may provide an RRC reconfiguration by reflecting the temporary capability restriction thereafter, or may not reflect the same, or the operation may be omitted.

If the prohibit timer expires in operation 1q-20, the terminal determines that the terminal has returned to the original UE capability and restores the previous configuration in operation 1q-25. That is, the terminal may return to the configuration before the temporary capability restriction is applied. Alternatively, if there is no separate signaling from the base station, the configuration (applied with the temporary capability restriction) may be maintained. If the prohibit timer does not expire in operation 1q-20, and if a release of the UE capability change occurs in the terminal in operation 1q-30, the terminal may transmit, to the base station, a message indicating that the UE capability change has been released in operation 1q-35, and may determine that the terminal has returned to the original UE capability, thereby restoring the previous configuration in operation 1q-40. That is, the terminal may return to the configuration before the temporary capability restriction is applied. Alternatively, if there is no separate signaling from the base station, the configuration (applied with the temporary capability restriction) may be maintained. If the temporary capability restriction is required to be maintained without releasing the UE capability change in operation 1q-30, the changed UE capability is maintained (operation 1q-45).

FIG. 18 is a diagram illustrating the overall operation of a base station that receives a temporary UE capability change of a terminal according to an embodiment of the disclosure.

If the base station receives a message of a request for a temporary change in UE capability from a terminal in any state (an RRC connection state, an inactive state, or an idle state) (operation 1r-05), the base station may determine whether to accept or reject the request message (operation 1r-10). The message may be included in msg 3 or msg 5, or may be included in another RRC message ("UEAssistanceInformation" or a new RRC message) after an RRC connection procedure is completed, and a detail description thereof has been made in the above embodiments. That is, the message may include an indicator for a temporary capability restriction or information about a requested temporary capability restriction. If the base station rejects the request message for the temporary change in UE capability from the terminal in operation 1r-10 (operation 1r-15), the base station may not provide the RRC reconfiguration reflecting the temporary UE capability change, and may ignore the same. Alternatively, the base station may transmit a rejection message with respect to the temporary UE capability change request message of the terminal.

If the base station accepts the request message for a temporary UE capability change from the terminal in operation 1r-10, the base station may provide the terminal with a new RRC reconfiguration reflecting the temporary UE capability change in operation 1r-20. Alternatively, the base station may transmit a confirm message indicating acceptance of the temporary UE capability change request message immediately after receiving the same, or may provide a new RRC reconfiguration reflecting the temporary UE capability change after transmitting the confirm message. If the base station receives a request message for releasing the temporary UE capability change from the terminal in operation 1r-25 (this may also be applied to the expiration of a configured prohibit timer), the base station may determine that the terminal has returned to the original configuration, and may manage the terminal according to the previous configuration, or may retransmit an RRC reconfiguration for the original configuration in operation 1r-30. Similarly, in the above operation, the base station may transmit a confirm message indicating acceptance of the temporary UE capability change release request message immediately after receiving the same, or may provide a new RRC reconfiguration reflecting the temporary UE capability change after transmitting the confirm message. If the base station does not receive a request message for releasing the temporary UE capability change from the terminal in operation 1r-25 (this may also be applied to the expiration of a configured prohibit timer), the base station determines that the terminal maintains the changed UE capability and manages the terminal by maintaining the RRC reconfiguration values reflecting the temporary UE capability change (operation 1r-35).

Figure 19:
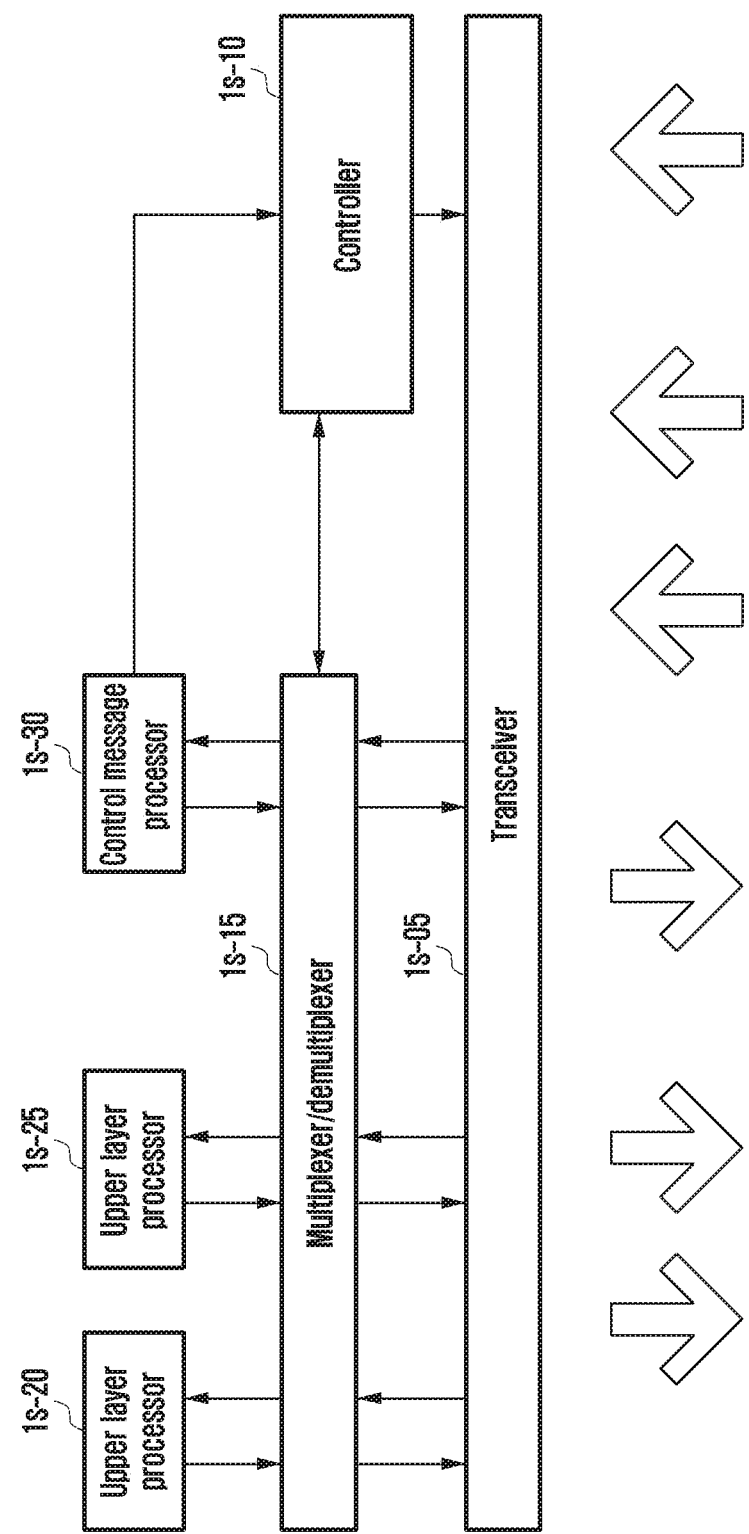
FIG. 19 is a diagram illustrating a configuration of a terminal according to an embodiment of the disclosure.

FIG. 19 is a diagram illustrating a configuration of a terminal according to an embodiment of the disclosure.

Referring to FIG. 19, a terminal according to the embodiment includes a transceiver 1s-05, a controller 1s-10, a multiplexer/demultiplexer 1s-15, various upper layer processors 1s-20 and 1s-25, and a control message processor 1s-30.

The transceiver 1s-05 receives data and predetermined control signals through a forward channel of a serving cell, and transmits data and predetermined control signals through a reverse channel thereof. In the case where a plurality of serving cells is configured, the transceiver 1s-05 performs transmission and reception of data and control signals through the plurality of serving cells. The multiplexer/demultiplexer 1s-15 multiplexes data generated by the upper layer processors 1s-20 and 1s-25 or the control message processor 1s-30, or demultiplexes the data received by the transceiver 1s-05, thereby transmitting the same to the appropriate upper layer processor 1s-20 or 1s-25 or control message processor 1s-30.

The control message processor 1s-30 transmits and receives control messages to and from the base station, thereby performing necessary operations. These operations include processing control messages, such as an RRC message and a MAC CE, reporting channel busy ratio (CBR) measurement values, and receiving an RRC message for a resource pool and the terminal operation. The upper layer processors 1s-20 and 1s-25 denote DRB devices, and may be configured for each service. The upper layer processors 1s-20 and 1s-25 process data generated from user services, such as File Transfer Protocol (FTP) or Voice-over-Internet Protocol (VoIP), and transmit the same to the multiplexer/demultiplexer 1s-15, or process data transmitted from the multiplexer/demultiplexer 1s-15 and transmit the same to an upper level service application. The controller 1s-10 identifies scheduling commands (e.g., reverse grants) received through the transceiver 1s-05 and controls the transceiver 1s-05 and the multiplexer/demultiplexer 1s-15 so as to perform reverse transmission by means of appropriate transmission resources at an appropriate time.

Meanwhile, although the above embodiment describes that the terminal includes a plurality of blocks and the respective blocks perform different functions, this is only an example, and the disclosure is not limited thereto. For example, the controller 1s-10 may perform a function performed by the multiplexer/demultiplexer 1s-15. The controller 1s-10 may include at least one processor. The controller 1s-10 may control the operation of the terminal according to the embodiment.

Figure 20:
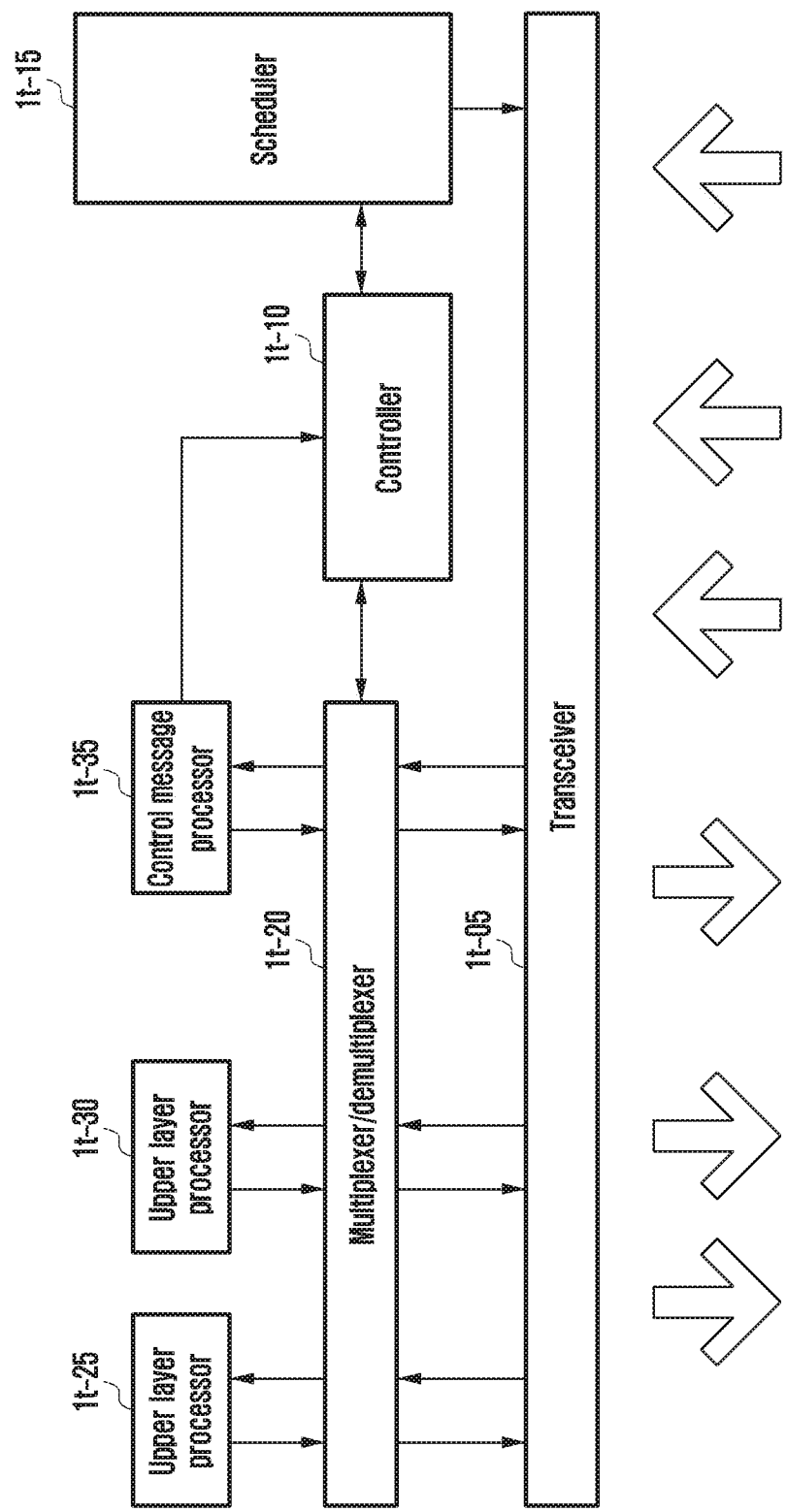
FIG. 20 is a diagram illustrating a configuration of a base station according to an embodiment of the disclosure.

FIG. 20 is a diagram illustrating a configuration of a base station according to an embodiment of the disclosure.

Referring to FIG. 20, a base station includes a transceiver 1t-05, a controller 1t-10, a multiplexer/demultiplexer 1t-20, a control message processor 1t-35, various upper layer processors 1t-25 and 1t-30, and a scheduler 1t-15.

The transceiver 1t-05 transmits data and predetermined control signals through a forward carrier and receives data and predetermined control signals through a reverse carrier. In the case where a plurality of carriers is configured, the transceiver 1t-05 performs transmission and reception of data and control signals through the plurality of carriers. The multiplexer/demultiplexer 1t-20 multiplexes data generated by the upper layer processors 1t-25 and 1t-30 or the control message processor 1t-35, or demultiplexes data received by the transceiver 1t-05, thereby transmitting the same to the appropriate upper layer processor 1t-25 or 1t-30, the control message processor 1t-35, or the controller 1t-10.

The control message processor 1t-35 produces a message to be transmitted to the terminal and transmits the message to a lower layer under the control of the controller. The upper layer processors 1t-25 and 1t-30 may be configured for each terminal and each service. The upper layer processors 1t-25 and 1t-30 process data generated from user services, such as FTP or VoIP, and transmit the same to the multiplexer/demultiplexer 1t-20, or process data transmitted from the multiplexer/demultiplexer 1t-20 and transmit the same to an upper level service application. The scheduler 1t-15 allocates transmission resources to the terminal at an appropriate time in consideration of the buffer status of the terminal, the channel status, the active time of the terminal, and the like, and allows the transceiver to processes the signals transmitted from the terminal or to transmit a signal to the terminal. The controller 1t-10 may include at least one processor. The controller 1t-10 may control the operation of the base station according to the embodiment.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method by a terminal in a wireless communication system, the method comprising:
identifying whether cause information to request a restriction for capability of the terminal is detected;
reporting, to a base station, a first message including assistance information on a change of the capability of the terminal and information on the detected cause information, in case that the cause information is detected, wherein the assistance information includes information on at least one of a number of component carriers supported by the terminal, a bandwidth supported by the terminal, or a number of multiple input multiple output (MIMO) layers supported by the terminal;
receiving, from the base station, a second message as a response to the first message, the second message including first information for restricting the capability of the terminal and second information on a timer for maintaining the restricted capability of the terminal; and
performing a communication with the base station based on the restricted capability of the terminal during a time according to the timer,
wherein the restricted capability of the terminal is released based on the timer being expired,
wherein the information on the detected cause information indicates one of a first issue for hardware sharing with another communication method, a second issue for interference by the other communication method, a third issue for an exceptional operation of the terminal, or a fourth issue for a change of a terminal mode, and
wherein a value of the timer is determined differently based on which issue among the first issue, the second issue, the third issue, or the fourth issue is indicated by the information on the detected cause information and a state of the terminal which is one of a radio resource control (RRC) connected state, an RRC inactive state, or an RRC idle state.

2. The method of claim 1, further comprising:
receiving, from the base station, information on a prohibit timer for assistance information reporting,
wherein the first message is reported, in case that the prohibit timer is not running.

3. The method of claim 2, further comprising:
starting the prohibit timer after the first message is reported.

4. The method of claim 1, further comprising:
receiving, from the base station, a user equipment (UE) capability enquiry; and
transmitting, to the base station, UE capability information based on the UE capability enquiry.

5. A method by a base station in a wireless communication system, the method comprising:
receiving, from a terminal, a first message including assistance information on a change of a capability of the terminal based on cause information and information on the cause information, wherein the assistance information includes information on at least one of a number of component carriers supported by the terminal, a bandwidth supported by the terminal, or a number of multiple input multiple output (MIMO) layers supported by the terminal;
transmitting, to the terminal, a second message as a response to the first message, the second message including first information for restricting the capability of the terminal and second information on a timer for maintaining the restricted capability of the terminal; and
performing a communication with the terminal based on the restricted capability of the terminal during a time according to the timer,
wherein the restricted capability of the terminal is released based on the timer being expired,
wherein the information on the cause information indicates one of a first issue for hardware sharing with another communication method, a second issue for interference by the other communication method, a third issue for an exceptional operation of the terminal, or a fourth issue for a change of a terminal mode, and
wherein a value of the timer is determined differently based on which issue among the first issue, the second issue, the third issue, or the fourth issue is indicated by the information on the detected cause information and a state of the terminal which is one of a radio resource control (RRC) connected state, an RRC inactive state, or an RRC idle state.

6. The method of claim 5, further comprising:
transmitting, to the terminal, information on a prohibit timer for assistance information reporting, and
wherein the first message is received, in case that the prohibit timer is not running in the terminal.

7. The method of claim 6, wherein the prohibit timer is started by the terminal after the first message is transmitted.

8. The method of claim 5, further comprising:
transmitting, to the terminal, a user equipment (UE) capability enquiry; and
receiving, from the terminal, UE capability information based on the UE capability enquiry.

9. A terminal in a wireless communication system, the terminal comprising:
a transceiver; and
at least one processor configured to:
identify whether cause information to request a restriction for capability of the terminal is detected,
report, via the transceiver to a base station, a first message including assistance information on a change of the capability of the terminal and information on the detected cause information, in case that the cause information is detected, wherein the assistance information includes information on at least one of a number of component carriers supported by the terminal, a bandwidth supported by the terminal, or a number of multiple input multiple output (MIMO) layers supported by the terminal, and
receive, via the transceiver from the base station, a second message as a response to the first message, the second message including first information for restricting the capability of the terminal and second information on a timer for maintaining the restricted capability of the terminal, and
perform a communication with the base station based on the restricted capability of the terminal during a time according to the timer,
wherein the restricted capability of the terminal is released based on the timer being expired,
wherein the information on the detected cause information indicates one of a first issue for hardware sharing with another communication method, a second issue for interference by the other communication method, a third issue for an exceptional operation of the terminal, or a fourth issue for a change of a terminal mode, and
wherein a value of the timer is determined differently based on which issue among the first issue, the second issue, the third issue, or the fourth issue is indicated by the information on the detected cause information and a state of the terminal which is one of a radio resource control (RRC) connected state, an RRC inactive state, or an RRC idle state.

10. The terminal of claim 9,
wherein the at least one processor is further configured to receive, via the transceiver from the base station, information on a prohibit timer for assistance information reporting, and
wherein the first message is reported, in case that the prohibit timer is not running.

11. The terminal of claim 10, wherein the at least one processor is further configured to start the prohibit timer after the first message is reported.

12. The terminal of claim 9, wherein the at least one processor is further configured to:
receive, from the base station via the transceiver, a user equipment (UE) capability enquiry, and
transmit, to the base station via the transceiver, UE capability information based on the UE capability enquiry.

13. A base station in a wireless communication system, the base station comprising:
a transceiver; and
at least one processor configured to:
receive, via the transceiver from a terminal, a first message including assistance information on a change of a capability of the terminal based on cause information and information on the cause information, wherein the assistance information includes information on at least one of a number of component carriers supported by the terminal, a bandwidth supported by the terminal, or a number of multiple input multiple output (MIMO) layers supported by the terminal,
transmit, via the transceiver to the terminal, a second message as a response to the first message, the second message including first information for restricting the capability of the terminal and second information on a timer for maintaining the restricted capability of the terminal, and
perform a communication with the terminal based on the restricted capability of the terminal during a time according to the timer,
wherein the restricted capability of the terminal is released based on the timer being expired,
wherein the information on the cause information indicates one of a first issue for hardware sharing with another communication method, a second issue for interference by the other communication method, a third issue for an exceptional operation of the terminal, or a fourth issue for a change of a terminal mode, and
wherein a value of the timer is determined differently based on which issue among the first issue, the second issue, the third issue, or the fourth issue is indicated by the information on the detected cause information and a state of the terminal which is one of a radio resource control (RRC) connected state, an RRC inactive state, or an RRC idle state.

14. The base station of claim 13,
wherein the at least one processor is further configured to transmit, via the transceiver to the terminal, information on a prohibit timer for assistance information reporting, and
wherein the first message is received, in case that the prohibit timer is not running in the terminal.

15. The base station of claim 14, wherein the prohibit timer is started by the terminal, after the first message is transmitted.

16. The base station of claim 13, wherein the at least one processor is further configured to:
transmit, via the transceiver to the terminal, a user equipment (UE) capability enquiry, and
receive, via the transceiver from the terminal, UE capability information based on the UE capability enquiry.

* * * * *